(12) United States Patent
Meier

(10) Patent No.: US 6,400,702 B1
(45) Date of Patent: **\*Jun. 4, 2002**

(54) RADIO FREQUENCY LOCAL AREA NETWORK

(75) Inventor: Robert C. Meier, Cedar Rapids, IA (US)

(73) Assignee: Intermec IP Corp., Woodland Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/531,880

(22) Filed: Mar. 21, 2000

Related U.S. Application Data

(63) Continuation of application No. 09/089,950, filed on Jun. 3, 1998, now Pat. No. 6,084,867, which is a continuation of application No. 08/494,909, filed on Jun. 26, 1995, now abandoned, which is a continuation-in-part of application No. 08/318,154, filed on Oct. 4, 1994, which is a continuation-in-part of application No. 08/177,738, filed on Jan. 4, 1994, now abandoned, which is a continuation-in-part of application No. 08/147,766, filed on Nov. 4, 1993, now abandoned, which is a continuation-in-part of application No. 08/073,142, filed on Jun. 4, 1993, now abandoned, which is a continuation-in-part of application No. 08/058,905, filed on May 6, 1993, now abandoned, said application No. 08/494,909, filed on Jun. 26, 1995, is a continuation-in-part of application No. 08/059,447, filed on May 7, 1993, which is a continuation-in-part of application No. 08/856,827, filed on May 3, 1993, now Pat. No. 5,295,154, which is a continuation-in-part of application No. 07/769,425, filed on Oct. 1, 1991, now abandoned.

(51) Int. Cl.$^7$ ............................................. H04J 15/00
(52) U.S. Cl. ...................... 370/338; 370/256; 370/285; 370/401
(58) Field of Search ................................ 370/256, 278, 370/282, 285, 338, 401, 402, 403, 404, 405, 406, 407, 408, 411, 437, 465, 466, 349, 328

(56) References Cited

U.S. PATENT DOCUMENTS

| 4,247,908 | A |   | 1/1981 | Lockhart, Jr. et al. |
| 5,289,378 | A |   | 2/1994 | Miller et al. |
| 5,339,316 | A |   | 8/1994 | Deopstraten |
| 5,748,619 | A | * | 5/1998 | Meier .......................... 370/408 |
| 6,084,867 | A | * | 7/2000 | Meier .......................... 370/338 |

* cited by examiner

Primary Examiner—Douglas Olms
Assistant Examiner—Shick Hom

(57) ABSTRACT

An apparatus and a method for routing data in a radio data communication system having one or more host computers, one or more intermediate base stations, and one or more RF terminals organizes the intermediate base stations into an optimal spanning-tree network to control the routing of data to and from the RF terminals and the host computer efficiently and dynamically. Communication between the host computer and the RF terminals is achieved by using the network of intermediate base stations to transmit the data.

24 Claims, 9 Drawing Sheets

RADIO FREQUENCY LOCAL AREA NETWORK

CROSS REFERENCE TO RELATED APPLICATIONS

The present application is a continuation of application Ser. No. 09/089,950, filed Jun. 3, 1998, now U.S. Pat. No. 6,084,867, issued Jul. 4, 2000, which is a continuation of application Ser. No. 08/494,909, filed Jun. 26, 1995, now abandoned, and a continuation-in-part of application Ser. No. 08/318,154, filed Oct. 4, 1994, which is a continuation-in-part of application Ser. No. 08/177,738, file Jan. 4, 1994, abandoned, which is a continuation-in-part of application Ser. No. 08/147,766, Nov. 4, 1993, abandoned, which is a continuation-in-part of application Ser. No. 08/073,142, filed Jun. 4, 1993, abandoned, which is a continuation-in-part of application Ser. No. 08/058,905, filed May 6, 1993, abandoned, said application Ser. No. 08/494,909, filed Jun. 26, 1995, is a continuation-in-part of application Ser. No. 08/059,447, filed May 7, 1993, which is a continuation-in-part of application Ser. No. 08/056,827, filed May 3, 1993, U.S. Pat. No. 5,295,154, which is a continuation of application Ser. No. 07/769,425, filed Oct. 1, 1991, now abandoned.

AUTHORIZATION PURSUANT TO 37 C.F.R. 1.71(d) AND (e)

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

INCORPORATION BY REFERENCE

The Applicant hereby incorporates herein by reference in their entireties, including any and all figures and appendices, the following patent applications and patents: U.S. Pat. No. 5,295,154, issued Mar. 15, 1994, in the name of Robert C. Meier; U.S. Pat. No. 5,394,436, issued Feb. 28, 1995, in the names of Meier, et al., including Appendix A and Appendix B; PCT International Application PCT/US94/12742 of inventor Meier, including Appendix A and Appendix B, with an International Filing Date of Nov. 4, 1994, an International Publication Number of WO 95/12942 and an International Publication Date of May 11, 1995; pending application Ser. No. 08/318,154, filed Oct. 4, 1994, now abandoned, including Appendix A; and abandoned application Ser. No. 07/769,425, filed Oct. 1, 1991, in the names of Meier, et al.

BACKGROUND OF THE INVENTION

In a typical radio data communication system having one or more host computers and multiple RF terminals, communication between a host computer and an RF terminal is provided by one or more base stations. Depending upon the application and the operating conditions, a large number of these base stations may be required to adequately serve the system. For example, a radio data communication system installed in a large factory may require dozens of base stations in order to cover the entire factory floor.

In earlier RF data communication systems, the base stations were typically connected directly to a host computer through multi-dropped connections to an Ethernet communication line. To communicate between an RF terminal and a host computer, in such a system, the RF terminal sends data to a base station and the base station passes the data directly to the host computer. Communicating with a host computer through a base station in this manner is commonly known as hopping. These earlier RF data communication systems used a single-hop method of communication.

In order to cover a larger area with an RF data communication system and to take advantage of the deregulation of the spread-spectrum radio frequencies, later-developed RF data communication systems are organized into layers of base stations. As in earlier RF data communications systems, a typical system includes multiple base stations which communicate directly with the RF terminals and the host computer. In addition, the system also includes intermediate stations that communicate with the RF terminals, the multiple base stations, and other intermediate stations. In such a system, communication from an RF terminal to a host computer may be achieved, for example, by having the RF terminal send data to an intermediate station, the intermediate station send the data to a base station, and the base station send the data directly to the host computer. Communicating with a host computer through more than one station is commonly known as a multiple-hop communication system.

Difficulties often arise in maintaining the integrity of such multiple-hop RF data communication systems. The system must be able to handle both wireless and hard-wired station connections, efficient dynamic routing of data information, RF terminal mobility, and interference from many different sources.

The present invention also relates to a wireless and wired communication network used to maintain communication pathways among wireless communication devices and remote stations. As is well known, wired local area networks ("LANs"), such as ethernet utilizing coaxial or twisted pair cabling ("wiring"), provide communication among remote stations, such as personal or host computers, which are commonly wired to a wired LAN. Hereinafter, a wired LAN is referred to as a "wired subnet". To maintain communication beyond the wired range of ethernet, for example, bridging devices are employed to route information between one wired section of ethernet to another wired section. The bridging devices forward communication from one side of the bridging device onto the other, and vice versa. Smarter bridging devices are also known which keep track of the location of the remote stations so that forwarding only occurs when necessary.

As is also well known, in typical wireless communication networks, wireless communication generally occurs directly between two or more wireless terminals. To overcome transmission range limitations, such wireless networks have included wireless relaying transceivers to relay received communication, extending the range at which communication can be maintained. However, depending on the mode of wireless communication, many wireless relaying transceivers may be needed to adequately serve the network requirements.

In earlier wireless communication systems, the wireless relaying transceivers were also used to manage communication among a variety of wireless communication devices. Such relaying transceivers have been called base stations. The base station were typically connected directly to a host computer through multi-dropped connections to an ethernet communication line. To communicate between a wireless communication device and a host computer, in such a system, the wireless communication device sends data to a base station, and the base station passes the data along a hard-wired ("wired") link to the host computer.

In order to cover a larger area with a wireless communication system and to take advantage of the de-regulation of the spread-spectrum radio frequencies, later-developed wireless communication systems are organized into layers of base stations. As in earlier wireless communications systems, a typical system includes multiple base stations which communicate directly with wireless terminals and the host computer.

In such wireless networks, difficulties often arise in maintaining the integrity of wireless communications. The wireless communication network must be able to handle both wireless and wired connectivity, efficient routing of data information, wireless communication device mobility, and interference from many different sources.

Customarily, wired local area networks support wireless communication devices that occupy fixed locations. Message traffic to and from such devices are routed via paths that do not change with time. Absence of a communication link to a device reflects a fault condition, i.e., a breakdown in some network component.

Thus, one object of the present invention is to route data through a wired and wireless communication network efficiently, dynamically, and without looping.

Another object of the present invention is to make the routing of data transparent to wireless terminals and remote stations located on IEEE 802.3 type subnets.

It is a further object of the present invention for the network to be capable of handling wireless communication device mobility and lost network nodes with minimal impact on the entire data communication system.

It is a still further object of the invention to allow wireless mobile computing devices, a type of wireless communication device, to move freely within wireless networks consisting of many relay nodes while transparently maintaining network connectivity with a plurality of wired subnets.

SUMMARY OF THE INVENTION

The present invention solves many of the problems inherent in a multiple-hop data communication system. The present invention comprises an RF Local-Area Network capable of efficient and dynamic handling of data by routing communications between the RF Terminals and the host computer through a network of intermediate base stations.

In one embodiment of the present invention, the RF data communication system contains one or more host computers and multiple gateways, bridges, and RF terminals. Gateways are used to pass messages to and from a host computer and the RF Network. A host port is used to provide a link between the gateway and the host computer. In addition, gateways may include bridging functions and may pass information from one RF terminal to another. Bridges are intermediate relay nodes which repeat data messages. Bridges can repeat data to and from bridges, gateways and RF terminals and are used to extend the range of the gateways.

The RF terminals are attached logically to the host computer and use a network formed by a gateway and the bridges to communicate with the host computer. To set up the network, an optimal configuration for conducting network communication spanning tree is created to control the flow of data communication. To aid understanding by providing a more visual description, this configuration is referred to hereafter as a "spanning tree" or "optimal spanning tree".

Specifically, root of the spanning tree are the gateways; the branches are the bridges; and non-bridging stations, such as RF terminals, are the leaves of the tree. Data are sent along the branches of the newly created optimal spanning tree. Nodes in the network use a backward learning technique to route packets along the correct branches.

One object of the present invention is to route data efficiently, dynamically, and without looping. Another object of the present invention is to make the routing of the data transparent to the RF terminals. The RF terminals, transmitting data intended for the host computer, are unaffected by the means ultimately used by the RF Network to deliver their data.

It is a further object of the present invention for the network to be capable of handling RF terminal mobility and lost nodes with minimal impact on the entire RF data communication system.

The present invention also solves many of the foregoing problems by using a communication network comprising two wired subnets, a wired access point connected to each of the subnets, and a plurality of intermediate wireless access points. The plurality of intermediate wireless access points provide a wireless pathway between the wired access points connected to the two subnets. Together, the two wired access points and the plurality of intermediate wireless access points form a spanning tree which interconnects the two subnets.

In another embodiment of the invention, the network may also comprise a plurality of terminal nodes which utilize the wired access points and the plurality of intermediate wireless access points to communicate on the network.

In a further embodiment of the invention, the network may also comprise a remote station attached to each of the two wired subnets. The wired access points and the plurality of intermediate wireless access points maintain communication connectivity between the two remote stations. In addition, the network may further comprise a wireless communication device which utilizes the two wired access points and the plurality of intermediate wireless access points to communicate with the two remote stations.

In a still further embodiment, the network may also comprise a third subnet and a third wired access point connected thereto. The third wired access point participates in the spanning tree, and, along with the other two wired access points and the plurality of intermediate wireless access points, communicatively interconnects the three wired subnets. The network may also comprise a plurality of wireless communication devices which utilize the three wired access points and the plurality of intermediate wireless access points to communicate with the three subnets.

The full details of the subject invention will become apparent from the following detailed description taken in conjunction with the drawings.

DETAILED DESCRIPTION OF THE INVENTION

Figure 1:
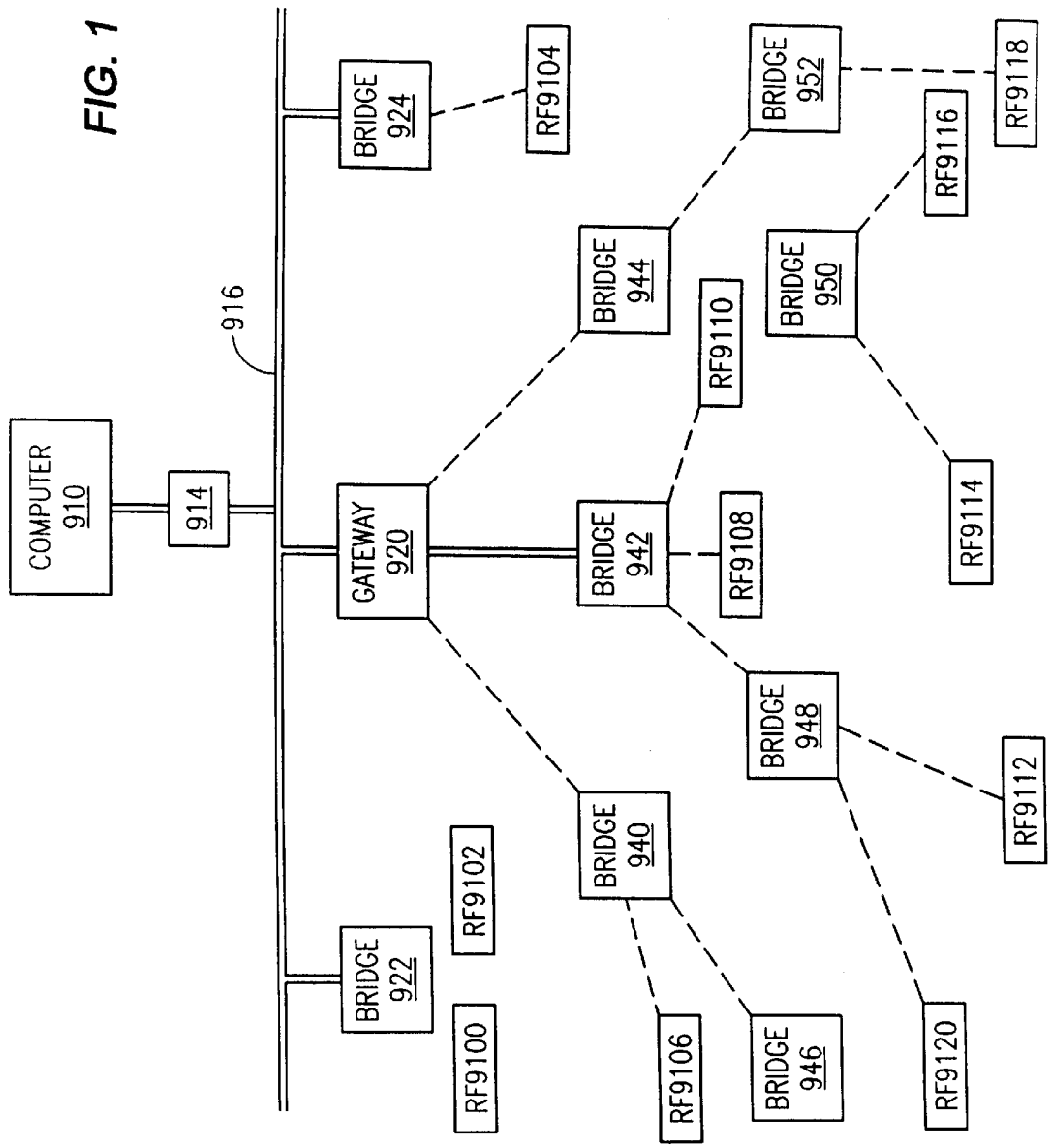
FIG. 1 is a functional block diagram of an RF data communication system incorporating the RF local-area network of the present invention.

FIG. 1 is a functional block diagram of an RF data communication system. In one embodiment of the present invention, the RF data communication system has a host computer 910, a network controller 914 and bridges 922 and 924 attached to a data communication link 916. Also attached to the data communication link 916 is a gateway 920 which acts as the root node for the spanning tree of the RF data network of the present invention. A bridge 942 is attached to the gateway 920 through a hard-wired communication link and bridges 940 and 944 are logically attached to gateway 920 by two independent RF links. Additional bridges 946, 948, 950 and 952 are also connected to the RF Network and are shown in the FIG. 1. Note that, although shown separate from the host computer 910, the gateway 920 (the spanning tree root node) may be part of host computer 910.

FIG. 1 further shows RF terminals 9100 and 9102 attached to bridge 922 via RF links and RF terminal 9104 attached to bridge 924 via an RF link. Also, RF terminals 9106, 9108, 9110, 9112, 9114, 9116, 9118, and 9120 can be seen logically attached to the RF Network through their respective RF links. The RF terminals in FIG. 1 are representative of non-bridging stations. In alternate embodiments of the present invention, the RF Network could contain any type of device capable of supporting the functions needed to communicate in the RF Network such as hard-wired terminals, remote printers, stationary bar code scanners, or the like. The RF data communication system, as shown in FIG. 1, represents the configuration of the system at a discrete moment in time after the initialization of the system. The RF links, as shown, are dynamic and subject to change. For example, changes in the structure of the RF data communication system can be caused by movement of the RF terminals and by interference that affects the RF communication links.

In the preferred embodiment, the host computer 910 is an IBM 3090, the network controller 914 is a model RC3250 of the Norand Corporation, the data communication link 916 is an Ethernet link, the nodes 920, 922, 924, 940, 942, 944, 946, 948, 950 and 952 are intelligent base transceiver units of the type RB4000 of the Norand Corporation, and the RF terminals 9100, 9102, 9104, 9106, 9108, 9110, 9112, 9114, 9116, 9118 and 9120 are of type RT1100 of the Norand Corporation.

The optimal spanning tree, which provides the data pathways throughout the communication system, is stored and maintained by the network as a whole. Each node in the network stores and modifies information which specifies how local communication traffic should flow. Optimal spanning trees assure efficient, adaptive (dynamic) routing of information without looping.

To initialize the RF data communication system, the gateway 920 and the other nodes are organized into an optimal spanning tree rooted at the gateway 920. To form the optimal spanning tree, in the preferred embodiment the gateway 920 is assigned a status of ATTACHED and all other bridges are assigned the status UNATTACHED. The gateway 920 is considered attached to the spanning tree because it is the root node. Initially, all other bridges are unattached and lack a parent in the spanning tree. At this point, the attached gateway node 920 periodically broadcasts a specific type of polling packet referred to hereafter as "HELLO packets". The HELLO packets can be broadcast using known methods of communicating via radio frequency (RF) link or via a direct wire link. In the preferred embodiment of the present invention, the RF link is comprised of spread-spectrum transmissions using a polling protocol. Although a polling protocol is preferred, a carrier-sense multiple-access (CSMA), busy-tone, or any other protocol might also manage the communication traffic on the RF link.

HELLO packets contain 1) the address of the sender, 2) the hopping distance that the sender is from the root, 3) a source address, 4) a count of nodes in the subtree which flow through that bridge, and 5) a list of system parameters. Each node in the network is assigned a unique network service address and a node-type identifier to distinguish between different nodes and different node types. The distance of a node from the root node is measured in hops times the bandwidth of each hop. The gateway root is considered to be zero hops away from itself. The unattached bridges are in a LISTEN state. During the LISTEN state, a bridge will listen to the HELLO messages that are broadcast. By listening to the HELLO messages, bridges can learn which nodes are attached to the spanning tree. The unattached bridges analyze the contents of the HELLO messages to determine whether to request attachment to the broadcasting node. In the preferred embodiment, a bridge attempts to attach to the node that is logically closest to the root node. In the preferred embodiment, the logical distance is based upon the number of hops needed to reach the root node and the bandwidth of those hops. The distance the attached node is away from the root node is found in the second field of the HELLO message that is broadcast.

In another embodiment of the present invention, the bridges consider the number of nodes attached to the attached node as well as the logical distance of the attached node from the root node. If an attached node is overloaded with other attached nodes, the unattached bridge may request attachment to a less loaded node.

After attaching to an attached node, the newly attached bridge (the child) must determine its distance from the root node. To arrive at the distance of the child from the root node, the child adds the broadcast distance of its parent from the root node to the distance of the child from its parent. In the preferred embodiment, the distance of a child from its parent is based on the bandwidth of the data communication link. For example, if the child attaches to its parent via a hard-wired link (data rate 26,000 baud), then the distance of that communication link might equal, for example, one hop. However, if the child attaches to its parent via an RF link (data rate 9600 baud), then the distance of that communication link might correspondingly be equal 3 hops. The number of the hop corresponds directly to the communication speed of the link. This may not only take into consideration baud rate, but also such factors as channel interference.

Initially, only the root gateway node 920 is broadcasting HELLO messages and only nodes 940, 942 and 944 are within range of the HELLO messages broadcast by the gateway. Therefore, after the listening period has expired, nodes 940, 942 and 944 request attachment to the gateway node 920. The unattached nodes 940, 942 and 944 send ATTACH.request packets and the attached gateway node 920 acknowledges the ATTACH.request packets with local ATTACH.confirm packets. The newly attached bridges are assigned the status ATTACHED and begin broadcasting their own HELLO packets, looking for other unattached bridges. Again, the remaining unattached nodes attempt to attach to the attached nodes that are logically closest to the root node. For example, node 948 is within range of HELLO messages from both nodes 940 and 942. However, node 940 is three hops, via an RF link, away from the gateway root node 920 and node 942 is only one hop, via a hard-wired link, away from the gateway root node 920. Therefore, node 948 attaches to node 942, the closest node to the gateway root node 920.

The sending of HELLO messages, ATTACH.request packets and ATTACH.confirm packets continues until the entire spanning tree is established. In addition, attached bridges may also respond to HELLO messages. If a HELLO message indicates that a much closer route to the root node is available, the attached bridge sends a DETACH packet to its old parent and an ATTACH.request packet to the closer node. To avoid instability in the system and to avoid overloading any given node, an attached bridge would only respond to a HELLO message if the hop count in a HELLO packet is greater than a certain threshold value, CHANGE_THRESHOLD. In the preferred embodiment, the value of the CHANGE_THRESHOLD equals 3. In this manner, an optimal spanning tree is formed that is capable of transmitting data without looping.

Nodes, other than the gateway root node, after acknowledging an ATTACH.request packet from a previously unattached node, will send the ATTACH.request packet up the branches of the spanning tree to the gateway root node. As the ATTACH.request packet is being sent to the gateway root node, other nodes attached on the same branch record the destination of the newly attached node in their routing entry table. When the ATTACH.request packet reaches the gateway root node, the gateway root node returns an end-to-end ATTACH.confirm packet.

After the spanning tree is initialized, the RF terminals listen for periodically broadcasted Hello packets to determine which attached nodes are in range. After receiving HELLO messages from attached nodes, an RF terminal responding to an appropriate poll sends an ATTACH.request packet to attach to the node logically closest to the root. For example, RF terminal 9110 is physically closer to node 944. However, node 944 is three hops, via an RF link, away from the gateway root node 920 and node 942 is only one hop, via a hard-wired link, away from the gateway root node 920. Therefore, RF terminal 9110, after hearing HELLO messages from both nodes 942 and 944, attaches to node 942, the closest node to the gateway root node 920. Similarly, RF terminal 114 hears HELLO messages from nodes 948 and 950. Nodes 948 and 950 are both four hops away from the gateway root node 920. However, node 948 has two RF terminals 9110 and 9112 already attached to it while node 950 has only one RF terminal 9116 attached to it. Therefore, RF terminal 9114 will attach to node 950, the least busy node of equal distance to the gateway root node 920.

The attached node acknowledges the ATTACH.request and sends the ATTACH.request packet to the gateway root node. Then, the gateway root node returns an end-to-end ATTACH.confirm packet. In this manner, the end-to-end ATTACH.request functions as a discovery packet enabling the gateway root node, and all other nodes along the same branch, to learn the address of the RF terminal quickly. This process is called backward learning. Nodes learn the addresses of terminals by monitoring the traffic from terminals to the root. If a packet arrives from a terminal that is not contained in the routing table of the node, an entry is made in the routing table. The entry includes the terminal address and the address of the node that sent the packet. In addition, an entry timer is set for that terminal. The entry timer is used to determine when RF terminals are actively using the attached node. Nodes maintain entries only for terminals that are actively using the node for communication. If the entry timer expires due to lack of communication, the RF terminal entry is purged from the routing table.

The RF links among the RF terminals, the bridges, and the gateway are often lost. Therefore, a connection-oriented data-link service is used to maintain the logical node-to-node links. In the absence of network traffic, periodic messages are sent and received to ensure the stability of the RF link. As a result, the loss of a link is quickly detected and the RF Network can attempt to establish a new RF link before data transmission from the host computer to an RF terminal is adversely affected.

Communication between terminals and the host computer is accomplished by using the resulting RF Network. To communicate with the host computer, an RF terminal sends a data packet in response to a poll from the bridge closest to the host computer. Typically, the RF terminal is attached to the bridge closest to the host computer. However, RF terminals are constantly listening for HELLO and polling messages from other bridges and may attach to, and then communicate with, a bridge in the table of bridges that is closer to the particular RF terminal. Under certain operating conditions, duplicate data packets can be transmitted in the RF Network. For example, it is possible for an RF terminal to transmit a data packet to its attached node, for the node to transmit the acknowledgment frame, and for the RF terminal not to receive the acknowledgment. Under such circumstances, the RF terminal will retransmit the data. If the duplicate data packet is updated into the database of the host computer, the database would become corrupt. Therefore, the RF Network of the present invention detects duplicate data packets. To ensure data integrity, each set of data transmissions receives a sequence number. The sequence numbers are continuously incremented, and duplicate sequence numbers are not accepted.

When a bridge receives a data packet from a terminal directed to the host computer, the bridge forwards the data packet to the parent node on the branch. The parent node then forwards the data packet to its parent node. The forwarding of the data packet continues until the gateway root node receives the data packet and sends it to the host computer. Similarly, when a packet arrives at a node from the host computer directed to an RF terminal, the node checks its routing entry table and forwards the data packet to its child node which is along the branch destined for the RF terminal. It is not necessary for the nodes along the branch containing the RF terminal to know the ultimate location of the RF terminal. The forwarding of the data packet continues until the data packet reaches the final node on the branch, which then forwards the data packet directly to the terminal itself.

Communication is also possible between RF terminals. To communicate with another RF terminal, the RF terminal sends a data packet to its attached bridge. When the bridge receives the data packet from a terminal directed to the host computer, the bridge checks to see if the destination address of the RF terminal is located within its routing table. If it is, the bridge simply sends the message to the intended RF terminal. If not, the bridge forwards the data packet to its parent node. The forwarding of the data packet up the branch continues until a common parent between the RF terminals is found. Then, the common parent (often the gateway node itself) sends the data packet to the intended RF terminal via the branches of the RF Network.

During the normal operation of the RF Network, RF terminals can become lost or unattached to their attached node. If an RF terminal becomes unattached, for whatever reason, its routing entry is purged and the RF terminal listens for HELLO or polling messages from any attached nodes in range. After receiving HELLO or polling messages from attached nodes, the RF terminal sends an ATTACH.request packet to the attached node closest to the root. That attached node acknowledges the ATTACH.request and sends the ATTACH.request packet onto the gateway root node. Then, the gateway root node returns an end-to-end ATTACH.confirm packet.

Bridges can also become lost or unattached during normal operations of the RF Network. If a bridge becomes lost or unattached, all routing entries containing the bridge are purged. The bridge then broadcasts a HELLO.request with a global bridge destination address. Attached nodes will broadcast HELLO packets immediately if they receive an ATTACH.request packet with a global destination address. This helps the lost node reattach. Then, the bridge enters the LISTEN state to learn which attached nodes are within range. The unattached bridge analyzes the contents of broadcast HELLO messages to determine whether to request attachment to the broadcasting node. Again, the bridge attempts to attach to the node that is logically closest to the root node. After attaching to the closest node, the bridge begins broadcasting HELLO messages to solicit ATTACH-.requests from other nodes or RF terminals.

The spread-spectrum system provides a hierarchical radio frequency network of on-line terminals for data entry and message transfer in a mobile environment. The network is characterized by sporadic data traffic over multiple-hop data paths consisting of RS485 or ethernet wired links and single-channel direct sequenced spread spectrum links. The network architecture is complicated by moving, hidden, and sleeping nodes. The spread spectrum system consists of the following types of devices:

Terminal controller—A gateway which passes messages from a host port to the RF network; and which passes messages from the network to the host port. The host port (directly or indirectly) provides a link between the controller and a "host" computer to which the terminals are logically attached.

Base station—An intermediate relay node which is used to extend the range of the controller node. Base station-to-controller or base station-to-base station links can be wired or wireless RF.

Terminal—Norand RF hand-held terminals, printers, etc. In addition, a controller device has a terminal component.

The devices are logically organized as nodes in an (optimal) spanning tree, with the controller at the root, internal nodes in base stations or controllers on branches of the tree, and terminal nodes as (possibly mobile) leaves on the tree. Like a sink tree, nodes closer to the root of the spanning tree are said to be "downstream" from nodes which are further away. Conversely, all nodes are "upstream" from the root. Packets are only sent along branches of the spanning tree. Nodes in the network use a "BACKWARD LEARNING" technique to route packets along the branches of the spanning tree.

Devices in the spanning tree are logically categorized as one of the following three node types:

1) Root (or root bridge)—A controller device which functions as the root bridge of the network spanning tree. In the preferred embodiment, the spanning tree has a single root node. Initially, all controllers are root candidates from which a root node is selected. This selection may be based on the hopping distance to the host, preset priority, random selection, etc.

2) Bridge—An internal node in the spanning tree which is used to bridge terminal nodes together into an interconnected network. The root node is also considered a bridge and the term "bridge" may be used to refer to all non-terminal nodes or all non-terminal nodes except the root, depending on the context herein. A bridge node consists of a network interface function and a routing function.

3) Terminal—leaf node in the spanning tree. A terminal node can be viewed as the software entity that terminates a branch in the spanning tree.

A controller device contains a terminal node(s) and a bridge node. The bridge node is the root node if the controller is functioning as the root bridge. A base station contains a bridge node. A terminal device contains a terminal node and must have a network interface function. A "bridging entity" refers to a bridge node or to the network interface function in a terminal.

The basic requirements of the system are the following.

a) Wired or wireless node connections.

b) Network layer transparency.

c) Dynamic/automatic network routing configuration.

d) Terminal mobility. Terminals should be able to move about the RF network without losing an end-to-end connection.

e) Ability to accommodate sleeping terminals.

f) Ability to locate terminals quickly.

g) Built-in redundancy. Lost nodes should have minimal impact on the network.

h) Physical link independence. The bridging algorithm is consistent across heterogeneous physical links.

The software for the spread-spectrum system is functionally layered as follows.

Medium Access Control (MAC)

The MAC layer is responsible for providing reliable transmission between any two nodes in the network (i.e. terminal-to-bridge). The MAC has a channel access control component and a link control component. The link control component facilitates and regulates point-to-point frame transfers in the absence of collision detection. The MAC channel access control component regulates access to the network. Note that herein, the MAC layer is also referred to as the Data Link layer.

Bridging Layer

The bridging layer, which is also referred to herein as the network layer, has several functions as follows.

1. The bridging layer uses a "HELLO protocol" to organize nodes in the network into an optimal spanning tree rooted at the root bridge. The spanning tree is used to prevent loops in the topology. Interior branches of the spanning tree are relatively stable (i.e. controller and relay stations do not move often). Terminals, which are leaves on the spanning three, may become unattached, and must be reattached, frequently.

2. The bridging layer routes packets from terminals to the host, from the host to terminals, and from terminals to terminals along branches of the spanning tree.

3. The bridging layer provides a service for storing packets for SLEEPING terminals. Packets which cannot be delivered immediately can be saved by the bridging entity in a parent node for one or more HELLO times.

4. The bridging layer propagates lost node information throughout the spanning tree.

5. The bridging layer maintains the spanning tree links.

6. The bridging layer distributes network interface addresses.

Logical Link Control Layer

A logical link control layer, also known herein as the Transport layer herein, is responsible for providing reliable transmission between any two nodes in the network (i.e., terminal-to-base station). The data-link layer provides a connection-oriented reliable service and a connectionless unreliable service. The reliable service detects and discards duplicate packets and retransmits lost packets. The unreliable services provides a datagram facility for upper layer protocols which provide a reliable end-to-end data path. The data-link layer provides ISO layer 2 services for terminal-to-host application sessions which run on top of an end-to-end terminal-to-host transport protocol. However, the data-link layer provides transport (ISO layer 4) services for sessions contained within the SST network.

Higher Layers

For terminal-to-terminal sessions contained within the SST network, the data-link layer provides transport layer services and no additional network or transport layer is required. In this case, the MAC, bridging, and data-link layers discussed above can be viewed as a data-link layer, a network layer, and a transport layer, respectively. For terminal-to-host-application sessions, higher ISO layers exist on top of the SST data-link layer and must be implemented in the terminal and host computer, as required. This document does not define (or restrict) those layers. This document does discuss a fast-connect VMTP-like transport protocol which is used for transient internal terminal-to-terminal sessions.

Specifically, a network layer has several functions, as follows.

1) The network layer uses a "hello protocol" to organize nodes in the network into an optimal spanning tree rooted at the controller. (A spanning tree is required to prevent loops in the topology.) Interior branches of the spanning tree are relatively stable (i.e., the controller and base stations do not move often). Terminals, which are leaves on the spanning tree, become unattached, and must be reattached frequently.

2) The network layer routes messages from terminals to the host, from the host to terminals, and from terminals to terminals along branches of the spanning tree.

3) The network layer provides a service for storing messages for SLEEPING terminals. Messages which cannot be delivered immediately can be saved by the network entity in a parent node for one or more hello times.

4) The network layer propagates lost node information throughout the spanning tree.

5) The network layer maintains the spanning tree links in the absence of regular data traffic.

A transport layer is responsible for establishing and maintaining a reliable end-to-end data path between transport access points in any two nodes in the network. The transport layer provides unreliable, reliable and a transaction-oriented services. The transport layer should be immune to implementation changes in the network layer.

The responsibilities of the transport layer include the following.

1) Establishing and maintaining TCP-like connections for reliable root-to-terminal data transmission.

2) Maintaining VMTP-like transaction records for reliable transient message passing between any two nodes.

3) Detecting and discarding duplicate packets.

4) Retransmitting lost packets.

Layers 1 through 4 are self-contained within the Norand RF network, and are independent of the host computer and of terminal applications. The session layer (and any higher layers) are dependent on specific applications. Therefore, the session protocol (and higher protocols) must be implemented as required. Note that a single transport access point is sufficient to handle single sessions with multiple nodes. Multiple concurrent sessions between any two nodes could be handled with a session identifier in a session header.

Network address requirements are as follows. DLC framed contain a hop destination and source address in the DLC header, network packets contain an end-to-end destination and a source address in the network header. Transport messages do not contain an address field; instead, a transport connection is defined by network layer source and destination address pairs. Multiple transport connections require multiple network address pairs.

The transport header contains a TRANSPORT ACCESS POINT identifier. DLC and network addresses are consistent and have the same format. Each node has a unique LONG ADDRESS which is programmed into the node at the factory. The long address is used only to obtain a SHORT ADDRESS from the root node.

The network entity in each node obtains a SHORT ADDRESS from the root node, which identifies the node uniquely. The network entity passes the short address to the DLC entity. Short addresses are used to minimize packet sizes.

Short addresses consist of the following. There is: an address length bit (short or long).

a spanning tree identified.

a node-type identifier. Node types are well known.

a unique multi-cast or broadcast node identifier.

The node-identifier parts of root addresses are well known and are constant. A default spanning tree identifier is well known by all nodes. A non-default spanning tree identifier can be entered into the root node (i.e., by a network administrator) and advertised to all other nodes in "hello" packets. The list of non-default spanning trees to which other nodes can attach must be entered into each node.

A node-type identifier of all 1's is used to specify all node types. A node identifier of all 1's is used to specify all nodes of the specified type. A DLC identifier of all 0's is used to specify a DLC entity which does not yet have an address. The all-0's address is used in DLC frames that are used to send and receive network ADDRESS packets. (The network entity in each node filters ADDRESS packets based on the network address.)

Short-address allocation is accomplished as follows. Short node identifiers of root nodes are well known. All other nodes must obtain a short node identifier from the root. To obtain a short address, a node send an ADDRESS request packet to the root node. The source addresses (i.e., DLC and network) in the request packet are LONG ADDRESSES. The root maintains an address queue of used and unused SHORT ADDRESSES. If possible, the root selects an available short address, associates the short address with the long address of the requesting node, and returns the short address to the requesting node in an ADDRESS acknowledge packet. (Note that the destination address in the acknowledge packet is a long address.)

A node must obtain a (new) short address initially and whenever an ADDRESS-TIMEOUT inactivity period expires without having the node receive a packet from the network entity in the root.

The network entity in the root maintains addresses in the address queue in least recently used order. Whenever a packet is received, the source address is moved to the end of the queue. The address at the head of the queue is available for use by a requesting node if it has never been used or if it has been inactive for a MAX-ADDRESS-LIFE time period.

MAX-ADDRESS-LIFE must be larger than ADDRESS-TIMEOUT to ensure that an address is not in use by any node when it becomes available for another node. If the root receives an ADDRESS request from a source for which an entry exists in the address queue, the root simply updates the queue and returns the old address.

The network layer organizes nodes into an optimal spanning tree with the controller at the root of the tree. (Note that the spanning three identifier allows two logical trees to exist in the same coverage area.) Spanning tree organization is facilitated with a HELLO protocol which allows nodes to determine the shortest path to the root before attaching to the spanning tree. All messages are routed along branches of the spanning tree.

Nodes in the network are generally categorized as ATTACHED or UNATTACHED. Initially, only the root node is attached. A single controller may be designated as the root, or multiple root candidates (i.e. controllers) may negotiate to determine which node is the root. Attached bridge nodes and root candidates transmit "HELLO" packets at calculated intervals. The HELLO packets include:

a) the source address, which includes the spanning tree ID).

b) a broadcast destination address.

c) a "seed" value from which the time schedule of future hello messages can be calculated.

d) a hello slot displacement time specifying an actual variation that will occur in the scheduled arrival of the very next hello message (the scheduled arrival being calculated from the "seed").

e) the distance (i.e., path cost) of the transmitter from the host. The incremental portion of the distance between a node and its parent is primarily a function of the type of physical link (i.e., ethernet, RS485, RF, or the like). If a signal-strength indicator is available, connections are biased toward the link with the best signal strength. The distance component is intended to bias path selection toward (i.e., wired) high-speed connections. Setting a minimum signal strength threshold helps prevent sporadic changes in the network. In addition, connections can be biased to balance the load (i.e., the number of children) on a parent node.

f) a pending message list. Pending message lists consist of 0 or more destination-address/message-length pairs. Pending messages for terminals are stored in the terminal's parent node.

g) a detached-node list. Detached-node lists contain the addresses of nodes which have detached from the spanning tree. The root maintains two lists. A private list consists of all detached node addresses, and an advertised list consists of the addresses of all detached nodes which have pending transport messages. The addresses in the hello packet are equivalent to the advertised list.

An internal node learns which entries should be in its list from hello messages transmitted by its parent node. The root node builds its detached-node lists from information received in DETACH packets. Entries are included in hello messages for DETACH-MSG-LIFE hello times.

Attached notes broadcast "SHORT HELLO" messages immediately if they receive an "HELLO.request" packet with a global destination address; otherwise, attached nodes will only broadcast hello messages at calculated time intervals in "hello slots." Short hello messages do not contain a pending-message or detached-node list. Short hello messages are sent independently of regular hello messages and do not affect regular hello timing.

Unattached nodes (nodes without a parent in the spanning tree) are, initially, in an "UNATTACHED LISTEN" state. During the listen state, a node learns which attached base station/controller is closest to the root node by listening to hello messages. After the listening period expires an unattached node sends an ATTACH.request packet to the attached node closest to the root. The attached node immediately acknowledges the ATTACH.request, and send the ATTACH.request packet onto the root (controller) node. The root node returns the request as an end-to-end ATTACH.confirm packet. If the newly-attached node is a base station, the node calculates its link distance and adds the distance to the distance of its parent before beginning to transmit hello messages.

The end-to-end ATTACH.request functions as a discovery packet, and enables the root node to learn the address of the source node quickly. The end-to-end ATTACH.request, when sent from a node to the root, does not always travel the entire distance. When a downstream node receives an ATTACH.request packet and already has a correct routing entry for the associated node, the downstream node intercepts the request and returns the ATTACH.confirm to the source node. (Note that any data piggy-backed on the ATTACH.request packet must still be forwarded to the host.) This situation occurs whenever a "new" path has more than one node in common with the "old" path.

The LISTEN state ends after MIN_HELLO hello time slots if hello messages have been received from at least one node. If no hello messages have been received the listening node waits and retries later.

An attached node may respond to a hello message from a node other than its parent (i.e., with an ATTACH.request) if the difference in the hop count specified in the hello packet exceeds a CHANGE-THRESHOLD level.

Unattached nodes may broadcast a GLOBAL ATTACH.request with a multi-cast base station destination address to solicit short hello messages from attached base stations. The net effect is that the LISTEN state may (optionally) be shortened. (Note that only attached base station or the controller may respond to ATTACH.requests.) Normally, this facility is reserved for base stations with children and terminals with transactions in progress.

ATTACH.requests contain a (possibly empty) CHILD LIST, to enable internal nodes to update their routing tables. ATTACH.requests also contain "count" field which indicates that a terminal may be SLEEPING. The network entity in the parent of a SLEEPING terminal con temporarily store messages (for later delivery. If the count field is non-zero, the network entity in a parent node will store pending messages until 1) the message is delivered, or 2) "count" hello times have expired.

Transport layer data can be piggy-backed on an attached request packet from a terminal. (i.e., an attach request/ confirm can be implemented with a bit flag in the network header of a data packet.)

Network Layer Routing

All messages are routed along branches of the spanning tree. Base stations "learn" the address of terminals by monitoring traffic from terminals (i.e., to the root). When a base station receives (i.e., an ATTACH.request) packet, destined for the root, the base station creates or updates an entry in its routing table for the terminal. The entry includes the terminal address, and the address of the base station which sent the packet (i.e., the hop address). When a base station receives an upstream packet (i.e., from the root, destined for a terminal) the packet is simply forwarded to the base station which is in the routing entry for the destination. Upstream messages (i.e., to a terminal) are discarded whenever a routing entry does not exist. Downstream messages (i.e., from a terminal to the root) are simply forwarded to the next downstream node (i.e., the parent in the branch of the spanning tree.

TERMINAL-TO-TERMINAL COMMUNICATIONS is accomplished by routing all terminal-to-terminal traffic through the nearest common ancestor. In the worst case, the root is the nearest common ancestor. A ADDRESS SERVERS facilitates terminal-to-terminal communications (see below).

DELETING INVALID ROUTING TABLE ENTRIES is accomplished in several ways: connection oriented transport layer ensures that packets will arrive from nodes attached to the branch of the spanning tree within the timeout period, unless a node is disconnected.)

2) Whenever the DLC entity in a parent fails RETRY MAX times to send a message to a child node, the node is logically disconnected from the spanning tree, with one exception. If the child is a SLEEPING terminal, the message is retained by the network entity in the parent for "count" hello times. The parent immediately attempts to deliver the message after it sends its next hello packet. If, after "count" hello times, the message cannot be delivered, then the child is logically detached from the spanning tree. Detached node information is propagated downstream to the root node, each node in the path of the DETACH packet must adjust its routing tables appropriately according to the following rules: a) if the lost node is a child terminal node, the routing entry for the terminal is deleted and a DETACH packet is generated, b) if the node specified in DETACH packet is a terminal and the node which delivered the packet is the next hop in the path to the terminal, then the routing table entry for the terminal is deleted and the DETACH packet is forwarded, c) if the lost node is a child base station node then all routing entries which specify that base station as the next hop are deleted and a DETACH packet is generated for each lost terminal.

IN GENERAL, WHENEVER A NODE DISCOVERS THAT A TERMINAL IS DETACHED, IT PURGES ITS ROUTING ENTRY FOR THE TERMINAL. WHENEVER A NODE DISCOVERS THAT A BASE STATION IS DETACHED, IT PURGES ALL ROUTING ENTRIES CONTAINING THE BASE STATION. ONLY ENTRIES FOR UPSTREAM NODES ARE DELETED.

When DETACH packets reach the root node, they are added to a "detached list." Nodes remain in the root node's detached list until a) the node reattaches to the spanning tree, or b) the list entry times out. The detached list is included in hello messages and is propagated throughout the spanning tree.

For example, if a terminal detaches and reattaches to a different branch in the spanning tree, all downstream nodes in the new branch (quickly) "learn" the new path to the terminal. Nodes which were also in the old path change their routing tables and no longer forward packets along the old path. At least one node, the root, must be in both the old and new path. A new path is established as soon as an end-to-end attach request packet from the terminal reaches a node which was also in the old path.

4) A node (quickly) learns that it is detached whenever it receives a hello message, from any node, with its address in the associated detached list. The detached node can, optionally, send a global ATTACH.request, and then enters the UNATTACHED LISTEN state and reattaches as described above. After reattaching, the node must remain in a HOLD-DOWN state until its address is aged out of all detached lists. During the HOLD-DOWN state the node ignores detached lists.

5) A node becomes disconnected and enters the UNATTACHED LISTEN state whenever HELLO-RETRY-MAX hello messages are missed from its parent node.

6) A node enters the ATTACHED LISTEN state whenever a single hello message, from its parent, is missed. SLEEPING terminals remain awake during the ATTACHED LISTEN state. The state ends when the terminal receives a data or hello message from its parent. The terminal becomes UNATTACHED when a) its address appears in the detached list of a hello message from an ode other than its parent, or b) HELLO-RETRY-MAX hello messages are missed. The total number of hello slots spend in the LISTEN state is constant.

If a node in the ATTACHED LISTEN state discovers a path to the root which is CHANGE-THRESHOLD shorter, it can attach to the shorter path. Periodically, SLEEPING terminals must enter the ATTACHED LEARN state to discovery any changes (i.e., shorter paths) in the network topology.

Hello Synchronization

All attached non-terminal nodes broadcast periodic "hello" messages in discrete "hello slots" at calculated intervals. Base station nodes learn which hello slots are busy and refrain from transmitting during busy hello slots.

A terminal refrains from transmitting during the hello slot of its parent node and refrains from transmitting during message slots reserved in a hello message.

The hello message contains a "seed" field used in a well-known randomization algorithm to determine the next hello slot for the transmitting node and the next seed. The address of the transmitting node is used as a factor in the algorithm to guarantee randomization. Nodes can execute the algorithm i times to determine the time (and seed) if the i-the hello message from the transmitter.

After attached, a base station chooses a random initial seed and a non-busy hello slot and broadcasts a hello message in that slot. The base station chooses succeeding hello slots by executing the randomization algorithm. If an execution of the algorithm chooses a busy slot, the next free slot is used and a hello displacement field indicates the offset from a calculated slot. Cumulative delays are not allowed (i.e., contention delays during the i hello transmission do not effect the time of the i+1 hello transmission).

HELLO-TIME and HELLO-SLOT-TIME values are set by the root node and flooded throughout the network in hello messages. The HELLO-SLOT-TIME value must be large enough to minimize hello contention.

A node initially synchronizes on a hello message from its parent. A SLEEPING node can power-down with an active timer interrupt to wake it just before the next expected hello message. The network entity in base station nodes can store messages for SLEEPING nodes and transmit them immediately following the hello messages. This implementation enables SLEEPING terminals to receive unsolicited messages. (Note that the network layer always tries to deliver messages immediately, before storing them.) Retries for pending messages are transmitted in a round-robin order when messages are pending for more than one destination.

Note that a child node that misses i hello messages, can calculate the time of the i+1 hello message.

Transport Layer Theory and Implementation Notes

The transport layer provides reliable, unreliable, and transaction-oriented services. Two types of transport connections are defined: 1) a TCP-like transport connection may be explicitly requested for long-lived connections or 2) a VMTP-like connection-record may be implicitly set up for transient connections. In addition, a connectionless service is provided for nodes which support an end-to-end transport connection with the host computer.

The interfaces to the next upper (i.e., application) layer include:

CONNECT (access_point, node_name)

LISTEN (access_point)

UNITDATA (access_point, node_name, buffer, length)

SEND (handle, buffer, length)

RECEIVE (handle, buffer, length)

CLOSE (handle)

The "handle" designates the connection type, and is the connection identifier for TCP-like connections.

SEND messages require a response from the network node (root or terminal) to which the message is directed.

UNITDATA messages do not require a response. UNITDATA is used to send messages to a host which is capable of supporting end-to-end host-to-terminal transport connections.

Because the network layer provides an unreliable service, the transport layer is required to detect duplicate packets and retransmit lost packets. Detecting duplicates is facilitated by numbering transport packets with unambiguous sequence numbers.

Transport Connections

TCP-like transport connections are used for message transmission over long-lived connections. The connections may be terminal-to-root or terminal-to-terminal (i.e., base stations are not involved in the transport connection).

TCP-like transport connections are established using a 3-way handshake. Each end selects its initial sequence number and acknowledges the other end's initial sequence number during the handshake. The node which initiates the connection must wait a MAX-PACKET-LIFE time, before requesting a connection, to guarantee that initial sequence numbers are unambiguous. Sequence numbers are incremented modulo MAX-SEQ, where MAX-SEQ is large enough to insure that duplicate sequence numbers do not exist in the network. Packet types for establishing and breaking connections are defined as in TCP.

A TCP-like connection is full-duplex and a sliding window is used to allow multiple outstanding transport packets. An ARQ bit in the transport header is used to require an immediate acknowledgment from the opposite end.

VMTP-like connections are used for transient messages (i.e. terminal-to-terminal mail messages). VMTP-like connection records are built automatically. A VMTP-like connection record is built (or updated), whenever a VMTP-like transport message is received. The advantage is that an explicit connection request is not required. The disadvantage is that longer and more carefully selected sequence numbers are required. A VMTP-like connection is half-duplex. (A full-duplex connection at a higher layer can be built with two independent half-duplex VMTP-like connections.) Acknowledgments must be handled by higher layers.

Transport connections are defined by the network end-to-end destination and source addresses.

A MAX_TP_LIFE timeout is associated with transport connections. Transport connection records are purged after a MAX_TP_LIFE time expires without activity on the connection. The transport entity in a terminal can ensure that its transport connection will not be lost by transmitting an empty time-fill transport packet whenever TP_TIMEOUT time expires without activity.

The transport entity in a node stores messages for possible retransmission. Note that retransmissions may not always follow the same path (primarily) due to moving terminals and the resulting changes in the spanning tree. For example, the network entity in a parent node may disconnect a child after the DLC entity reports a message delivery failure. The child will soon discover that it is detached and will reattach to the spanning tree. Now when the transport entity (i.e. in the root) re-sends the message, it will follow the new path.

Transport Message Timing and Sleeping Terminals

The transport entity in a terminal calculates a separate timeout for SEND and TRANSACTION operations. Initially, both timeouts are a function of the distance of the terminal from the root node.

A TCP-like algorithm is used to estimate the expected propagation delay for each message type. Messages, which require a response, are retransmitted if twice the expected propagation time expires before a response is received. SLEEPING terminals can power down for a large percentage of the expected propagation delay before waking up to receive the response message. Note that missed messages may be stored by the network layer for count hello times.

Medium Access Control (MAC) Theory and Implementation Notes

Access to the network communications channel is regulated in several ways: executing the full CSMA algorithm (see MAC layer above). The sender retransmits unacknowledged messages until a RETRY_MAX count is exhausted.

The retry time of the DLC must be relatively short so that lost nodes can be detected quickly. When the DLC layer reports a failure to deliver a message to the network layer, the network layer can 1) save messages for SLEEPING terminals for later attempts, or 2) DETACH the node from the spanning tree. Note that most lost nodes are due to moving terminals.

The node identifier part of the DLC address is initially all 0's for all nodes except the root node. The all 0's address is used by a node to send and received data-link frames until a unique node identifier is passed to the DLC entity in the node. (The unique node identifier is obtained by the network entity.)

Address Resolution

Well-known names too are bound to network addresses in several ways:

The network address and TRANSPORT ACCESS ID of a name server, contained in the root, is well-known by all nodes.

A node can register a well-known name with the name server contained in the root node.

A node can request the network access address of another application from the name server by using the well-known name of the application.

Possible Extensions

Base station-to-base station traffic could also be routed through the controller if the backward learning algorithm included base station nodes. (Each base station would simply have to remember which direction on its branch of the spanning tree to send data directed toward another base station.)

The possibility of multiple controllers is kept open by including a spanning-tree identifier in address fields. Each controller defines a unique spanning tree. A node can be in more than one spanning tree, with separate network state variables defined for each.

Appendix A attached hereto is a Master's Degree thesis entitled "Mobile Computer Network Architecture" by the Applicant and contains additional disclosure on the subject matter of this application.

Thus, the preferred embodiment of the present invention describes an apparatus and a method of efficiently routing data through a network of intermediate base stations in a radio data communication system.

In alternate embodiments of the present invention, the RF Networks contain multiple gateways. By including a system identifier in the address field of the nodes, it is possible to determine which nodes are connected to which networks.

Figure 2:
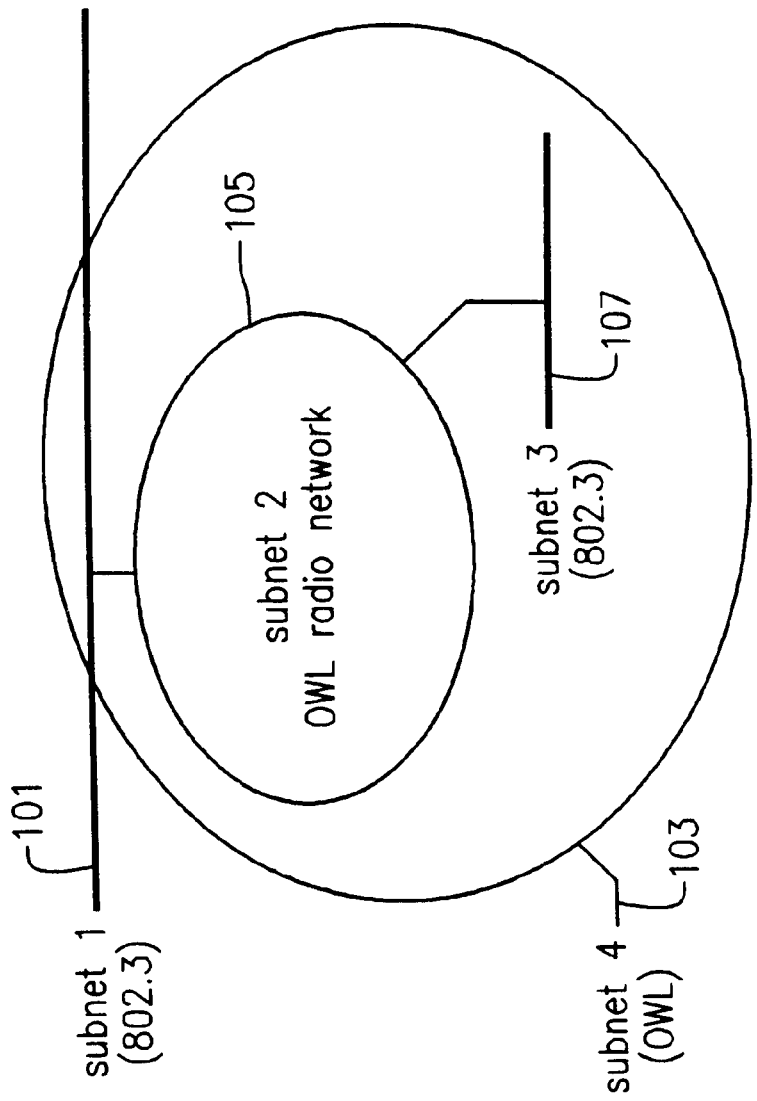
FIG. 2 illustrates the overall open wireless local area network (OWL) architecture according to the present invention.

FIG. 2 illustrates the overall open wireless local area network (OWL) architecture according to the present invention. Specifically, per IEEE (Institute of Electrical and Electronic Engineers) 802.3 Wired Local Area Network (LAN) Specifications, two subnets, a wired subnet 101 and a remote, wired subnet 107 are illustrated. The subnets 101 and 107 are wired LAN's built in accordance with the IEEE 802 specifications. According to the present invention, a third subnet, a wireless subnet 105, transparently interconnects the wired subnets 101 and 107. The wireless subnet 105 is referred to herein as an OWL radio network. Moreover, for reference herein, the wireless subnet 105 and the remote, wired subnet 107, together are referred to as an OWL subnet 103. Although, the wired subnet 101 is not part of the OWL subnet 103, it constitutes a distribution LAN for the OWL subnet 103.

Depending on the specific implementation, an OWL radio network can function (i) as a stand-alone LAN to support wireless communication between wireless communication devices, (ii) as a wireless subnet to a wired LAN to provide wireless access to and between wireless communication devices, (iii) as a wireless subnet to a wired LAN to provide access to remote wired subnets, or (iv) as a wireless subnet to a wired LAN to provide access between the wired LAN, remote wired subnets and wireless communication devices. For example, as illustrated, the wireless subnet 105 provides for communication between the wired subnet 101, the remote subnet 107, and wireless communication devices (not shown in FIG. 2) within the wireless subnet 105.

Figure 3:
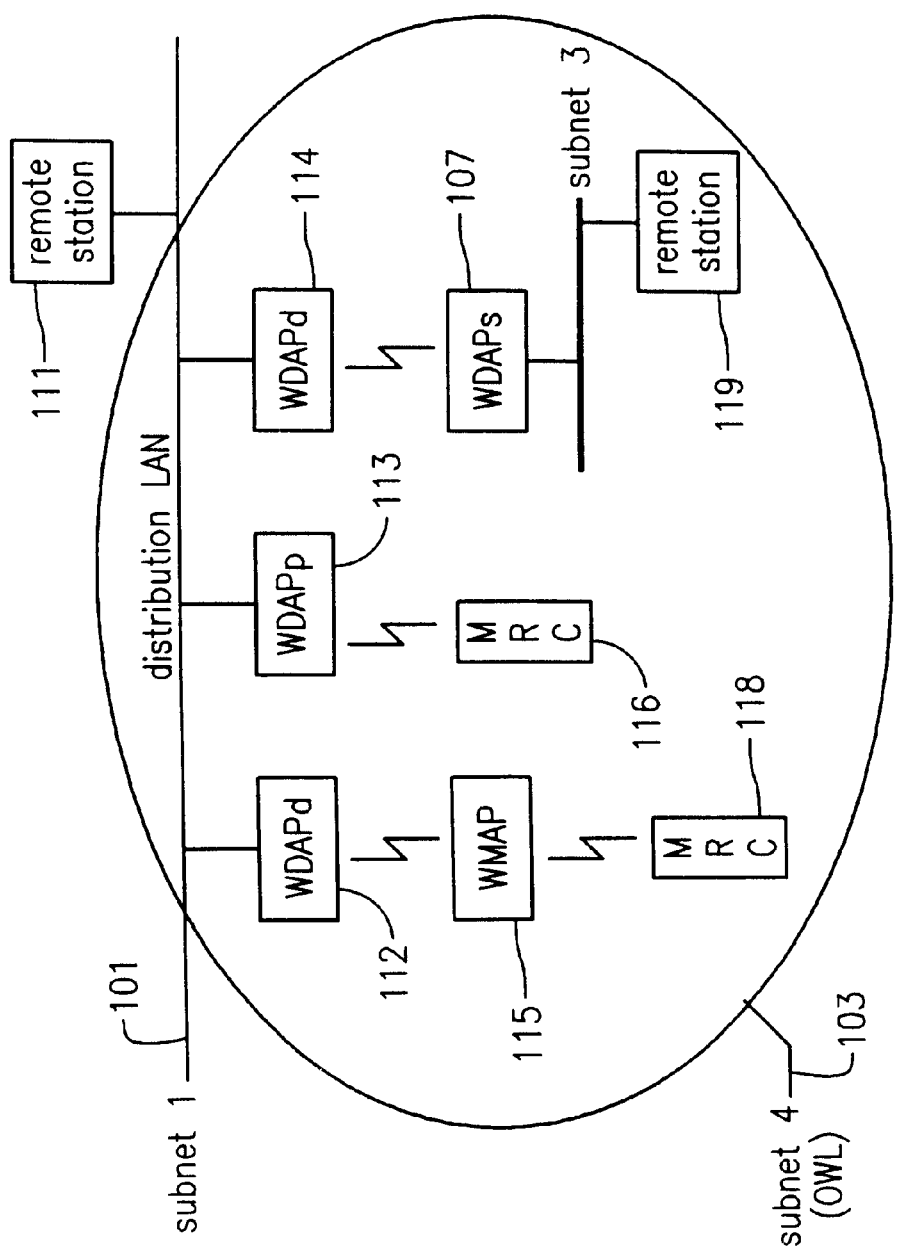
FIG. 3 shows an exemplary expanded configuration of FIG. 2, providing additional detail of the OWL radio network.

FIG. 3 shows an exemplary expanded configuration of FIG. 2, providing additional detail of the OWL radio network, the wireless subnet 105. The wireless subnet 105 provides access to the wired subnet 101, the remote wired subnet 107, and wireless communication devices, such as mobile radio-equipped computers (MRCs) 116 and 118. Other types of wireless communication devices include, but are not limited to, radio-equipped printers or other peripherals, stationary radio-equipped computers, pagers, etc. In addition, although radio frequency wireless communication is a preferred embodiment, other forms of wireless communication, such as infrared transmissions, might also be used.

The OWL radio network, such as the wireless subnet 105, provides for wireless transparent bridging via several types of wireless domain access points. In particular, each OWL subnet has a single primary wireless domain access point (WDAPp), such as the WDAPp 113. The WDAPp provides a single control point for the OWL subnet 103. The WDAPp 113 has direct access to the distribution LAN, i.e., the wired subnet 101. The WDAPp 113 forwards information, packaged in frames per IEEE 802 specification (hereinafter "802 frames"), between the wired subnet 101 and the wireless subnet 103.

In addition to a WDAPp, the OWL radio network may also be configured with one or more distributed wireless domain access points. As does the WDAPp, a distributed wireless domain access point (WDAPd) provides direct access to the wired subnet 101. However, each WDAPd in the network exists within the domain of its control point, the WDAPp. For example, as illustrated, within the domain of the WDAPp 113, a WDAPd 112 and a WDAPd 114 can be found. The WDAPd 112 and the WDAPd 114 forwards 802 frames between the wired subnet 101 and the OWL subnet 103.

As previously stated, an OWL subnet may also include wired subnets other than, and remotely located from, the distribution LAN, i.e., the wired subnet 101. For example, the wired subnet 107 represents one such remote wired subnets. Although only one is illustrated, many such remote wired subnets may exist in an OWL subnet 103.

Associated with each remote wired subnets, a secondary wireless domain access point (WDAPs) can be found. Each WDAPs serves as a bridge between a remote wired subnet and the OWL radio network. For example, a WDAPs 117 serves as a bridge between the remote wired subnet 107 and the wireless subnet 105. Thus, the WDAPs 117 forwards 802 frames between the remote wired subnet 107 and the wireless subnet 105.

As illustrated, a remote station 119 directly participates in the remote wired subnet 107 in conformance with IEEE 802 specifications. A remote station 111 similarly participates in the wired subnet 101. Each of the remote stations and wireless communication devices constitute "network nodes" in the OWL architecture. Moreover, any network node can freely communicate with any other network node. For example, the remote station 111 can freely intercommunicate with the remote station 119, MRC 116 and MRC 118. Similarly, the MRC 116 can communicate with the MRC 118 and the remote stations 111 and 119.

Wireless media access points are also used in the OWL radio network where needed. A wireless media access point (WMAP), such as a WMAP 115, is a radio equipped base station which extends the wireless coverage area of a OWL radio network, such as the wireless radio network 103, to support larger wireless coverage areas than might be desirable without the use of one or more WMAP's. A typical OWL radio network has multiple WMAP's with overlapping coverage areas. Thus, MRC's can roam between coverage areas and maintain network connectivity.

Similarly, communication need not always flow through the WDAPp 113. For example, the WDAPp 113 does not participate in the communication pathway between the MRC 118 and the remote station 119. The MRC 118 forwards communication destined for the remote station 119 downstream, toward the WDAPp 113. The WMAP 115 receives the communication, identifies no entry for the remote station 119 and, therefore, forwards the received communication downstream. The WDAPd 112 receives the communication, but does not find a routing table entry for the remote station 119. Thus, the WDAPd 112 converts the received communication into 802 frame(s) for forwarding outside of the radio network onto the wired subnet 101, i.e., upstream. The WDAPd 114 hears the 802 frame(s), identifies a routing table entry for the remote station 119, converts the 802 frame(s) for wireless transmission, and forwards the communication upstream. The WDAPs 117 receives the wireless communication, and bridges the communication onto the wired subnet 107 in the form of 802 frame(s). The remote station 119 receives the 802 frame(s), completing the transfer without participation from the WDAPp 113.

Figure 4:
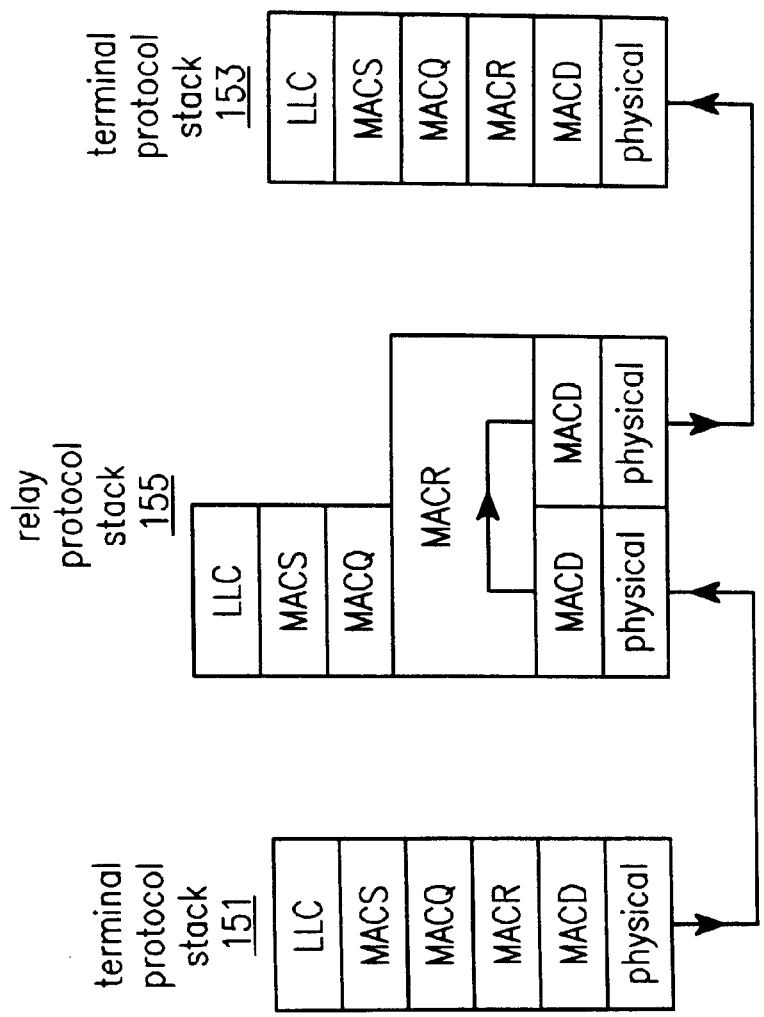
FIG. 4 illustrates the MAC protocol stacks used in an exemplary configuration of the present invention to provide for communication between two terminal nodes via a relay node.
Figure 5:
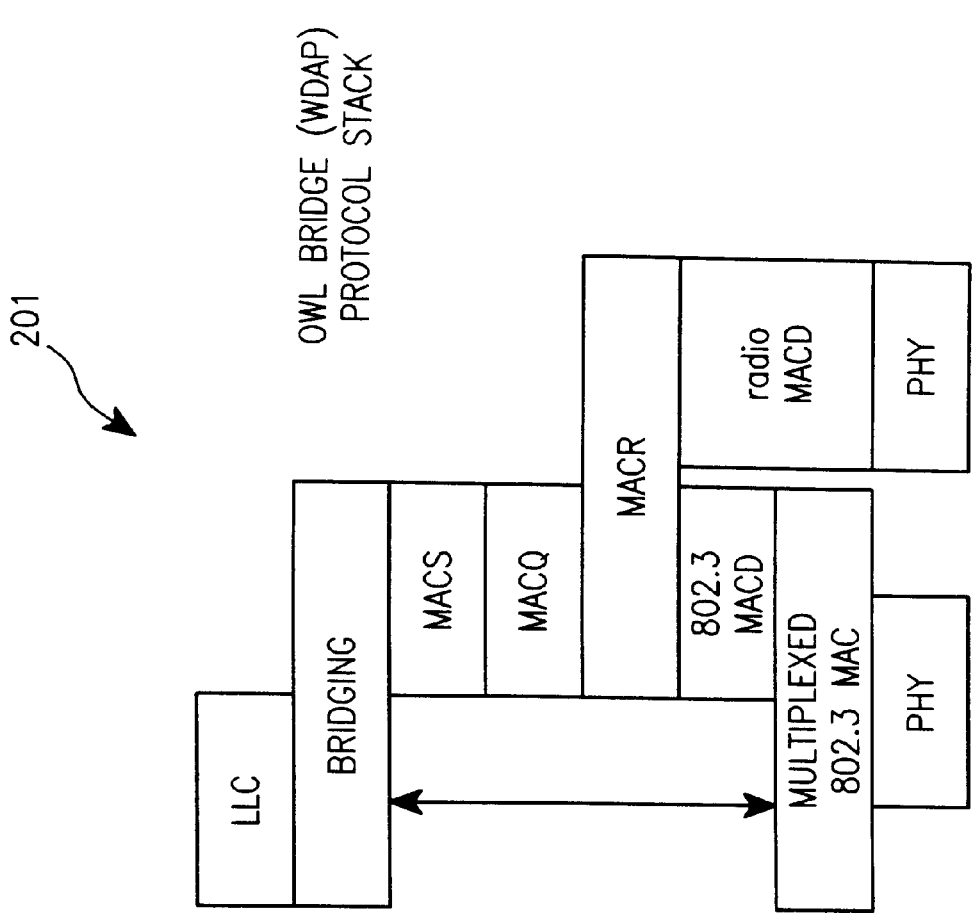
FIG. 5 illustrates an OWL bridge protocol stack used by each wireless domain access point (WDAP), an OWL bridge, to bridge the OWL radio network with an 802 type wired subnet, in an embodiment according to the present invention.
Figure 6:
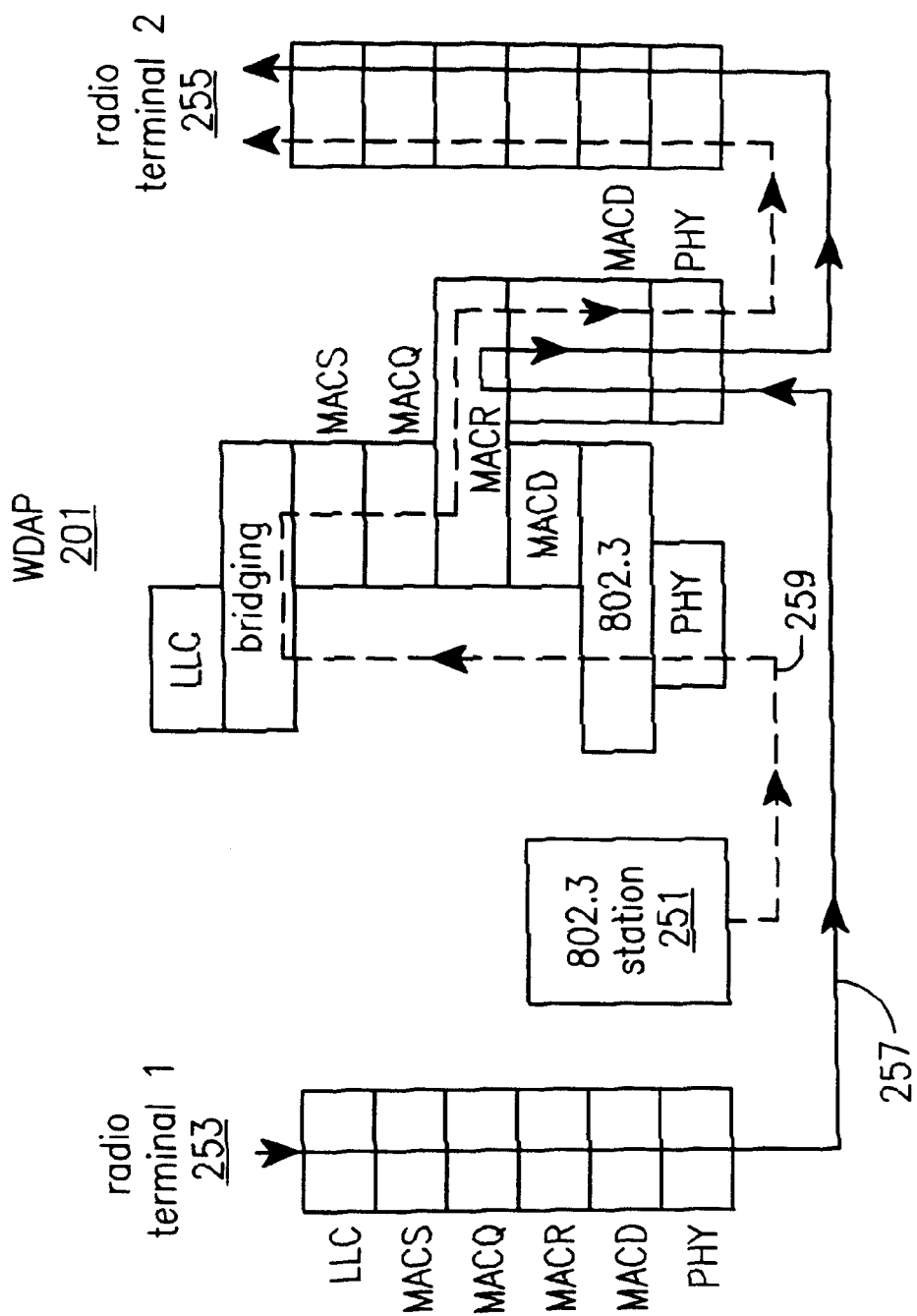
FIG. 6 is a data flow diagram illustrating how data flows through the bridge protocol stack of FIG. 5.

FIGS. 4–6 illustrates OWL protocol stacks according to the present invention which are contained in the MAC sub layer of a standard ISO protocol stack. In particular, an OWL MAC provides MAC sub layer services to the LLC sublayer of the ISO data link layer. The OWL MAC is subdivided into MAC-D, MAC-R, MAC-Q and MAC-S sublayers. The MAC-D sublayer is analogous to the data link layer in the ISO protocol stack. The MAC-D layer provides data link services to the MAC-R layer. It is responsible for channel access control and the reliable transmission of MAC-R PDU's. The MAC-R sublayer is analogous to the network layer in the ISO protocol stack. The MAC-R layer provides routing services to the MAC-Q layer. It is responsible for correctly routing information through the OWL subnet, which may include multiple hops and circular physical paths. Such information is formatted into MAC-R protocol data units (PDUs) for routing. The MAC-Q sublayer adds reliability to the radio network by retransmitting lost PDUs. The MAC-Q layer is responsible for discarding out-of-sequence and duplicate PDUs. The MAC-Q sublayer can be implemented as an entity in the MAC-R sublayer. The MAC-Q entities exist at entry points to the radio network. The MAC-S sublayer is responsible for providing services for security, compression, etc. The MAC-S entities exist at entry points to the OWL radio network.

As referred to herein, logical OWL nodes are MAC-R addressable entities in the OWL radio network. The logical OWL nodes functional entities which can be contained within the various network devices. A logical OWL node can be either a terminal node or a relay node. The terminal nodes are end points in the network. The MRC's 116 and 117 contain terminal nodes, i.e., an MRC contains the logical functionality of a terminal node. Relay nodes forward PDUs at the MAC-R sublayer. The WMAP 115, for example, contains a relay node.

FIG. 4 illustrates the MAC protocol stacks used in an exemplary configuration to provide for communication between two terminal nodes via a relay node. Each terminal node in the network contains a terminal protocol stack which defines the terminal node as a network end-point. Each relay node in the network also contains a protocol stack, the "relay protocol stack", which defines the relay node as a PDU forwarding entity.

For example, as illustrated, two terminal nodes may communicate with each other via a relay node. The arrows shown represent the flow of data from a first terminal node (using a terminal protocol stack 151) to a second terminal node (using a terminal protocol stack 153) via a relay node (using a relay protocol stack 155). The upper layers of the relay protocol stack 155 are used to process PDUs addressed to the relay node.

FIG. 5 illustrates another type of protocol stack used in the network. An OWL bridge protocol stack 201 is illustrated which is used by each wireless domain access point (WDAP), an OWL bridge, to bridge a wireless subnet to an 802 type wired subnet. Each bridge protocol stack, such as bridge protocol stack 201, contains a relay protocol stack. In addition, the 802.3 MAC-D sublayer is used to send OWL PDUs over an 802.3 link that is part of the OWL radio network. The MAC-Q and MAC-S sublayers serve as proxy MAC-Q and MAC-S entities for stations, such as the remote stations 111 and 119 (FIG. 1), on the 802.3 subnet. For convenience, the MAC-Q and MAC-S sublayers also service PDUs for the local WDAP 802 address.

FIG. 6 illustrates how data flows through the bridge protocol stack of FIG. 5. A dashed line 259 represents the path a PDU takes as it travels from a station 251 on an 802.3 LAN to a terminal 255 in the OWL radio network. A WDAP, using the bridge protocol stack 201, bridges the PDU from the 802.3 subnet to the radio subnet. A solid line 257 represents the path a PDU takes as it travels from a terminal 253 to the terminal 255 wherein both terminals are in the radio network. In this example, because the path is contained in the radio network, the PDU does not have to be bridged.

In general, PDUs are bridged across subnet boundaries, and PDUs are routed within the radio network. A bridging entity in a WDAP uses a forwarding database to determine if a PDU should be bridged from one subnet to another subnet. A forwarding database contains a list of 802 addresses associated with each subnet to which the WDAP is attached. A MAC-R entity uses a routing table to determine how a PDU should be routed within an OWL subnet.

Further detail regarding this embodiment can be found in the attached Appendices B and C. Appendix B provides further detail regarding the OWL network architecture, while Appendix C describes the network frame formats used in communication exchanges.

Figure 7:
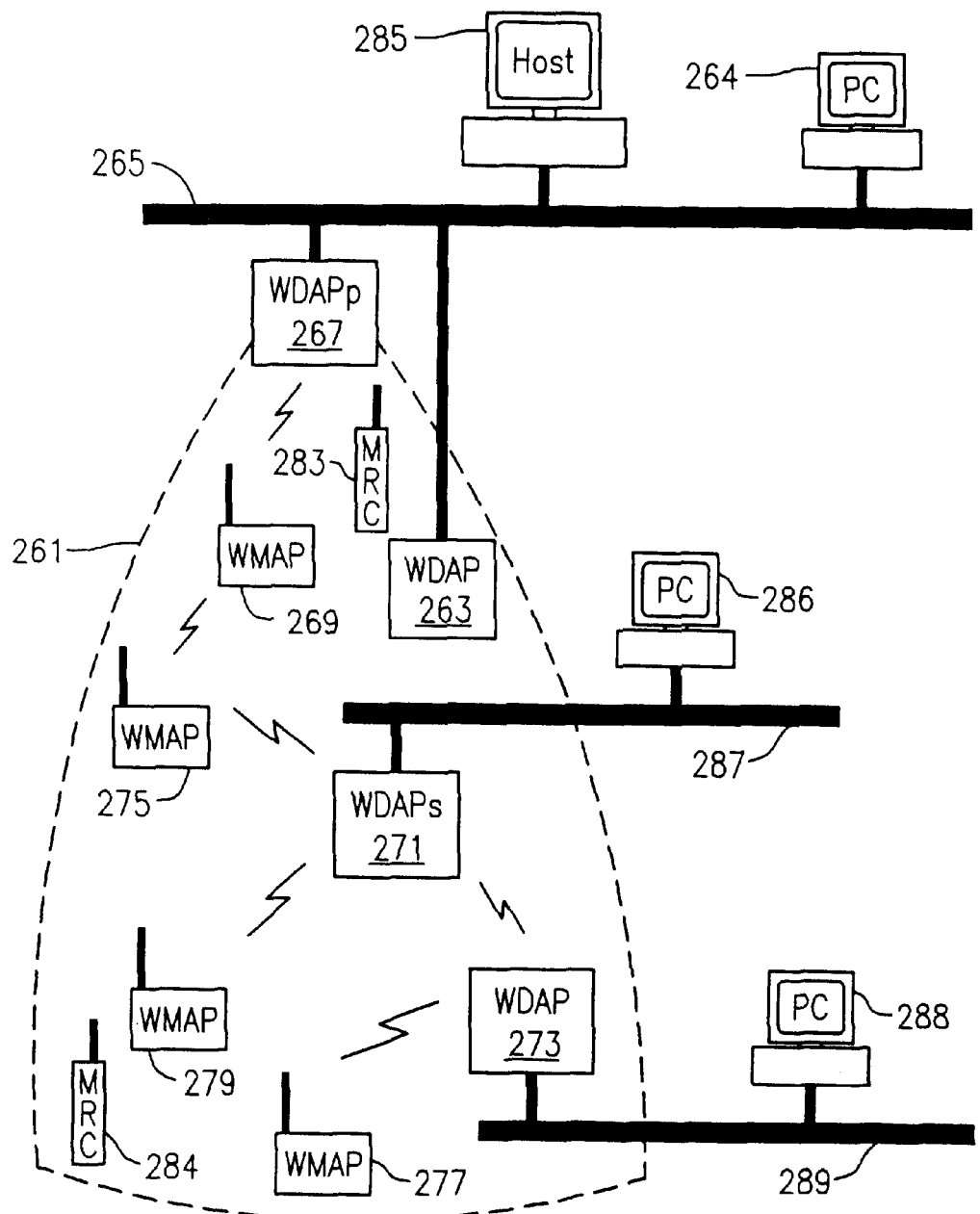
FIG. 7 illustrates an exemplary configuration of the OWL architecture according to one embodiment of the present invention.

FIG. 7 illustrates an exemplary configuration of the OWL architecture according to the present invention. Therein, a wired subnet 265 and remote wired subnets 287 and 289, are configured in accordance with IEEE 802 standards. A WDAPp 267, utilizing the bridging protocol stack shown in FIG. 5, acts as a spanning tree root node, providing access between an OWL radio network 261 and the wired subnet 265. Note that a WDAPd 263 is also illustrated which uses a bridging protocol stack. The WDAPd 263 could instead be used as the root of the spanning tree (becoming the network WDAPp) should the WDAPp break down. In addition, two exemplary remote stations, a host computer 285 and a personal computer 264, are connected to the wired subnet 265.

A WDAPs 271 constitutes an access point to and from the remote wired subnet 287. Similarly, a WDAPs 273 constitutes an access point to and from the remote wired subnet 289. Both WDAPs's utilize the bridge protocol stack of FIG. 4. Moreover, each remote wired subnet 287 and 289 illustrate the participation of a remote station, a personal computer 286 and 288, respectively. Also, wireless communication devices, such as an MRC 283 and an MRC 284, can move through the OWL radio network 261 while maintaining network connectivity. Any wireless communication device can communicate with any other wireless communication device or with any remote station. Similarly, any remote station can communicate with any other remote station or with any wireless communication device.

A plurality of intermediate wireless access points, i.e., the WMAP's 269, 275, 277 and 279, along with the wired access points, i.e., the WDAP's 267, 263, 271 and 273, providing for communication among any of the remote stations and wireless communication devices. Because WDAP's are wired to corresponding wired subnets, they are referred to herein as a "wired access points" even though WDAP's also participate wirelessly within the OWL radio network. Specifically, the plurality of intermediate wireless access points and the wired access points, together, form a spanning tree which provides for routing through the OWL radio network.

Specifically, nodes in an OWL radio network are organized into a network spanning tree. A WDAPp serves as a root of the spanning tree, while PDU's are routed along branches of the spanning tree. Routing toward the root is referred to herein as "downstream" routing. Routing away from the root is referred to as "upstream" routing. Referring to FIG. 7, the WDAPp 267 constitutes the root of the spanning tree formed within the OWL radio network 261. Communication flowing upstream, away from the WDAPp 267, might include a plurality of relay points along the way to reach a destination. For example, to reach the personal computer 286, data from the personal computer 264 first travels along the wired subnet 265 to the root of the spanning tree, i.e., to the WDAPp 267. The WDAPp 267, using a spanning tree routing table, identifies that the WMAP 269 is the next relay point upstream to the personal computer 286. Therefore, the WDAPp 267 forwards the data upstream to the WMAP 269. Upon receipt, the WMAP 269 similarly identifies the WMAP 275 and forwards the data upstream. In turn, the WMAP 275 forwards the data to the WDAPs 271. Finally, the WDAPs 271 relays the data along the remote wired subnet to the personal computer 286.

A spanning tree, which provides the data pathways throughout the OWL radio network, is stored and maintained by each participant in the OWL radio network. Each network node stores and modifies information which specifies how local communication traffic should flow. Optimal spanning trees assure efficient, adaptive (dynamic) routing of information without looping.

Nodes in the OWL radio network are generally categorized as being attached or unattached to the network spanning tree. Upon initialization of an OWL radio network, only the root node is attached. A single WDAP can be designated to contain the root node, or multiple root candidates can negotiate to determine which node assumes the root status. Once the root is designated, the WDAP containing the root node, i.e., the WDAPp, begins periodically broadcasting messages offering attachment. These messages are referred to as "HELLO response PDU's". Unattached nodes, i.e., other WDAP's or WMAP's, receiving the Hello response PDU's may attach to the OWL radio network via the WDAPp. With the exception of terminal nodes, each network node that becomes attached also begins periodically transmitting Hello response PDU's. The nodes receiving Hello response PDU's from newly attached nodes may attach to the network via the newly attached nodes. This process continues until all of the network nodes are attached. Moreover, to attach to the network, an "Attach request PDU" must be sent and relayed downstream toward the root node. In response, the root sends an "Attach response PDU" back through the network to confirm the attachment. Upon receiving the Attach request PDU, each network node places an entry in a spanning tree routing table indicating the identity of both the requesting node and the node which last transmitted (relayed) the request. In this manner, routing tables can be constructed and maintained. As described in Appendix B, other types of PDU'S, i.e., Registration or Data request PDU's, are also be used to create and modify routing tables.

Using the spanning tree routing table, any network node can determine whether any other network node exists upstream or not. In particular, if an entry exists, the destination node must have previously sent a PDU (possibly the Attach request PDU) through that relay node in a downstream pathway to root node. Thus, if the entry exists, the relay node routes the PDU upstream per routing table instruction toward the destination node. However, if no entry for the destination node exists, the relay node can not determine the location of the destination node. Therefore, the relay node sends the PDU downstream toward the root node. If any node along the downstream pathway identifies the destination node in its routing table, that node relays the PDU upstream toward the destination. More detail regarding this entire procedure can be found in Appendix B, for example at pages 17–22.

Figure 8:
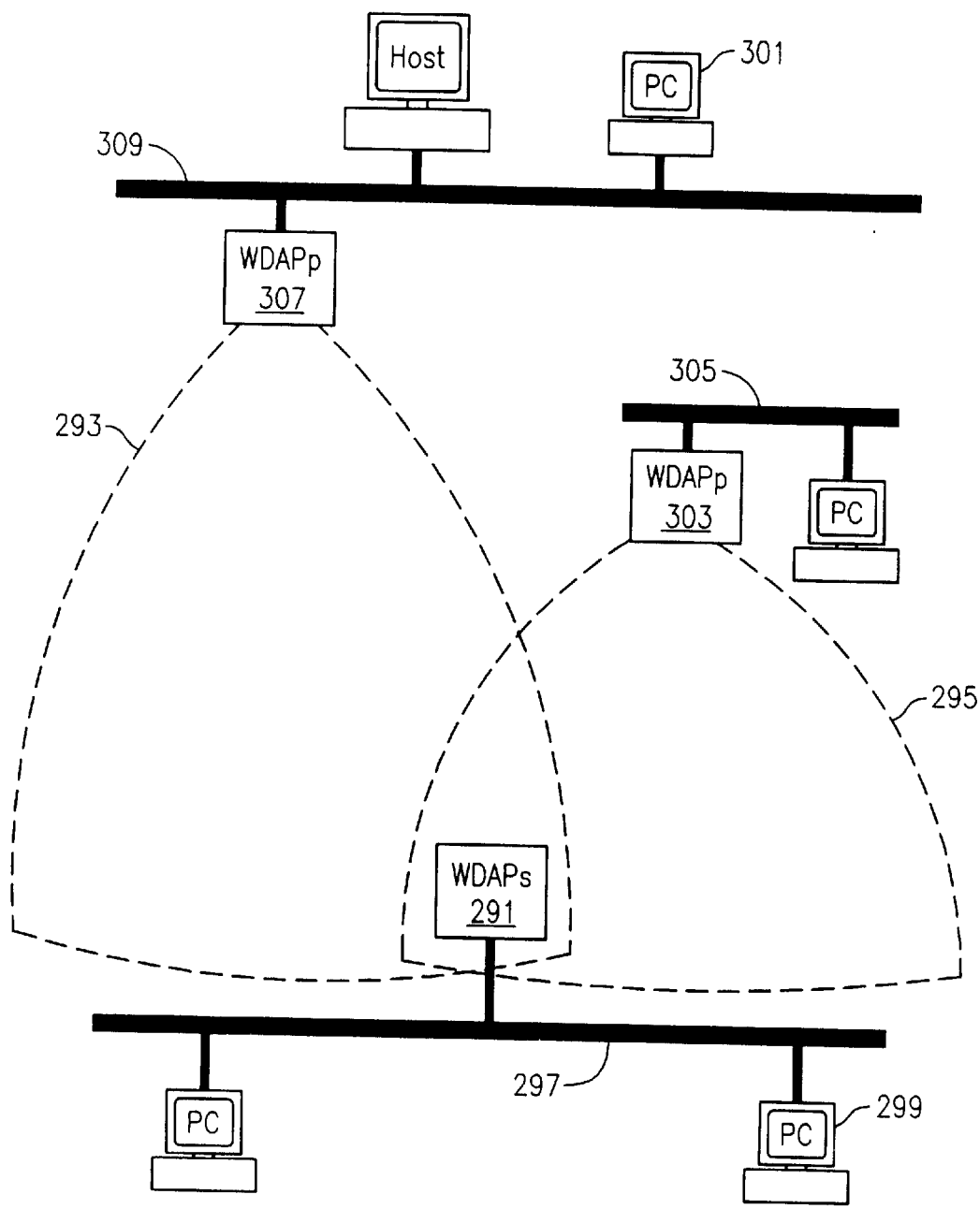
FIG. 8 illustrates an alternate embodiment of the present invention wherein a WDAPs participates in more than one OWL radio network.

FIG. 8 illustrates an alternate embodiment of the present invention wherein a WDAPs 291 participates in more than one OWL radio network. Specifically, the WDAPs 291 participates in OWL radio networks 293 and 295. For example, a personal computer 299 initiates communication to another remote station, a PC 301, by transmitting a message upon a wired subnet 297. Upon receiving the message, the WDAPs 291 checks its routing table and, because no entry is found, routes the message downstream through both the OWL radio networks 293 and 295. When the upstream routing in the OWL network 295 reaches a WDAPp 303, an entry for the personal computer 301 is still not found. Therefore, the WDAPp 303 unicasts the message onto a wired subnet 305. Because the PC 101 does not reside on the subnet 305, the message reaches a dead-end and is ignored. However, when the message reaches a WDAPp 307, and the WDAPp 307 does not find an entry for the personal computer 301, it unicasts the message onto a wireless subnet 309 for receipt by the personal computer 301.

Figure 9:
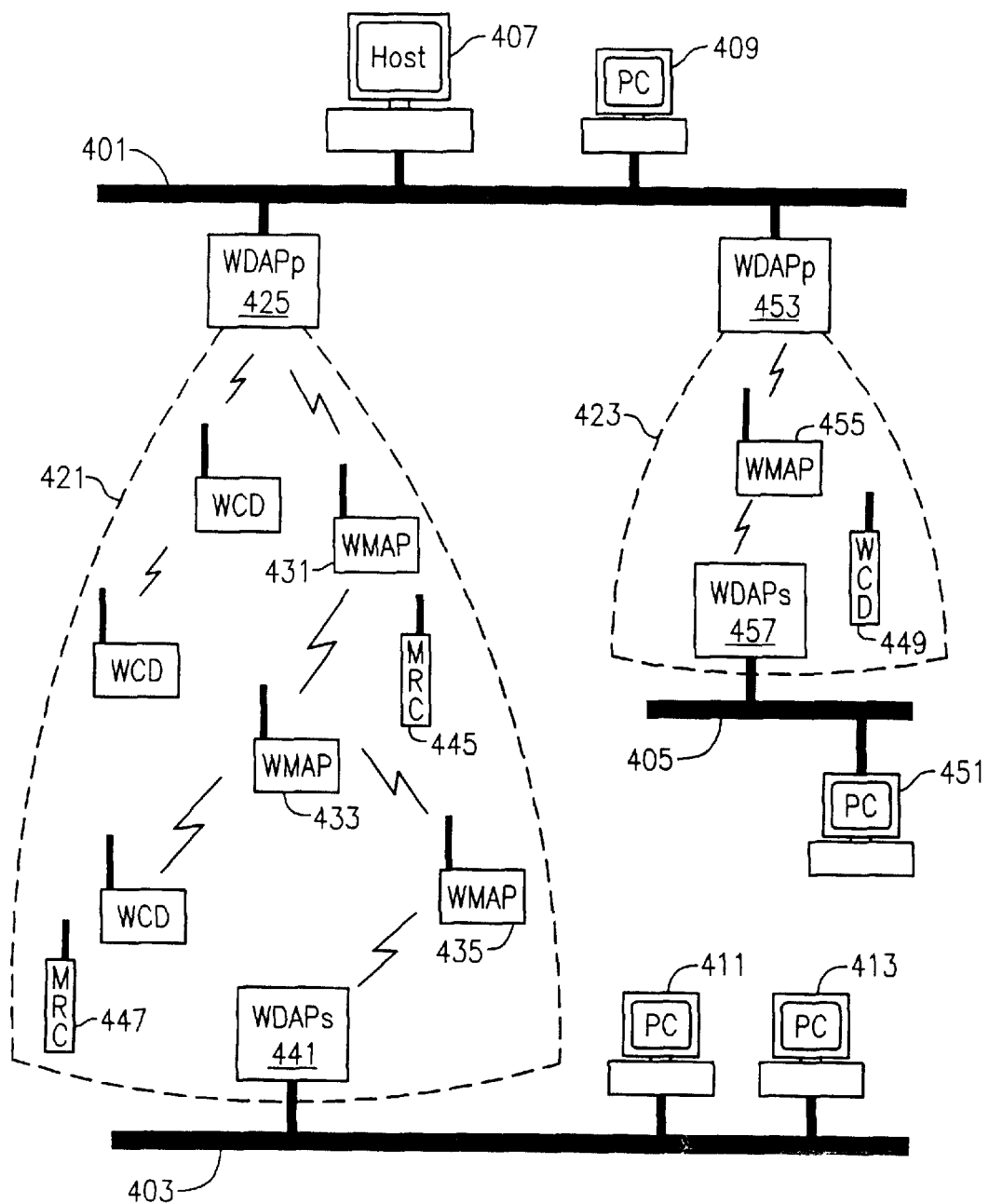
FIG. 9 is a diagram illustrating yet another variation of the OWL architecture according to another embodiment of the present invention wherein two OWL radio networks are used.

FIG. 9 is a diagram illustrating yet another variation of the present invention wherein two OWL radio networks are used. Specifically, a WDAPp 425 provides access for communication between a wired subnet 401 and a remote wired subnet 403. Utilizing a spanning tree configuration, the plurality of intermediate wireless access points, such as WMAP 431, 433 and 435, provide a communication pathway between a WDAPs 441 and the WDAPp 425. Together, the WMAP's, the WDAPp 425 and the WDAPs 441 provide for communication among a plurality of wireless communication devices, such as MRC's 445 and 447, and the remote stations on the subnets 401 and 403, such as a host computer 407 and personal computers 409, 411 and 413.

Similarly, communication interconnectivity is provided via a second OWL radio network 423. The second network 423 provides for communication flow between the wired subnet 401 and a remote wired subnet 405 via a WDAPp 453, WDAPs 457 and a WMAP 455. Again full communication among a wireless communication device 449, a personal computer 451, the host computer 407 and the personal computer 409 is provided for.

Additionally, communication among remote stations on the remote subnets 403 and 405 and wireless communication devices in either network 421 or 423 is provided. For example, the host computer 407 may communicate to the personal computer 413 via the OWL radio network 421. To do so, the host computer 407 first transmits a message destined for the personal computer 413 onto the wired subnet 401. In response, the WDAPp 425 receives the message, identifies a routing table entry for the personal computer 413, and, in one exemplary spanning tree configuration, routes the message up-stream toward the personal computer 413 via a wireless transmission to the WMAP 431. When the WMAP 431 receives the message from the down-stream WDAPp 425, the WMAP 431 checks with its routing table. Upon finding a routing table entry for the personal computer 413, the WMAP 431 identifies the WMAP 433 as the next relay point in is the pathway to the personal computer 413. Thus, via wireless transmission, the WMAP 433 relays the message to the WMAP 433. Upon receiving the message, the WMAP 433 similarly identifies a routing table entry for the personal computer 413, and routes the message to the WMAP 435. In turn, the WMAP 435 routes the message to the WDAPs 441. The WDAPs 441 finally sends the message to the personal computer 413 via the wired subnet 403. Together, the WDAPp 425, WMAP's 431–435 and WDAPs 441 thus provide a communication pathway between the host computer 407 and the personal computer 413.

As noted previously, each WMAP and each WDAP maintains a spanning tree routing table, i.e., a forwarding database, which specifies how local communication traffic should flow therethrough. Upon receipt of a message, the WMAP or WDAP first identifies the destination of the message. The message destination is then compared with the spanning tree routing table. If an entry in the routing table exists for the message destination, corresponding information regarding the next relay point in the pathway to the message destination is retrieved from the routing table. Such information includes the handle of the next relay point and the communication channel required, for example.

As another example, the personal computer 411 may communicate with the personal computer 451 by utilizing both of the OWL radio networks 421 and 423. Specifically, the personal computer 411 transmits a message to the personal computer 451 on the wired subnet 403. In response, the WDAPs 441 receives the message, recognizes that the personal computer 451 is not within its spanning tree routing table, and routes the message downstream to the WMAP 435. The WMAP 435 receives the message from the WDAPs 441, recognizes that the personal computer 451 is not within its routing table, and thus routes the message to its downstream ancestor, i.e., the WMAP 433. Similarly, upon receiving the message, and, because no entry exists in its routing table, the WMAP 433 forwards the message downstream to its spanning tree ancestor, the WMAP 431. Again, finding no routing table entry for the personal computer 451, the WMAP 431 routes the message to the spanning tree root node, i.e., the WDAPp 425. In turn, finding no routing table entry for the personal computer 451, the WDAPp 425, depending on predetermined program control, may: 1) do nothing, aborting the communication attempt; 2) unicast the message on all ports except the one from which the message was received, i.e., floods the ports with the message; 3) unicast the message on selected ports; or 4) consult a routing control field in the message itself to determine which of the above three options to choose.

Assuming program control permits, the WDAPp 425 unicasts the message intended for the personal computer 451 onto the wired subnet 401. Upon receiving the unicast message, the WDAPp 453 locates the personal computer 451 in its routing table, and routes the message upstream to the WMAP 455. The WMAP 455 similarly identifies a personal computer 451 entry, and routes to the next upstream node, i.e., to a WDAPs 457. Finally, the WDAPs 457, identifying a personal computer 451 routing table entry, sends the message via the remote wired subnet 405 to the personal computer 451.

The illustrated communication network similarly supports communication among wireless communication devices, such as MRC's 445, 447 and 449, and remote stations, such as the host computer 407 and the personal computers 409, 411, 413 and 451.

As previously articulated, further detail regarding the present invention can be found with reference to the Appendices A and B. Moreover, additional detail may also be found in the patent applications cited above under the heading "Incorporation By Reference". Such applications are incorporated herein by reference in their entirety.

As is evident from the description that is provided above, the implementation of the present invention can vary greatly depending upon the desired goal of the user. However, the scope of the present invention is intended to cover all variations and substitutions which are and which may become apparent from the illustrative embodiment of the present invention that is provided above, and the scope of the invention should be extended to the claimed invention and its equivalents.

APPENDIX A

© 1993 Robert C. Meier

MOBILE COMPUTER NETWORK ARCHITECTURE by

Robert C. Meier

A thesis submitted in partial fulfillment
of the requirements for the Master of
Science degree in Computer Science
in the Graduate College of
The University of Iowa May 1993

Thesis supervisor: Professor Donald Epley

APPENDIX A

© 1993 Robert C. Meier

Graduate College
The University of Iowa
Iowa City, Iowa

CERTIFICATE OF APPROVAL

_____

MASTER'S THESIS

_____

This is to certify that the Master's thesis of

Robert C. Meier has been approved by the Examining Committee
for the thesis requirement for the Master of
Science degree in Computer Science at the May 1993
graduation.

Thesis committee: _____
                      Thesis supervisor

_____
                      Member

_____
                      Member

TABLE OF CONTENTS

LIST OF TABLES .............................................iii
LIST OF FIGURES ............................................iv
CHAPTER

I. INTRODUCTION ....................................2

II. NETWORK OVERVIEW. ...............................4
           Logical nodes ...............................4
           Physical devices ............................5
           Communications links ........................6
           Network addresses ...........................9
           Network design issues. ......................10

III. DATA LINK LAYER .................................17
           Functional requirements .....................17
           Data Link Control ...........................18
               Data Link Control services ..............18
               Data Link Control frame definitions .....19
               Bracket transmission ....................21
               Frame/packet filtering ..................25
               Transmit and Receive State Machines
                  (SM) ................................26
                  Bracket Transmit State Machine. .....27
                      Transmit state descriptions .....27
                      Transmit state timers ...........27
                  Bracket Receive State Machine .......31
                      Receive state descriptions ......31
                      Receive state timers ............31
           Media Access Control ........................34

IV. NETWORK LAYER ....................................39
           Functional requirements .....................39
           Network layer services ......................39
           Network layer packet definitions. ...........40
           Spanning tree organization. .................42
              Attaching to the spanning tree ..........48
              Network layer routing. ..................50
              Dynamic changes in the spanning
                  tree. ...............................54
              Detach packet logic. ....................57
              Hello synchronization. ..................59

```
            Sleeping terminal support ...............59
        Address Resolution. .........................61
            Reverse Address Resolution Protocol
                (RARP). ............................61
            RARP routing. ..........................63
            Address Resolution Protocol (ARP). ......65
            Address maintenance. ....................65
        Root resolution .............................66
            Root resolution states ..................66
            Hello packet priority. ..................68

V. TRANSPORT LAYER ..................................71

VI. CONCLUSION ......................................76

REFERENCES ..........................................78
```

LIST OF TABLES

| Table | | Page |
|---|---|---|
| 1. | DLC Frame Types | 20 |
| 2. | DLC Control Fields | 21 |
| 3. | DLC Transmit State Transition Table | 29 |
| 4. | DLC Receive State Transition Table | 33 |
| 5. | Network Header Control Word | 41 |
| 6. | Nework Layer Packet Types | 42 |
| 7. | Root Resolution State Transition Table | 70 |

LIST OF FIGURES

| Figure | | Page |
|---|---|---|
| 1. | Terminal and Router Protocol Stacks | 4 |
| 2. | An example MCNA Network | 8 |
| 3. | Coverage Areas with Hidden Nodes | 16 |
| 4. | Example DLC Bracket Transmission | 23 |
| 5. | DLC Bracket Transmission Timing Graph | 23 |
| 6. | A Block Diagram of Physical Devices and Links | 44 |
| 7. | A Spanning Tree | 45 |
| 8. | A Spanning Tree with Network Addresses | 52 |
| 9. | An Example Network Routing Table | 53 |
| 10. | An Example RARP Routing Table | 63 |

CHAPTER

INTRODUCTION

Mobile Computer Network Architecture (MCNA) is a computer network architecture designed to connect mobile interactive radio-equipped computers to an infrastructure of stationary computer devices. The network architecture is based on protocol layering principles developed by the International Standards Organization (ISO) for Open Systems Interconnection (OSI). The ISO/OSI model specifies seven distinct communications layers. Each layer provides a distinct service and isolates other layers from changes in the computer network. MCNA implements the first four protocol layers - 1) the physical layer, 2) the data link layer, 3) the network layer and 4) the transport layer. The physical layer includes short-range spread spectrum radio links to facilitate terminal mobility. Multiple overlapping radio coverage areas are used to provide a multi-hop data path from intelligent mobile radio-equipped computers to a fixed network of computers and to other radio-equipped computers. Multi-hop radio links, overlapping radio coverage areas, and mobile network nodes present unique network design issues which are primarily addressed by the data link layer and the network layer. This paper defines network requirements and design issues which influenced the development of MCNA, and then presents data link and network layer solutions and transport layer requirements in the context of a specific hardware solution and a working functional model. A general understanding of the ISO/OSI protocol stack and networking concepts is a prerequisite for reading this paper.

CHAPTER
NETWORK OVERVIEW
Logical nodes
A logical node in the MCNA network is an addressable protocol entity. The network contains two logical node types: 1) terminal nodes and 2) router nodes. Figure 1 shows the protocol stacks for both node types. The arrows represent the flow of data between layers in the stacks.
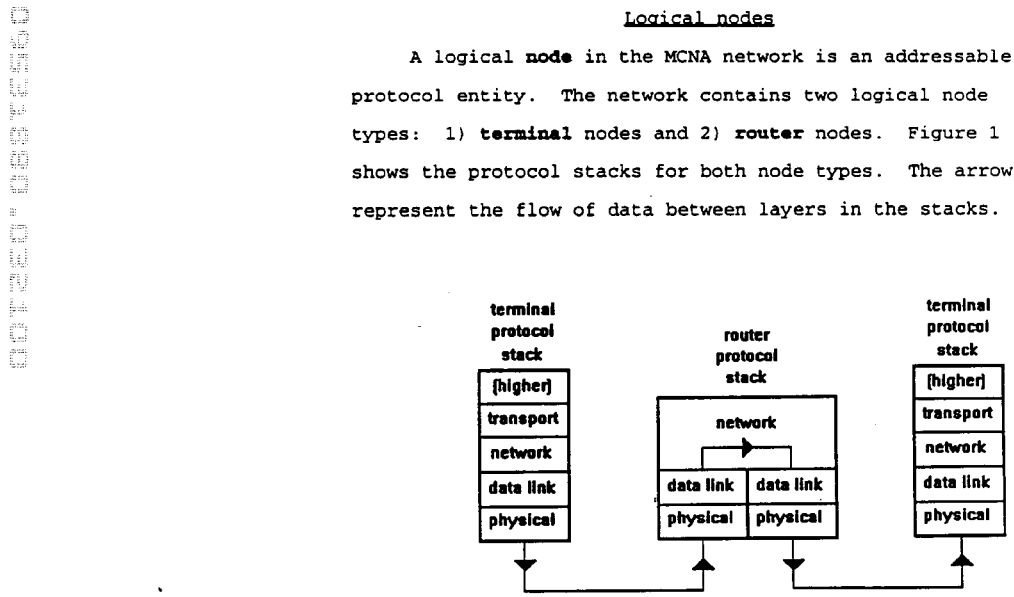
Figure 1. Terminal and Router Protocol Stacks.

Terminal nodes are end points in the network; router nodes are used to forward data packets at the network layer. Any logical terminal can communicate with any other logical terminal at the network layer. The network is designed to support up to 1000 logical terminals which correspond to hardware devices such as radio-equipped computers, host computers, printers, etc.

Physical devices

A typical MCNA network might consist of the following hardware device types:

Base station - A stationary radio-equipped computer which is used to extend the range of a controller node. Base-station-to-controller links or base-station-to-base-station links can be wired or radio. Base stations contain a single router node.

Mobile Radio-equipped Computer (MRC) - A radio-equipped mobile computer which contains one or more terminal nodes. MRCs are often battery powered and go into a sleeping state whenever possible to conserve power. An MRC does not receive network data while it is sleeping. The MCNA network provides several features to accommodate sleeping terminal nodes. MRCs communicate with base stations at the data link layer.

Controller - A gateway device which connects non-MCNA devices to the network. (A non-MCNA device is any device which does not support the MCNA protocol stack.) A
controller contains one router node and one terminal node
for each non-MCNA device it supports. Each autonomous
network must have at least one controller device.

Peripheral Devices - Any device which does not directly
support the MCNA protocol stack, such as a printer or host
computer. A peripheral device must be connected to a
controller device and is represented by a terminal protocol
stack in the controller.

Host Computer (or host) - A computer which communicates
with associated MRCs in an MCNA network. A host computer
can be viewed as a peripheral device.

Communications links

A communication link is used to make a physical layer
connection between devices. In an MCNA network, physical
layer connections can be made with either wired or radio
links. Each link is restricted to a single communications
channel, where a channel can accommodate only one data
transmission at any given time. (In some networks,
frequency or time division multiplexing can be used to
multiplex multiple communications channels on a single
physical link.) The network architecture assumes that <u>both
radio and wired links provide a broadcast medium at the data
link layer</u>. All unicast and multicast data link frames transmitted on a medium are received by all nodes physically connected to the medium.

Low-power direct-sequenced spread-spectrum radio is used to facilitate mobility for MRCs. The bit rate of the spread-spectrum radio channel is approximately 200 Kbps. Although the coverage area of a single radio transmitter is restricted, the total radio coverage area of an MCNA network must be virtually unlimited by the network design. Multiple base stations are used to extend the radio coverage area. It is a requirement that MRCs can move freely throughout the total coverage area without significant response time and throughput penalties. Roaming is the process of moving out of the coverage area of one base station and into the coverage area of a second base station. Link level error rates are relatively high on radio links due to roaming and the nature of the medium.

Base stations and controllers can be connected on a multi-drop relatively high-speed wired backbone LAN. (Note that if an IEEE 802 media access LAN standard is used for the backbone LAN, multicast 802 addresses are required to broadcast unicast frames at the data link control sublayer.) Base stations can also be connected on radio links, at the physical layer. A peripheral device can be connected to an MCNA controller by any physical standard which both devices support. As noted above, a peripheral device is represented by a terminal protocol stack in an attached controller;
therefore, the physical connection to a peripheral device is
not considered to be an MCNA network link. Differences in
MCNA physical layer links are hidden from higher layers by
the MCNA data link layer.

Figure 2 shows an example MCNA network. Note that base
stations can be wired (i.e. to the backbone LAN) or
wireless.

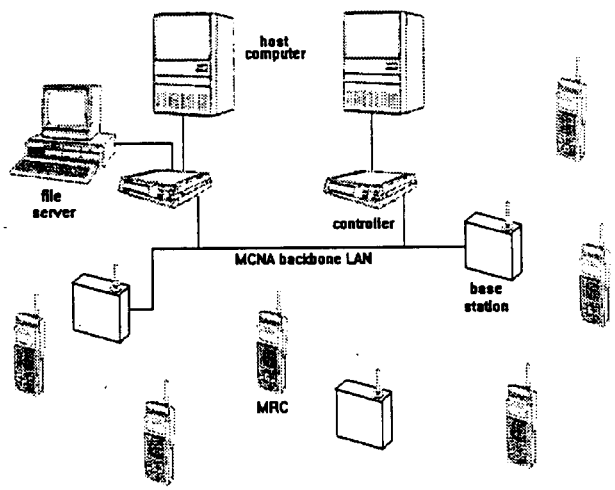

Figure 2. An example MCNA Network.

Network addresses

Data link frames contain a hop destination and hop source address in the data link header. Network layer packets contain an end-to-end destination and source address in the network header. Transport headers contain source and destination service access point (SAP) identifiers. Data link and network addresses are consistent and have the same format.

All devices must have either a unique long identifier which is programmed into the device at the factory and/or an alias which is typically entered by the user and is well-known. The long address and/or alias binds to a short 16-bit network address, obtained from an address server. A network address uniquely identifies a logical terminal or router node.

Network addresses consist of 2 parts: a 1) node type and a 2) 11-bit node identifier. MCNA has terminal and router node types. A node type of all 1's is used to specify all node types. The node identifier is used to uniquely identify a node of the specified type. A node identifier of all 1's is used to specify any node of the associated type. Note that a node type of all 1's and a node identifier of 1's can be used to specify all nodes.

A unicast address is used to identify a single MCNA node. A multicast or broadcast address is used to identify a group of nodes. The high-order bit is always set ON in a multicast or broadcast address. The high-order bit can be set ON in a unicast address to turn off data link handshaking.

The default network address used when a data link entity is first enabled consists of the multicast node type concatenated with a node identifier of all 1's. For example, the default address for a router node is hexadecimal A7FF. The network layer is responsible for obtaining a network address and assigning it to the data link entity assigned to a physical port.

In addition, to source and destination addresses, each transmitted network packet contains an MCNA network identifier (LAN ID) in the data link header. The network identifier is used to filter radio traffic from adjacent MCNA networks.

Network design issues.

Although MCNA is designed to be a general purpose network architecture, terminal emulation is the predominant application which MCNA is required to support. In an example emulation system, an MRC might look like a data entry terminal to a host computer. In this case, a controller attached to the host computer (directly or indirectly) would contain a logical terminal node which provided a gateway to the host. The application on top of the logical terminal protocol stack might emulate a terminal controller device. In addition to terminal emulation, the network must facilitate mail messaging, file transfers, and client-server applications.

Due to the nature of the supported applications, data traffic in an MCNA network is normally bursty and light, but can be heavy at times. Fast on-line response times for terminal emulation are essential, but the network can not go into a saturated overload state when traffic occasionally gets heavy.

MCNA is a fully-interconnected network at the transport layer. For example, in figure 2, any of the MRCs in the network can log on to either host, can send mail messages to each other, or request records from the file server.

Most network architectures fall into one of two categories: 1) packet-switching, or 2) circuit-switching. In a packet-switched network, each data packet associated with a transport layer connection can be routed along a different path. Packets can be lost and arrive out of order. In a circuit-switched network, a fixed path, called a virtual circuit, is defined when a transport layer connection is established. Packets always arrive in order and are rarely lost. In an MCNA network, radio links (and data packets) can be lost frequently if an MRC roams during a transport layer connection. The frequent loss of physical links prohibits the use of pure circuit-switching at the network layer.

In a packet-switched (or circuit-switched) network, nodes periodically exchange or distribute routing tables so that each node can learn the path to other nodes in the network. Routing table entries typically contain the cost to other nodes in the network and allow a node to select the best first hop to use to send data to another node. Unscheduled routing table exchanges can be triggered when the cost to a node suddenly changes significantly, possibly due to a node or link failure. The overhead associated with routing table exchanges can be significant, even when physical links are relatively stable. Several factors preclude the use of routing table exchanges in an MCNA network: 1) radio links are transient, 2) the primary application requires consistent fast response times, and 3) the bandwidth on the radio channel is limited. Frequent table exchanges, triggered by the loss of radio links, would be required to support fast response times for roaming MRCs. It is easy to envision a network saturated by routing table exchanges.

In an MCNA network, logical nodes are organized into an (optimal) spanning tree with a router node at the root of the tree. Other router nodes serve as interior nodes in the tree and terminal nodes are leaves in the tree. With the exception of the root node, each (child) node is connected by a single logical link to a parent node. Parent router nodes may have multiple children. Like a sink tree, nodes closer to the root node of the spanning tree are said to be downstream from nodes which are further away. Conversely, all nodes are upstream from the root. Network layer packets are routed along branches of the spanning tree. Router nodes use a technique called backward learning, to "learn" the path to upstream nodes (i.e. nodes in the subtree rooted at the router). The explicit exchange of routing tables is not required.

Responsiveness and guaranteed throughput, especially under heavy loads, are often conflicting goals in network design. Maximum throughput under heavy loads can be guaranteed by token passing or polling schemes. Nodes gain access to a communications channel only after receiving a token or poll (i.e. from a master node). Responsiveness is degraded since a node must wait for a token or poll in order to communicate. On lightly loaded networks, the best response times (i.e. for on-line applications) can be obtained by using a technique called multiple access. In a multiple access system, nodes are allowed to access the channel asynchronously, without waiting for a poll or token. However, throughput under heavy loads can be degraded due to contention - multiple concurrent access to a communications channel resulting in collisions. In a carrier-sense/multiple access (CSMA) or listen-before-talk (LBT) multiple access system, collisions are reduced because nodes "listen" to the channel, to determine if it is busy, before accessing the channel. Hybrid channel access techniques exist, which allow multiple access to the channel under light loads, but which migrate to a polling scheme as traffic increases. Such techniques usually require coordination from a master node.

As mentioned earlier, MCNA must provide fast response times for up to 1000 nodes. The time required for polling or token passing with that many nodes prohibits the use of such a scheme. The coordination required for any sort of polling or hybrid scheme is complex, since a network can contain multiple overlapping coverage areas. No single "master" node can be heard throughout the radio network. Polling, token passing, or hybrid schemes are even more difficult to implement if the network contains sleeping nodes. MCNA uses a multiple access technique on both wired and radio communications channels. The technique is called Listen-Before-Talk Channel Reservation with Busy Pulse (LBTCR/BP), and is described in detail below.

Packet radio networks present unique channel access design issues, which are not present in wired networks. The existence of multiple overlapping radio coverage areas can be both an advantage and disadvantage. The total data rate on the radio network can actually exceed the bandwidth of the radio channel due to a phenomenon called spatial reuse. Two pairs of MRCs can communicate concurrently, if the radio coverage area of the first pair is disjoint from the coverage area of the second pair. Concurrent communications session are possible even when coverage areas are not disjoint due to something called the capture effect. The capture effect allows a radio receiver to correctly interpret the signal from a strong transmitter in the presence of signals from weaker transmitters.

A CSMA or LBT scheme is more complicated in a multi-hop radio network due to the presence of hidden nodes. A node is said to be "hidden" from a transmitter if it is not in the coverage area of the transmitter, but is within the coverage area of the intended receiver. Figure 3 shows one example of hidden nodes. The circles represent the radio coverage areas of each of the nodes - A, B, C, and D. Consider the following scenario. Assume A is transmitting to B. C now wants to begin a conversation with D. Since C can not hear A, C assumes the channel is idle and begins transmitting to D. Since B is in the coverage area of both A and C, it will lose the transmission from A.

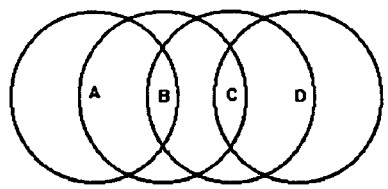
Figure 3. Coverage Areas with Hidden Nodes
The design of a packet radio network is also complicated by the existence of transient and unidirectional radio links. Links can be transient because the range and quality of a radio link can vary over time. A link can be unidirectional because transmitter strength and receiver sensitivity can vary from node to node.

CHAPTER

DATA LINK LAYER

The MCNA Data Link layer controls access to the channel and is responsible for providing reliable transmission between any two devices in the network (i.e. MRC-to-base-station), on both wired and radio links. MCNA's data link layer has a Media Access Control (MAC) component and a Data Link Control (DLC) component. The MAC and DLC components of the MCNA data link layer are not strictly layered and can not be presented independently. This paper focuses on the data link layer used on radio links, however the radio DLC component is also appropriate for wired links with significant error rates (i.e. due to access collisions). The radio MAC can be used on wired LAN links if an underlying MAC service is not provided by the LAN standard (i.e. IEEE 802.3).

Functional requirements

The data link layer: 1) accepts frames from the network layer and passes frames to the physical layer for transmission; 2) appends data link layer framing bytes and CCITT-16 frame check sequence (FCS) bytes to transmitted multicast and unicast frames; 3) removes data link layer framing bytes and FCS bytes from received frames; 4) verifies the FCS bytes in received frames; 5) filters out frames which do not belong to the MCNA network of the local device; 6) filters out packets which are not directed to the local device; 7) forwards packets to the network layer which are addressed to the local device, or are broadcast or multicast to the local device; 8) regulates access to the communications channel on wired LAN links and spread spectrum radio links; 9) recovers lost unicast frames; 10) maintains and provides diagnostic statistics; and 11) transparently fragments and reassembles network layer packets, which exceed the maximum data link frame size. A group of frames which is associated with a single network layer packet is called a bracket.

Data Link Control

Data Link Control services

The DLC component provides "acknowledged connectionless" services to the MCNA network layer. A data link connection is not required to transmit a network layer packet; however, each packet is acknowledged at the data link layer and errors are reported to the network layer. The network layer uses a DL_UNITDATA.request primitive to transmit a unicast packet to a child or parent node or to transmit a multicast packet to a group of nodes. The network layer receives a DL_UNITDATA.indication when a packet is received. The network layer can enable and disable the data link layer with DL_START and DL_STOP, respectively.

Data Link Control frame definitions

All DLC frames contain a destination address, a source address, a data link control byte, and a channel reservation field in the DLC header. Bits 7-5 in the DLC control byte are used to specify the frame type. DLC frames are one of two types: 1) request, or 2) response, depending on the state of the REQ/RSP control bit.

Table 1 briefly describes each of the frame types:

Table 1. DLC Frame Types.

a. Request Frame Types

| | |
|---|---|
| DATA | request frame used to send data in a bracket of frames containing network layer data |
| EOD | end-of-data request frame used to send the last data frame in a bracket of frames containing network layer data. Note that a bracket of frames may contain a single multicast EOD frame. |
| RFP | request-for-poll request frame used to request polling from the destination node. An RFP is used to initiate the transmission of a unicast bracket of frames. |
| ENQ | inquiry frame used to determine the frame sequence state of the destination and used to abort an active transmission. | b. Response Frame Types.

| | |
|---|---|
| POLL | response frame used to solicit the next DATA or EOD frame, in a bracket, from the destination. |
| WAIT | response frame which is used to notify the destination that the local node is busy. |
| CLEAR | response frame used to signal the end of the transmission of a unicast bracket of frames. |
| REJECT | response frame used to indicate that a request frame is invalid or that the frame sequence state is undefined. |

Table 2 briefly describes several control byte fields.

Table 2. DLC Control Fields.

| | |
|---|---|
| REQ/RSP | The REQ/RSP bit is set OFF in request frames and is set ON in response frames. |
| SEQ | The SEQ bit is used to sequence DLC frames in a unicast bracket, modula 2. The SEQ bit is used to detect duplicate frames. |
| MORE | In data request frames, the MORE bit is used to distinguish between DATA frames and EOD frames. The last frame sent in a bracket of data frames is always an EOD frame. |
| PRIORITY | The priority bit is set ON in request frames for high priority data transmissions. MCNA provides normal and high priority data pipelines. |
| LAN ID | The LAN ID bits contain a network identifier. Frames which do not belong to the local network are discarded. |

The source address, in the DLC header, is the network address of the local node. The destination address is passed to the DLC by the network layer. The destination (or source) can be a broadcast, multicast, or unicast address. If the destination (or source) is a multicast address, then the DLC transmits the network layer packet as a single multicast EOD frame.

Bracket transmission

In the discussion which follows, "source" is used to denote a node sending request frames and "sink" is used to denote a node sending response frames. On radio links (and, optionally, on wired links), the DLC fragments a network layer unicast packet into short fixed length frames before the packet is sent. The fragments are reassembled by the sink and are posted to the sink's network layer if, and only if, all frames in the packet are received. As noted above, a group of frames which is associated with a single network layer packet is called a bracket. Fragmentation at the data link layer allows the DLC entity to use a frame size which is suitable for the link error rate without impacting packet sizes at the network layer.

Figure 4 illustrates an example data link unicast conversation between two nodes - A and B. A conversation is initiated when the network layer in node A posts a DL_UNITDATA.request to the DLC layer in A. After the channel is accessed by the data link MAC component, DLC A sends an RFP frame to DLC B. DLC B responds with a POLL frame to solicit DATA frames from DLC A. The last data fragment in the bracket is sent, by DLC A, in an EOD frame. DLC B responds with a CLEAR frame which ends the conversation.

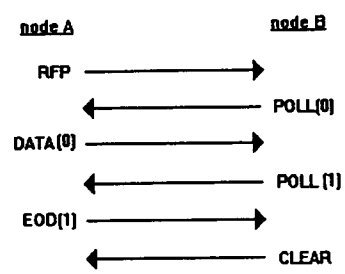
Figure 4. Example DLC Bracket Transmission.
Figure 5 shows a timing graph for the example bracket transmission in figure 4.
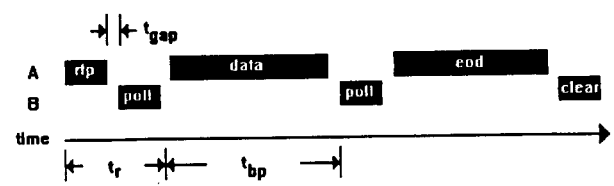
Figure 5. DLC Bracket Transmission Timing Graph.

The example transmission illustrated in figure 4 assumes that no errors occurred. A data link error can occur if a frame is lost or corrupted. A frame check sequence field is appended to the end of all data link frames. The FCS field is used to perform a complimentary transmitter/receiver cyclic redundancy check on each frame to determine if the frame was corrupted. Corrupted frames are ignored by the data link layer and are viewed as lost. The DLC component of the data link layer is responsible for retransmitting lost unicast fragments. The sink is primarily responsible for error recovery during a unicast conversation. If a DATA or EOD frame fragment is lost, the sink times out and resends a POLL frame to solicit retransmission of the fragment. A 1-bit sequence number is used to determine whether a POLL is for the previous (i.e. lost) fragment or the next fragment. The sequence number is reset to 0 at the start of a conversation. The source is responsible for recovery from lost RFP frames. (It should be noted that an ambiguous situation can occur when a source sends an RFP frame and misses the first POLL frame from the sink. The source can not distinguish the missed POLL from a lost RFP and, as a result, both the source and sink actively attempt to recover.) If a CLEAR frame is missed in a unicast sequence, the source can send an ENQ frame to determine the status of the conversation. If the CLEAR was lost, the sink responds to an ENQ by resending the CLEAR. A REJECT is sent to indicate that the sink exceeded a MAX_POLL_RETRY count and did not receive the EOD fragment. If a sink does not respond, a radio source can assume that the sink is no longer in range. A sink must cache the appropriate receive state information to determine whether a CLEAR or REJECT should be returned in response to an ENQ.

A source can reset an active conversation, at any time before the EOD frame is sent, by resending the RFP frame. A source can abort an active conversation by sending an ENQ frame.

Frame/packet filtering

When the DLC entity is in an ENABLED/ON state it is continuously listening on its assigned port. The DLC entity receives all data link layer frames. Frames which do not pass an FCS check are invalid and are discarded. Valid data frames are reassembled into a complete packet which is posted to the network layer if: 1) The LAN ID in the DLC header matches the LAN ID of the local node, and 2) The destination address in the DLC header a) is equal to the network address of the local node, or b) is an acceptable multicast or broadcast address.

The high-order multicast bit is set ON in all multicast or broadcast frames. A multicast or broadcast frame is accepted if the node type specifies a group to which the local node belongs and either a) the node identifier is all 1's, or b) the node identifier is equal to the identifier of the local node. A response is never required when the multicast bit is set ON.

Transmit and Receive State Machines (SM)

State logic is not required to transmit multicast and broadcast frames. Multicast and broadcast frames can be transmitted in a single segment whenever the channel is available. Received multicast or broadcast frames are simply posted to the network layer if the destination node belongs to the specified multicast or broadcast group.

Unicast bracket transmission is best described in the context of a transmit and receive state machine. A source node uses a transmit state machine to send a bracket of unicast frames to a sink node. A sink node use a receive state machine to receive a bracket of unicast frames. A node can not be in the transmit state machine and receive state machine at the same time. An active node is in one of three high level states: 1) LISTEN, 2) TRANSMIT, or 3) RECEIVE. A node in the LISTEN state is not in either the transmit or receive state machine. A node in the TRANSMIT state is in the transmit state machine. A node in the LISTEN state is in the receive state machine. Only one bracket transmission can be in progress per node at any time.

Bracket Transmit State Machine

The transmit state machine specifies source actions which are dependent on the current state and the input to the state machine. Transmit state input is limited to: 1) unicast response frames addressed to the local node, and 2) transmit state timers.

Transmit state descriptions.

States in the DLC transmit state machine are described below:

IDLE - The state machine is idle and is waiting for a bracket of frames to transmit.

READY - The state machine has a bracket of frames to transmit and is waiting to acquire the channel.

S_RFP - The state machine has sent an RFP frame and is waiting for a POLL frame.

S_DATA - The state machine has sent a DATA frame and is waiting for a POLL frame.

S_EOD - The state machine has sent an EOD frame and is waiting for a CLEAR frame.

RDY_ENQ - The state machine has lost a CLEAR frame and is waiting to acquire the channel before sending an ENQ frame.

Transmit state timers.

The transmit state machine requires three timers:

A RSP_TIMEOUT receive timer is started when an RFP or ENQ frame is transmitted. The time-out value is larger than interframe gap time plus the time required to transmit a POLL or CLEAR frame. If the RSP_TIMEOUT timer expires before an expected response is received, a retry counter is incremented and the RFP or ENQ request frame is retransmitted, if the retry count has not been exceeded.

A POLL_TIMEOUT timer is started whenever a DATA or EOD frame is transmitted following the reception of a POLL frame. The time-out value is larger than the time required for the maximum number of poll retry attempts. The DLC layer returns an error to the network layer if the timer expires before an expected POLL frame is received. Note that the sink is responsible for recovery when the POLL_TIMEOUT timer is running.

A TX_WAIT timer is started whenever a node is in the transmit state machine and is waiting to access the channel.

The transmit state machine maintains an internal sequence state variable which is equal to the 1-bit sequence value of the next frame to transmit. The sequence variable is reset to 0 at the beginning of a conversation and follows the state of the SEQ bit in received POLL frames. The SEQ bit in POLL frames is the sequence number of the next frame expected. Successive POLL frames with the same sequence number cause a DATA or EOD frame to be retransmitted. A DATA or EOD frame is "accepted" when a POLL or CLEAR frame is received with the next sequence number.

The state machine must maintain a "current pointer" variable which points to the current frame, in a bracket of frames, to be transmitted. The current pointer is advanced if, and only if, a POLL for the next frame in the bracket is received. The transition taken when a POLL frame is received depends on whether the current pointer is pointing to a DATA or EOD frame.

The state table below specifies transitions for unicast bracket transmissions.

Table 3. DLC Transmit State Transition Table.

| state | event | action | next state |
|---|---|---|---|
| IDLE | A bracket of frames is passed to the state machine | Reset retry count; execute channel access algorithm | READY |
| READY | Channel acquired | Increment retry count; send RFP frame; start RSP_TIMEOUT timer | S_RFP |
| S_RFP | RSP_TIMEOUT timer expires and max. retry count exceeded | Return error | IDLE |
| | RSP_TIMEOUT timer expires | Execute channel access algorithm | READY |
| | POLL received | Send current DATA frame; start POLL_TIMEOUT timer | S_DATA |
| | POLL received | Send current EOD frame; start POLL_TIMEOUT receive timer | S_EOD |
| | WAIT received | Start TX_WAIT timer | IDLE |

|  | REJECT received | Return error (invalid transition) | IDLE |
|---|---|---|---|
| S_DATA | POLL_TIMEOUT timer expires | Return error | IDLE |
|  | POLL received | Advance current pointer if frame was accepted; send current DATA frame; start POLL_TIMEOUT timer | S_DATA |
|  | POLL received | Advance current pointer if frame was accepted; reset retry count; send current EOD frame; start POLL_TIMEOUT timer | S_EOD |
|  | REJECT received | Return error (invalid transition) | IDLE |
| S_EOD | POLL_TIMEOUT timer expires | Reset retry count; execute channel access algorithm | RDY_ENQ |
|  | POLL received | Retransmit EOD frame; start POLL_TIMEOUT timer | S_EOD |
|  | CLEAR received; EOD frame not accepted | Return error (invalid transition) | IDLE |
|  | REJECT received | Return error (invalid transition) | IDLE |
|  | CLEAR received; EOD frame accepted | Return good | IDLE |
| RDY_ENQ | Channel acquired | Increment retry count; send ENQ; start RSP_TIMEOUT timer | S_ENQ |
| S_ENQ | RSP_TIMEOUT timer expires and max. retry count exceeded | Return error | IDLE |
|  | RSP_TIMEOUT timer expires | Execute channel access algorithm | RDY_ENQ |
|  | CLEAR received; EOD frame not accepted | Return error (invalid transition) | IDLE |
|  | REJECT received | Return error (invalid transition) | IDLE |
|  | CLEAR received; EOD frame accepted | Return good | IDLE |

Bracket Receive State Machine

The receive state machine specifies sink actions which are dependent on the current state and the input to the state machine. Receive state input is limited to: 1) unicast request frames addressed to the local node, and 2) receive state timers.

Receive state descriptions.

States in the receive state machine are described below:

IDLE_LISTEN - The receiver is not receiving a bracket of frames.

BUSY - The receiver has sent a POLL frame and is waiting for the next frame in a bracket.

Receive state timers.

A RSP_TIMEOUT timer is started when a POLL frame is transmitted. The time-out value is larger than the interframe gap time plus the time required to transmit a DATA or EOD frame. If the RSP_TIMEOUT timer expires before an expected response is received, a retry counter is incremented and a POLL frame with the same SEQ value is retransmitted, if the retry count has not been exceeded.

Each node maintains a receive SEQ state table which has an entry for all nodes which have recently transmitted valid data frames. A receive SEQ state value is reset to 0 when an RFP frame is received, and is incremented when a DATA or EOD frame is accepted. The SEQ state variable is cached in the table so that a source node, which missed a CLEAR response, can inquire as to the status of its last transmission. A CLEAR is (re)sent if a node receives an ENQ and has an entry in its SEQ state table for the source node. A REJECT is sent if an ENQ is received and an entry is not in the table.

The receive state machine uses a routine called "flush" to free any buffers allocated to a bracket of frames if an error occurs and the complete bracket is not received.

Table 4. DLC Receive State Transition Table.

| state | event | action | next state |
|---|---|---|---|
| IDLE_LISTEN | RFP received | Send POLL; reset retry count; start RSP_TIMEOUT timer | BUSY |
| | ENQ received; entry for source node is in the SEQ state table | Send CLEAR | IDLE_LISTEN |
| | ENQ received; no entry for source node in the SEQ state table | Send REJECT | IDLE_LISTEN |
| | DATA or EOD received | Send REJECT | IDLE_LISTEN |
| BUSY | RSP_TIMEOUT timer expires; max. retries exceeded | Flush; delete SEQ state table entry | IDLE_LISTEN |
| | RSP_TIMEOUT timer expires | Increment retry count; execute channel access algorithm; acquire channel; resend POLL; start RSP_TIMEOUT timer | BUSY |
| | DATA received from active node | Reset retry count; send next POLL; start RSP_TIMEOUT timer | BUSY |
| | DATA or EOD received from inactive node | Send REJECT | BUSY |
| | EOD received from active node | Send CLEAR; reassemble and post complete packet; flush | IDLE_LISTEN |
| | ENQ received from inactive; entry for source node is in the SEQ state table | Send CLEAR; flush | BUSY |
| | ENQ received from inactive node; no entry for source node in the SEQ state table | Send REJECT; flush | BUSY |

34

| | ENQ received from active node | Send REJECT ; flush; delete SEQ state table entry | IDLE_LISTEN |
| --- | --- | --- | --- |
| | RFP received from inactive node | Send WAIT | BUSY |
| | RFP received from active node | Send POLL; reset retry count; start RSP_TIMEOUT timer | BUSY |

Media Access Control

As Tobagi points out in [1], the hidden node problem can severely limit bandwidth utilization in a simple CSMA radio network. Tobagi discusses a channel access technique referred to as listen-before-talk with busy tone (LBT/BT). LBT/BT requires a second transceiver in each radio-equipped device and a second control channel (i.e. on another frequency) used to broadcast a "busy tone" whenever a node is actively receiving a radio transmission. For example, in figure 3, if A is transmitting data to B, then B must broadcast a busy tone on the control channel for the duration of the transmission. C is able to sense the busy tone, and refrains from broadcasting to D until the both the data and control channels are idle. The busy tone solution is expensive for obvious reasons. MCNA uses an analogous, but less expensive technique referred to as busy pulse. As noted earlier, the DLC component fragments and reassembles network layer packets. A fragment can occupy a channel for a known fixed time period. In figure 5, assume node A is

99 engaged in a bracket transmission with node B. If a third node, C, listens to a radio channel for a worst-case time, $t_{bp}$, it is guaranteed that it will detect the active conversation if either node A or B (but not necessarily both) is within range of C. The busy pulse technique prevents interrupted conversations by requiring sleeping nodes to listen to the channel for a busy pulse period after awakening, before initiating a transmission. The busy pulse period is equal to the time required to transmit a DATA frame plus two interframe gap times. In figure 5, $t_{gap}$ defines the interframe gap time and $t_{bp}$ defines the busy pulse time.

MCNA uses a channel reservation technique to generally restrict channel access contention to RFP frames. Each DLC request frame contains a channel reservation field which indicates the amount of time required to send any outstanding frames in a bracket, without error. The reservation is echoed by the sink in POLL response frames. (Note that the reservation field is always zero in EOD and CLEAR frames.) An LBT algorithm is generally executed only once per conversation. After an RFP frame is sent, the source owns the channel for the entire conversation and subsequent request and response frames can be sent without additional channel access logic. As a result, interframe gap times and, hence, busy pulse times can be well-defined.

Channel reservation can be implemented with a continuous millisecond clock, a RESERVE_TIME variable, and a RESERVE_NODE variable. If RESERVE_TIME is greater than the current millisecond time, the channel is considered reserved and can not be used. The RESERVE_TIME variable is updated when a unicast request or response frame is received as follows: 1) If the destination address in the DLC header is not the local node address and the calculated reserve time of the frame is greater than RESERVE_TIME, then RESERVE_TIME is set to the calculated reserve time and RESERVE_NODE is set to the source address, 2) If the calculated time is less than RESERVE_TIME and the source address is equal to RESERVE_NODE then RESERVE_TIME is set to the calculated time, 3) If the local node address is equal to the destination address and the source address equals RESERVE_NODE then RESERVE_TIME is set to the current millisecond time (i.e. the reservation is canceled).

Before a unicast conversation or a multicast transmission is initiated, an LBT algorithm is executed to determine if the channel is available. The transmission can begin immediately, if the channel is not active and is not reserved. If the channel is not free, a random backoff algorithm specifies backoff delays as a function of the LBT slot time and the number of retries. An LBT slot is defined as a function of the best case and worst case busy-sense time. The best case busy-sense time is equal to the amount of time from the point at which a node detected the channel idle, before transmitting, until another node can detect the transmission in progress. The worst cast busy-sense time is best defined by an example. In figure 3, suppose nodes A and C attempt to initiate a conversion with B at approximately the same time. If node A determines that the channel is idle and begins transmitting an RFP frame at time 0, then the worst case busy-sense time is equal to the time $t_b$, in figure 5, at which node B begins sending a response POLL frame. Node C can not determine that the channel is busy between time 0 and time $t_b$.

If a channel is detected busy, the access delay time is simply the calculated random backoff time. If a channel is reserved, a random delay is calculated by adding the reserved time to the calculated random backoff time. Note that the data link layer must continue to monitor link activity during a backoff period.

The backoff algorithm is repeated, whenever a collision is suspected, to randomly distribute retries over an increasing number of LBT slots. The channel access algorithm must assume that a collision may have occurred whenever an expected reply is missed, since collision detection (CD) is not available. A sink must back off whenever a POLL frame is lost, before it retransmits the POLL frame. A source must back off before retrying whenever an RFP or ENQ frame is lost.

The network layer can indicate to the data link layer that a packet is being sent as a response to a multicast or broadcast message. If a network layer packet is being sent in response to a multicast message, then the data link layer waits for a random delay period before transmitting the response.

The total retry time, including backoff time, at the data link layer must be relatively short so that lost branches in the network layer spanning tree can be quickly detected and new branches quickly re-established.

CHAPTER
NETWORK LAYER

Functional requirements

The network layer provides the following functions: 1) The network layer organizes nodes in the network into an optimal spanning tree rooted at a root router node, hereafter simply referred to as the root. The spanning tree is used to prevent loops in the topology. 2) The network layer routes packets along branches of the spanning tree. 3) The network layer provides a service for storing packets for sleeping terminals. Packets which can not be delivered immediately can be saved by the network entity in a parent node for one or more HELLO times. 4) The network layer propagates lost terminal node information throughout the spanning tree. 5) The network layer maintains the spanning tree links. 6) The network layer allocates and distributes network addresses. 7) The network layer maintains and provides diagnostic statistics.

Network layer services

The transport layer uses an NL_UNITDATA.request primitive to send a transport layer message. The alias or network address of the destination node must be passed along with the message. If an alias is passed, the network layer will automatically resolve it into a network address. The alias and associated address are cached in the local network entity. The network header contains several protocol bits which are used to identify data which belongs to a transport layer protocol. When data arrives for a transport protocol, the specified transport protocol entity is notified with an NL_UNITDATA.indication.

Network layer packet definitions.

The network header in network layer packets contains a destination address, a source address, and a control word. Table 5 describes fields in the network header control word.

Table 5. Network Header Control Word.

| | |
|---|---|
| PACKET TYPE | This field is used to specify the network layer packet type. |
| NETWORK PARMS | If this bit field is set ON then optional network layer parameters immediately follow the network header. |
| RSPRQ | This field can be used to request an end-to-end network layer response packet. Normally this field should be set ON for ATTACH, RARP and ARP request packets, and should be set OFF for all other network layer packets. |
| PROTOCOL | This field is used to indicate the presence and type of higher layer data. |
| REQ/RSP | This bit is set OFF in network request packets and is set ON in network response packets. |
| ATTI | A router node will set this bit ON in an ATTACH.request packet whenever the source node is not in its routing table. The bit value in an ATTACH.response packet follows the state of the bit in the associated ATTACH.request. If a terminal receives an ATTACH.response packet with the ATTI bit set ON, it is a positive indication that the terminal was detached and has reattached to the network. |

Table 7 describes each of the network layer packet types.

Table 6. Network Layer Packet Types.

| | |
|---|---|
| DATA | DATA.request packets are general purpose network layer packets used to send higher layer data and/or network layer parameters. |
| HELLO | HELLO.response packets are used to build the spanning tree and are used to advertise pending message information and lost node information. Scheduled HELLO.response packets are broadcast periodically at calculated time intervals by each router node in the spanning tree. In addition, router nodes will broadcast an unscheduled HELLO.response packet whenever a HELLO.request packet is received. |
| ATTACH | A node transmits an ATTACH.request packet to attach to the network and to maintain its path in the network. If the RSPRQ bit is set ON the root node will return an ATTACH.response packet. Higher layer data can be piggybacked on ATTACH.request packets. |
| DETACH | DETACH.request packets are used to notify the network that a node has detached. |
| ARP | An address resolution packet (ARP) is used to acquire the 16-bit network address of a destination node, when only the alias (or 48-bit identifier) of the node is known. An ARP packet is generated automatically by the network layer whenever address resolution is required. |
| RARP | A reverse address resolution packet (RARP) is used to set or change the alias and/or 48-bit long identifier of a device and to acquire a 16-bit network address. |

Spanning tree organization.

The network layer organizes nodes into an optimal spanning tree with a single router node at the root of the tree. (Note that the LAN ID in the data link header allows more than one logical tree to exist in the same coverage area.) Interior branches of the spanning tree are relatively stable (i.e. controllers and base stations do not move often). Terminals, which are leaves on the spanning tree, may become unattached and must be reattached frequently. All messages are routed along branches of the spanning tree. Restricting each node in the tree to a single parent guarantees that there will be no loops in the logical topology.

Figures 6 and 7 illustrate how physical devices are organized into logical nodes in a spanning tree. Figure 6 depicts devices and the physical communication links. Figure 7 depicts the same devices organized as nodes on branches of a spanning tree. The root node in figure 7 is labeled with an R.

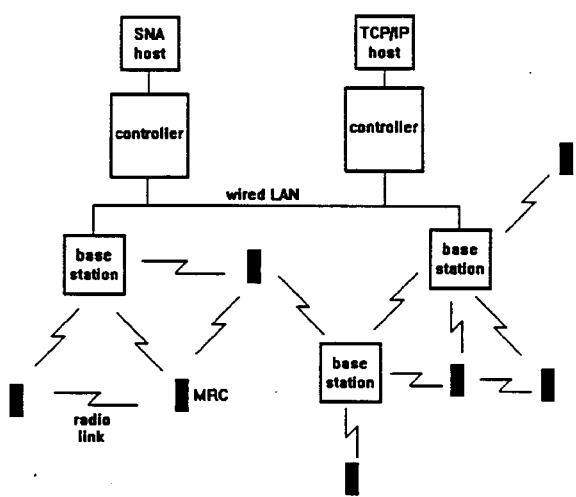
Figure 6. A Block Diagram of Physical Devices and Links.

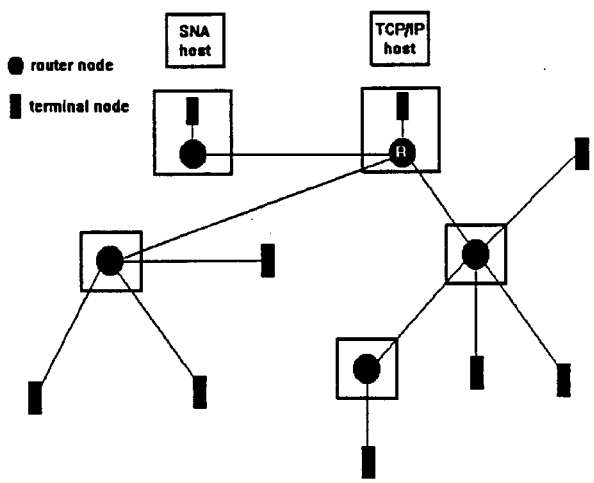

Figure 7. A Spanning Tree.

Nodes in the network are generally categorized as attached or unattached (i.e. to the spanning tree). Initially, only the root is attached. A single controller can be designated to contain the root node, or multiple root candidates can negotiate to determine which node assumes the root status. The root and other attached router nodes broadcast HELLO.response packets at calculated intervals. The HELLO packets enable unattached nodes to learn the optimum path to the root node before attaching to the network.

The HELLO.response packets include: 1) the source address; 2) a broadcast destination address; 3) the "cost" to the root; 4) a "seed" value used to calculate the time of the next HELLO.response packet; 5) a hello displacement time. 6) the priority of the root node (or root candidate); 7) the unique device identifier of the root node (or root candidate); and 8) a root node sequence number, used to distinguish between multiple occurrences of the spanning tree with the same root node.

The HELLO "cost" field indicates the total "distance" to the root, and is equal to the sum of the costs of each hop on the path to the root. (Note that the root node broadcasts HELLO packets with the cost field set to zero.) The incremental cost of the hop between a node and its parent is primarily a function of the physical link type (i.e. ethernet, RS485, or radio). The cost component is intended to bias path selection toward high-speed (i.e. wired) connections. On radio links, spanning tree attachment is biased toward the link with the best signal strength. Signal strength is not a factor in the cumulative path cost.

The HELLO "displacement" field specifies the displacement of the actual hello time from the calculated hello time or to indicate that the hello time was unscheduled. A well-known randomization algorithm is used to calculate the next hello time. The HELLO "seed" field is used as a seed for the calculation.

The "root identifier" and "root sequence" fields are used to define a single instance of the network. Attached nodes must forget their network address and return to the unattached state whenever a HELLO.response packet is received with a new root node identifier or root sequence number.

HELLO.response packets can contain optional parameters such as: 1) a descendent count; 2) a pending message list, and 3) a detached-node list.

A pending message list consists of 0 or more network addresses of sleeping terminals and is used to indicate that a message is pending in the network for each terminal in the list. Pending messages are stored in the parent node of the terminal.

Detached-node lists contain the addresses of terminal nodes which have lost packets or detached from the spanning tree. A router node learns which entries should be in its list from DETACH packets which are distributed throughout the network when a terminal is lost. Detached nodes are included in detached-node lists in HELLO.response packets for DETACH_MSG_LIFE hello times.

Attaching to the spanning tree

Nodes without a parent in the spanning tree are in an UNATTACHED state. In the unattached state, a node learns which attached router node is closest to the root node by listening to HELLO.response packets. (If no HELLO.response. packets are received, the node can wait (i.e. sleep) and retry later.) After the learning period expires an unattached node sends an ATTACH.request packet, with the RSPRQ bit set ON, to the attached router node with the lowest cost to the root. (Nodes without a network address must first send a RARP.request packet to the root to obtain a network address.) The attached router node forwards the ATTACH.request packet onto the root node. <u>The end-to-end ATTACH.request functions as a discovery packet and enables router nodes along the path to the root node to quickly learn the path to the source node</u>. The root node returns the request as an end-to-end ATTACH.response packet. When the unattached node receives the ATTACH.response packet it goes to an ATTACHED state and sets internal root port and parent variables. (Note that the ATTACH.request must be repeated if an ATTACH.response is not received.) The root port is the physical port on which the response packet arrived and the parent (address) is equal to the data link source address. If the newly attached node is a router node, it calculates its cost to the root, by adding its root port link cost to the HELLO cost of its new parent, and begins to broadcast HELLO.response packets.

Unattached terminal nodes can optionally broadcast a global HELLO.request packet with a multicast router destination address to solicit unscheduled HELLO.response packets from attached router nodes. The net effect is that the UNATTACHED state can (optionally) be shortened. (Note that only attached routers or the root may respond to request packets.) The HELLO.request facility is intended for unattached terminals with transactions in progress.

An attached node can change (i.e. shorten) its path in the spanning tree at any time simply by selecting a new parent and repeating the attach process.

Each attached node must transmit an ATTACH.request or DATA.request packet at least once per ATTACH_TIMEOUT time period to maintain its path in the network. Higher layer data can be piggybacked onto ATTACH.request packets by setting the network layer destination address to the 16-bit address of the node for which the data is intended. If data is piggybacked onto an ATTACH.request packet, the network layer will split the ATTACH packet into separate ATTACH and DATA request packets as soon as the next hop to the destination address is not on the path to the root node (i.e. the first upstream hop). The destination address of the generated ATTACH.request packet is the well-known
address of the root node.

Active nodes do not need to explicitly generate
ATTACH.request packets. An ATTACH.request is automatically
generated (or a DATA.request is converted to an
ATTACH.request), by a router node, whenever a request packet
arrives from an upstream node and an entry for the source
node does not exist in the router node's routing table. An
attach indication (ATTI) bit is set ON in the
ATTACH.response packet to notify the source node it has just
attached to the network.

Network layer routing

All packets are routed along branches of the spanning
tree. Routers "learn" the path to nodes by monitoring
traffic from upstream nodes (i.e. traffic directed toward
the root). Whenever a router receives a packet from an
upstream node, the router creates or updates an entry in its
routing table for the source node. The entry includes the
node address, and the address of the router which sent the
packet (i.e. the hop source address). When a router
receives a packet from a downstream node the packet is
forwarded to the upstream hop which is specified in the
routing entry for the destination. The packet is discarded
if a routing entry does not exist.

Packets from upstream nodes are simply forwarded to the next downstream node (i.e. the parent) in the branch of the spanning tree. No explicit routing is required for downstream traffic because the route is defined by the structure of the spanning tree. A packet travels downstream until a node is reached which has an entry in its routing table for the destination address. The packet is then explicitly routed upstream until it reaches its destination. Thus, terminal-to-terminal communications is accomplished by routing all traffic through the nearest common ancestor of both terminals. In the worst case, the root is the nearest common ancestor.

Figure 8 reproduces the spanning tree from figure 7 along with the hexadecimal address of each node. As an example, assume terminal 804 sends a packet destined for terminal 806. The packet will follow one downstream hop from 804 to 2003. The routing function at 2003 has an entry for 806 in its routing table which specifies 2004 as the first upstream hop to 806. The packet is routed upstream to 2004. An entry in the routing table at 2004 specifies 806 as the first upstream hop to 806, and the packet is routed from 2004 to 806.

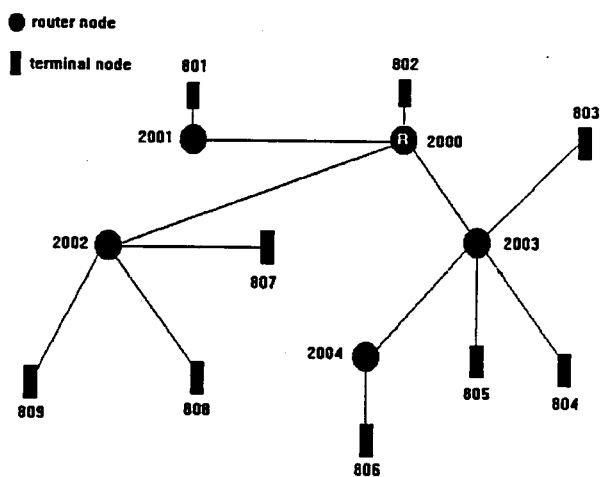
Figure 8. A Spanning Tree with Network Addresses.
The routing table in each router node defines the subtree rooted at the router node. The routing table for router node 2003 in figure 8 is shown in figure 9 below:

| destination | port | first hop | age | child flag |
|---|---|---|---|---|
| 2004 | 2 | 2004 | 1 | true |
| 803 | 2 | 803 | 1 | true |
| 804 | 2 | 804 | 2 | true |
| 805 | 2 | 805 | 0 | true |
| 806 | 2 | 2004 | 1 | false |

Figure 9. An Example Network Routing Table.

Route table entries are created or updated whenever a downstream unicast DATA, ATTACH, or ARP packet is received. If an entry does not exist for the source address in the network header, an entry is created with the destination field set to the network layer source address. The other fields in the (old or new) entry for the destination are modified as follows: 1) the first hop field set to the source address in the data link header, 2) the port field is set to identify the data link entity which delivered the packet, 3) the age field is set to 0, and 4) if the destination and first hop fields are identical, the child flag field is set to true.

The age field for each entry is incremented at regular intervals. An entry's age field is reset to 0 whenever a packet is received from the destination associated with the entry. If no packets are received from the destination of an entry for ROUTE_TIMEOUT minutes, the entry is deleted from the route table. Nodes can maintain their path in the network by sending an ATTACH.request packet to the root node once every ATTACH_TIMEOUT minutes, where ATTACH_TIMEOUT must be shorter than ROUTE_TIMEOUT.

If a router receives a DETACH.request packet from an upstream router node, then each entry in its route table, with a destination field which matches an entry in the packet's detached list, is deleted.

All nodes, except the root node, keep a parent and root port variable. A packet traveling downstream is forwarded by setting the data link destination address to the parent address and then passing the packet to the data link entity associated with the root port.

Dynamic changes in the spanning tree

Paths in the spanning tree can change for a number of reasons:

1) Any node may select a new path to the root whenever a better path is found. For example, a better path might be one where the cost of a node's parent from the root is CHANGE_THRESHOLD greater than the cost in a HELLO.response packet from another node. Rapidly moving terminals can cache a short list of alternate parents. Periodically, sleeping terminals, must stay awake for 1 or more HELLO times to discover changes (i.e. shorter paths) in the network topology.

2) A parent node detaches the subtree rooted at a child node, whenever a message cannot be delivered to the child. This occurs when the data link layer in a parent node fails to deliver a unicast network layer packet to a child node.

3) A child node goes into the UNATTACHED state whenever its data link layer fails to deliver a message to its parent. If the child node is a router, it must continue to broadcast scheduled HELLO.response packets with an infinite distance for MAX_HELLO_LOST+1 times. If the child node is a terminal, it may solicit unscheduled HELLO.response packets to shorten the UNATTACHED state. After the UNATTACHED learning state has expired the node reattaches by transmitting an ATTACH.request to the router node closest to the root.

4) If a node in an ATTACHED state receives a DETACH packet or a HELLO.response packet with its network address in the detached list, it must enter the UNATTACHED state and reattach to the spanning tree. Note that it may not actually be unattached. After reattaching, the node must remain in a HOLD_DOWN state for MAX_HELLO_LOST+1 hello times. During the HOLD_DOWN state, the node ignores its address in DETACH packet and HELLO.response packet detached lists. After the HOLD_DOWN period expires the node must send a second ATTACH.request to the root, to insure that it is still attached.

5) Entries in routing tables are aged periodically and old entries are discarded. When routing table space for a new entry is required, either an unused entry or the oldest (i.e. least recently used) entry is selected. If a used entry is selected, then the old information is simply discarded.

6) A sleeping node must wake up and enter an ATTACHED listen state whenever a threshold number of HELLO.response packets (i.e. 1 or 2), from its parent, are missed. The state ends when the node receives a data or HELLO.response packet from its parent. The node enters the UNATTACHED state when a) its address appears in the detached list of a DETACH or HELLO.response packet, or b) a total of MAX_HELLO_LOST consecutive HELLO.response packets are missed.

The time that a node spends in the ATTACHED listen state must be less than the lifetime of detached node information in the network. This insures that a detached node will always enter the UNATTACHED state (i.e. either the node will find its address in a detached node list or the node will miss MAX_HELLO_LOST HELLO.response packets and go into the UNATTACHED state before it sees a "good" HELLO.response packet from its (former) parent.

7) Any node which receives a HELLO.response packet from its parent with an infinite distance immediately enters the UNATTACHED state. If the node is a router, it must continue to broadcast HELLO.response packets with an infinite distance for MAX_HELLO_LOST+1 times.

Note that old invalid paths may exist in the spanning tree for a period of time. For example, if a terminal detaches and reattaches to a different branch in the spanning tree, all downstream nodes in the new branch "learn" the new path to the terminal. Nodes which were also in the old path change their routing tables and no longer forward packets along the old path. At least one node, the root, must be in both the old and new path. A new path is established as soon as an end-to-end attach request packet from the terminal reaches a node which was also in the old path. Any remaining old path fragment will be disjoint from the new path and will be aged away.

Detach packet logic

Since terminals can be mobile they can lose messages often and must be notified quickly. A router handles lost messages differently for each of the following three cases: 1) the data link hop destination of a lost message is a downstream router, 2) the hop destination is an upstream router, or 3) the hop destination is a terminal. In the first case, the upstream router will detach from the network and will begin broadcasting HELLO.response packets with an infinite cost, causing the subtree below the router to detach and reattach to the network. In the last two cases, the router node will generate a DETACH.request packet which includes a detached node list. The detached node list contains the network layer destination address of the terminal which lost the message. Initially, the detach packet is forwarded to the parent node (if it exists) and router nodes which are children. Router nodes which receive a DETACH.request must forward it along all branches of the spanning tree except the branch it was received on. A router node does not forward a DETACH.request if the DETACH.request came from an upstream node, and the upstream node is not the first hop in the routing table entry associated with the terminal in the detached list. Each router node must broadcast the DETACH.request to all terminal nodes one time so that the terminal can quickly discover that it is detached or has lost a message. In either case, the terminal responds by reattaching to the network. Each router node, which receives the DETACH.request, purges the detached terminal from its routing table and adds the terminal to its detached node set. Detached node information is broadcast in HELLO.response packets for MAX_HELLO_LOST+1 times or until the router determines the terminal has reattached.

Hello synchronization

All attached non-terminal nodes broadcast periodic HELLO.response packets at calculated intervals. On the average, the intervals are separated by HELLO_PERIOD seconds. The HELLO.response packet contains a "seed" field used in a well-known randomization algorithm to determine the next hello time node and the next seed. The address of the transmitting node is used as a factor in the algorithm to guarantee randomization. Nodes can execute the algorithm i times to determine the time (and seed) of the i-th hello packet from the transmitter.

After attaching, a router chooses a random initial seed and hello time and broadcasts a hello packet. The router chooses succeeding hello times by executing the randomization algorithm. If the transmission of a HELLO.response packet is delayed, then the delay is entered into a "hello displacement" field in the packet, so that the calculated time can be accurately derived by a receiver. Cumulative delays are not allowed (i.e. contention delays during the i-th hello transmission do not effect the time of the i+1 hello transmission).

Sleeping terminal support

A sleeping node initially "synchronizes" on a HELLO.response packet from its parent. The node can calculate the time of the next expected HELLO.response packet from its parent and can power-down with an active timer interrupt set to wake it just before the HELLO.response packet is transmitted. The network layer entity in a parent node can store a message for a sleeping node until the node "requests" the message by notifying its parent that it is awake. A terminal learns that it must request unsolicited saved message by examining the pending message list in the HELLO.response packet. This implementation enables sleeping terminals to receive unsolicited messages and relaxes the timing constraints for transaction oriented messages.

ATTACH, DATA, and ARP request packets can contain several network parameters which are used for storing pending messages for sleeping terminals in the parent router node. A "delivery service type" parameter, indicates that a terminal (i.e. which sent the request) is sleeping. An "awake time window" parameter is used to specify an awake time period. An "awake time offset" parameter is used to specify the start of the awake time window. (The awake time window is effective immediately if an awake time offset is not specified.) An "auto awake" delivery service type can be used to implicitly set an awake time window each time the parent node receives a message from the sleeping terminal. A "maximum stored message count" field specifies the maximum number of HELLO times that a message should be stored in the parent router node. The network layer entity in a parent node will store pending messages until 1) the message is delivered, or 2) "maximum stored message count" hello times have expired.

Address Resolution

An address server in the root node maintains network addressing information in an address table, distributes network addresses to requesting nodes, and resolves network addressing problems. Each entry in the address table contains a device type field, a network address field, a long ID field, an alias field, an in-use field, and an age field. Entries in the table are aged so that they can be reused after MAX_ADDRESS_LIFE minutes. Aged entries are kept in the table indefinitely. The age field in an entry is reset to 0 whenever a RARP.request or ATTACH.request packet is received from the node associated with the entry.

A separate sequential set of unique node identifiers is maintained for router nodes and terminal nodes. Each set begins with an identifier of 1 and ends with the maximum range for the device type.

Reverse Address Resolution Protocol (RARP)

A RARP.request packet can be used to: 1) acquire a network address from the address server, 2) change an existing 48-bit long identifier in the address table, or 3) change an existing alias in the address table.

A node which does not yet have a unique 16-bit network address must request a 11-bit node identifier from the address server. The node uses a multicast address until a unique node identifier is assigned. A RARP.request packet, containing the requesting node's unique 48-bit long identifier and/or an alias, is sent to the address server by the requesting node. When a node requests a new address, the server first checks its address table to determine if the node already has a (valid or aged) address. If the node doesn't already have an address, the server allocates the next available node identifier, for the device type, to the node. In either case, if an address is available, the server will set a network address field in the RARP packet to the allocated address and will set a RARP return code to 0. If an address is not available, or an entry already exists in the address table with ambiguous identifiers, the address server will set the network address field to all 1's and will indicate the error in the return code field.

The address servers returns the RARP.request packet to the requesting node as a RARP.response packet. If the node, which generated the RARP.request packet, does not receive a RARP.response packet within PATH_TIMEOUT seconds, it must resend the RARP.request.

RARP routing

RARP packets can not be routed with regular routing tables because a node does not have a unique network address until it receives a RARP response packet. Each router node maintains a separate RARP routing table which contains entries for upstream nodes which have recently sent a RARP.request packet to the root node.

An example RARP route table is shown below:

| long ID | alias | port | first hop | network address | return code | age |
|---|---|---|---|---|---|---|
| hex 1003508A990C | null | 1 | hex 020A | hex FFFF | invalid | 0 |
| hex 1003508A920B | term2 | 1 | hex 87FF | hex 080C | 0 | 3 |

Figure 10. An Example RARP Routing Table.

Whenever a RARP.request packet is received, an entry is created (or updated) in the RARP route table and the long ID and/or alias fields in the entry are set to the values specified in the request packet. The node which initiated the request is defined by the long ID and/or alias. The return code is initialized to "invalid" to indicate that an associated RARP.response packet, destined for the node which originated the RARP.request, has not been received. The port field points to the port on which the RARP.request was received. The network address is set to the network layer source address of the RARP.request packet. The default global node identifier (i.e. all 1's) is used before a unique network node identifier is obtained. (If a node is attempting to change its long ID or alias, then the network address may be unique.) The first hop field will be set to the MAC source address. The age field will be set to 0.

Normally, a router node will forward RARP.request packets to the root node. However, if a router node receives a RARP.request packet, and a valid entry for the node which initiated the request is already in the RARP route table, the router can simply return a RARP.response packet to the source node.

When a router node receives a RARP.response packet from the root node, it will update the return code and network address fields in the RARP route table entry for the node which initiated the request. RARP.response packets are forwarded on the port specified in the route table entry. The MAC destination address is set to the first hop address. Note that the last hop is often made with a broadcast transmission.

RARP route table entries are aged (quickly) so that older entries are discarded in RARP_TIMEOUT seconds.

Address Resolution Protocol (ARP)

A node can request the 16-bit network address of another node by sending an ARP.request packet to an address server in the root node. The ARP.request packet must contain either the 48-bit identifier or the alias of the target node, but not both. The address server returns the 16-bit network address of the target node in an ARP.response packet, if the target node exists in the server's address table. An address of all 1's and an error is returned if the target node is not in the address table or if the entry for the target node is aged.

Address maintenance

A node will lose its address if: 1) the root node changes (i.e. either a different ROOT ID or root sequence number is detected in a HELLO.response packet); 2) it has not received an ATTACH.response packet, from the root node, within an ADDRESS_TIMEOUT time period; or 3) no network activity is detected within a NETWORK_TIMEOUT time period.

A node can maintain its address by sending an ATTACH.request packet to the root node at least once per ADDRESS_TIMEOUT time period. Note that a node must send an ATTACH.request to the root at least once per ROUTE_TIMEOUT time period, to maintain its path to the root in the spanning tree; therefore no special logic is required for address maintenance. If the node is active it can simply piggyback the ATTACH.request on a higher-layer downstream data packet. The root node will return an ATTACH.response packet, and the node can reset its ADDRESS_TIMEOUT timer when the response packet is received.

root resolution

Root resolution states

The network layer entity in each router node is in one of the following high-level node states:

R  - Root node. The node owns the root node address.
RC - Root candidate node.
NR - Router node which has a non-zero root priority.

An 'a' subscript is used to denote nodes without a network address.

All node states are further qualified by one of three attach states:

D - The node is Disabled and unattached.
U - The node is enabled and Unattached.
A - The node is enabled and Attached to the network.
I - The node is in an Intermediate hold-down state.

For example, RC.U, is used to denote the node and attach state of a root candidate which is not attached to the network.

The following substates are used to qualify an unattached node:

idle - No network activity has been detected.
   wait - Wait for the first HELLO.response packet.
   hello - A HELLO.response packet has been received.

Each MCNA network must have one or more root candidates. Each root candidate node enters the RC.U state when the network layer entity in the node is enabled. This state ends when 1) the root candidate determines that a higher priority root node already exists and enters the NR.U state, or 2) the root candidate assumes ownership of the root node status and enters the R.A state. A node in any NR state assumes the root node status if 1) the network becomes idle, or 2) a lower priority root node is detected.

A root candidate which does not detect any activity assumes the root node status. If activity is detected, the root candidate remains in the RC.U.wait state until a HELLO.response packet is received or until network activity ceases.

In the R.A state the root node broadcasts a HELLO.response packet once per HELLO_PERIOD time period, according to a random distribution algorithm. The root HELLO.response packets contain a path cost of 0, the priority of the root node, a root sequence number, and a ROOT ID which is either the unique long identifier or the unique alias of the root device. <u>The priority, root sequence, and ROOT ID fields are copied into the HELLO.response packets transmitted by all non-root routers in the network</u>. The root sequence number is stored in non-volatile storage by all root candidates. The sequence number is copied into RAM by the root node when it determines that it is the root and the copy in non-volatile storage is incremented.

Hello packet priority

A "higher priority HELLO.response packet" is defined as any HELLO.response packet which contains a matching LAN ID and either 1) a higher ROOT PRIORITY field, or 2) an equal priority field and a higher priority ROOT ID. A ROOT ID can consist of a unique 48-bit device ID and/or a device alias. A "higher priority ROOT ID" is defined as 1) the ID with the higher 48-bit ID, or, 2) if neither candidate has a 48-bit ID, the ID with the alias with highest string value. Note that if the ROOT ID does not contain a unique 48-bit device ID, then the 48-bit device ID is assumed to be all 0's.

It may be possible for a root candidate to receive a HELLO.response packet with an equal priority if the ROOT ID field in the HELLO.response packet matches the candidate's device identifier. Received HELLO.response packets with a ROOT ID field that matches the identifier of the local device and a non-zero path cost are assumed to be associated with an out-of-date spanning tree and are discarded by the network layer. Received HELLO.response packets with a matching ROOT ID and a zero path cost cause a fatal error.

The state transition table below defines transitions in the root resolution process.

Table 7. Root Resolution State Transition Table.

| state | event | action | next state |
|---|---|---|---|
| RC.D | Network layer entity enabled. | Enable data link layer on all network ports; set HELLO_TIMEOUT inactivity-timer. | RC.U.idle |
| RC.U.idle | Inactivity-timer expires. | | R.A |
| | Non-HELLO packet received. | Set R_IDLE_TIME inactivity-timer. | RC.U.wait |
| | Higher priority HELLO packet received. | Set R_IDLE_TIME inactivity-timer; set HELLO_TIMEOUT hello- timer. | NRa.U.hello |
| | Lower priority HELLO packet received. | | R.A |
| RC.U.wait | Inactivity-timer expires. | | R.A |
| | Non-HELLO packet received. | Set R_IDLE_TIME inactivity-timer. | RC.U.wait |
| | Higher priority HELLO packet received. | Set R_IDLE_TIME inactivity-timer; set HELLO_TIMEOUT hello- timer. | BRa.U.hello |
| | Lower priority HELLO packet received. | | R.A |
| NR.U | Lower priority HELLO packet received. | Set R_IDLE_TIME inactivity-timer. | NR.I then RC.U.wait |
| R.A | Higher priority HELLO packet received. | Transmit HELLO packets with an infinite path cost for MAX_HELLO_LOST+1 HELLO periods; set R_IDLE_TIME inactivity-timer; set HELLO_TIMEOUT hello-timer. | R.I then NRa.U.hello |

CHAPTER

TRANSPORT LAYER

The MCNA transport layer provides a reliable connection. oriented service and an unreliable connectionless service. The MCNA network layer does not provide a reliable end-to-end service because it can lose packets over transient radio links.  Go-back-n transport error recovery is sufficient since he network layer does not fragment packets and packets are normally delivered in sequence.  The transport layer recovers from lost packets, discards duplicate packets, and fragments and reassembles logical user messages. Essentially, it provides a data pipeline between access points in terminal nodes.

Connection oriented services are provided with the following primitives:

```
TL_CONNECT.request(alias,DSAP, . . .)
TL_CONNECT.indication(destination,DSAP,SSAP, . . .)
TL_LISTEN.request(SSAP, . . .)
TL_SEND.request(connection, buffer, length)
TL_RECEIVE.indication(connection, buffer, length)
TL_DISCONNECT.request(connection)
```

Connectionless services are provided with the following primitives:

TL_UNITDATA.request(alias,DSAP,SSAP, buffer, length);
    TL_UNITDATA_LISTEN.request(SSAP,...);

A transport connection is defined by a destination and source network address and a destination and source service access point (SAP). The TL_CONNECT and TL_LISTEN functions are used to establish a transport connection between two service access points. A transport application in a first node can use TL_LISTEN to "listen" on a well-known source service access point (SSAP). A transport application in a second node can "connect" to the well-known access point with the TL_CONNECT function. The TL_CONNECT.request DSAP parameter is the same as the SSAP parameter used in the TL_LISTEN.request. A connect SSAP is generated by the system in the second node. The "alias" passed to the TL_CONNECT.request function is the network name of the first node. The network layer converts the alias into a network address. Once a connection is established, data is sent and received with the TL_SEND.request and TL_RECEIVE.indication functions. A node which initiates a connection must insure that at least a MAX_PACKET_LIFE time period has expired since an old connection existed before issuing a new
TL_CONNECT.request with the same alias, DSAP, and SSAP.

Since all packets sent during a connection may not
follow the same path, no more than MAX_SEQ frames may be
sent in a MAX_PACKET_LIFE time period, where MAX_SEQ is the
maximum message sequence number and MAX_PACKET_LIFE is the
longest time that a packet can be delayed in the network.
Note that the spanning tree topology insures that packets
will not loop.

The transport entity in a terminal node stores messages
for possible retransmission. Retransmissions may not always
follow the same path, as the original transmission, due
(primarily) to moving terminals and the resulting changes in
the spanning tree. For example, the network layer entity in
a parent node may disconnect a child after the data link
entity reports a message delivery failure. The child will
soon discover that it is detached and will reattach to the
spanning tree with a different parent. Now when a transport
layer message is (re)sent, it will follow the new path.

Network packets can be lost due to terminal roaming or
network congestion. In a congested network a packet can be
discarded by a router node when the router does not have a
free buffer. A timer is started for each transmitted
transport message which requires a response. If the
expected response is not received within a reasonable time period, the message is retransmitted. Retransmitting discarded messages too quickly can aggravate the congestion problem. The MCNA transport layer uses an adaptive timer algorithm to adjust the expected propagation delay for transport messages to the end-to-end distance and traffic load, without causing sporadic changes or dramatic swings in time-out values. The algorithm prevents the transport layer from saturating the network by increasing message time-out values (i.e. increasing the time between retransmissions) whenever a message is lost. The algorithm prevents saturation when the network is congested but reduces response times when messages are lost due to roaming terminals. To alleviate this problem, the MCNA network layer notifies the transport layer when a network layer path change is detected. The notification can trigger an immediate retransmission if unacknowledged messages exist on a connection, or an expected response has not been received.

Since network addresses are a component of a transport connection identifier, the transport entity in each node must be notified when the root node changes. Old network addresses are invalid if the root node changes and the associated transport connections are lost.

A separate trivial transaction-oriented transport protocol (TTTP) is required to reliably gather network statistics and to send mail messages between terminals.

75

TTTP allows information to be reliably exchanged between nodes without the overhead of creating and deleting connections. TTTP requires a response at the application layer and retries transaction requests until a response is received. All transactions are assumed to be idempotent.

CHAPTER

SUMMARY

The MCNA backward learning technique eliminates the need to broadcast or exchange routing information. Roaming terminal nodes can switch paths immediately with little added overhead. A disadvantage of the backward learning technique is that a terminal node can not directly communicate with another terminal node. All data traffic must be routed through the nearest common ancestor, thus increasing the total data traffic in the network. MCNA assumes that most of the extra traffic can be localized to high-speed wired links. This is certainly a valid assumption if the predominant application is terminal emulation, since most traffic is directed to a host computer.

An MCNA network is inherently redundant. If a router node fails, the subtree underneath it will quickly re-attach to the network, with minimum overhead, provided a coverage area is not lost. If the root node is lost, the root resolution protocol enables another node to assume the root status and the spanning tree can be re-built.

MCNA provides an efficient and robust solution for connecting a periphery of mobile terminals to a stable network infrastructure.

REFERENCES

[1] B. M. Leiner, D. L. Nielson, and F. A. Tobagi, "Issues in Packet Radio Design", Proceedings of the IEEE, Vol. 75, No. 1, January 1987.

[2] L. Kleinrock and F. A. Tobagi, "Packet Switching in Radio Channels: Part I - Carrier Sense Multiple Access Modes and the Throughput Delay Characteristics", IEEE Transactions on Communications, Vol. COM-23, No. 12, December 1975.

[3] L. Kleinrock and F. A. Tobagi, "Packet Switching in Radio Channels: Part II - The Hidden Terminal Problem in Carrier Sense Multiple Access and the Busy Tone Solution", IEEE Transactions on Communications, Vol. COM-23, No. 12, December 1975.

[4] L. Kleinrock and F. A. Tobagi, "Packet Switching in Radio Channels: Part IV - Stability Considerations and Dynamic Control in Carrier Sense Multiple Access", IEEE Transactions on Communications, Vol. COM-25, No. 10, October 1977.

[5] L. Kleinrock and J. Silvester, "On the Behavior of Multi-hop Packet Radio Networks", Proceedings of the IEEE, Vol. 75, No. 1, January 1987.

[6] M. B. Pursley, "The Role of Spread Spectrum in Packet Radio Networks", Proceedings of the IEEE, Vol. 75, No. 1, January 1987.

[7] J. O. Onunga and R. W. Donaldson, "Performance Analysis of CSMA with Priority Acknowledgments (CSMA/PA) on Noisy Data Networks with Finite User Population", IEEE Transactions on Communications, Vol. 39, No. 7, July 1991.

[8] L. Kleinrock and J. Silvester, "Spatial Reuse in Multi-hop Packet Radio Networks", Proceedings of the IEEE, Vol. 75, No.1, January 1987.

[9] F. Backes, "Transparent Bridges for Interconnection of IEEE 802 LANs", IEEE Network, Vol. 2, No. 1, January 1988.

[10] International Standard ISO/DIS 8802-2.2.

[11] A. S. Tanenbaum, "Computer Networks", Prentice Hall, Second Edition

[12] D. E. Comer, "Internetworking with TCP/IP", Prentice Hall

APPENDIX B

OWL Network Architecture

| Norand OWL Network | | |
|---|---|---|
| OWL Network Architecture | Revision 1, January 31, 1994 | page 2 |

```
Overview..............................................................................................3
Network components and definitions....................................................7
MAC-D Sub Layer.................................................................................9
        MAC-D Sub Layer for radio links...............................................9
                Radio MAC-D Protocol Data Units................................9
                        MAC-D header format........................................10
                        Control frames...................................................10
                                Control frame format.................................10
                                Control frame types..................................10
                                        Control request frame types............10
                                        Control response frame types.........10
                                Data frames..............................................11
                                        Data frame format........................11
                        Frame transmission.............................................11
                        Radio Channel Access........................................12
        802.3 MAC-D Sub Layer...........................................................14
                802.3 MAC-D header format.......................................14
                802.3 MAC-D data frame format.................................15
MAC-R Sub Layer.................................................................................15
        MAC-R Protocol Data Units.......................................................15
                MAC-R Header Format................................................15
                MRPDU types.............................................................15
        OWL Network Spanning Tree....................................................16
                Building the Spanning Tree..........................................17
                Attaching through a secondary WDAP.........................19
                MAC-R Routing..........................................................19
                        Dynamic routing changes and PDU retransmission.........21
                        Registration........................................................22
                        Broadcast routing................................................23
        Sleeping Terminal Support.......................................................23
WDAP bridging...................................................................................24
        Optimization considerations.....................................................24
MAC-Q Sub layer.................................................................................24
MAC-S Sub Layer.................................................................................25
```

Norand Confidential

| Norand OWL Network | | |
|---|---|---|
| OWL Network Architecture | Revision 1. January 31, 1994 | page 3 |

Overview.

Norand's open wireless LAN (OWL) architecture is designed to facilitate wireless communications at the MAC sub layer of the ISO protocol stack. An OWL radio network can function as a stand-alone LAN or it can function as a subnet in an 802 LAN to provide wireless access to wired 802 subnets. An 802 LAN may include multiple wired 802 subnets and OWL subnets. Figure 1 shows an example 802 LAN which includes an OWL subnet. The OWL subnet (i.e. subnet 4) includes the OWL radio network (i.e. subnet 2) and an 802.3 subnet (i.e. subnet 3).

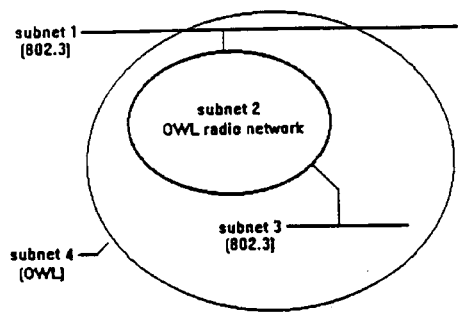

figure 1.

Figure 2 shows an example 802 LAN, similar to the LAN in figure 1, with an expanded view of the OWL radio network. Subnet 1 is not part of the OWL subnet, however it provides a distribution LAN for the OWL subnet. An OWL radio network provides wireless access to the 802 LAN for mobile radio-equipped computers (MRCs). An OWL radio network can also provide a wireless transparent bridge between wired 802 subnets (i.e. an OWL subnet can include a wired 802 subnet). Any node in an 802 LAN, which includes an OWL subnet, can communicate with any other node, at the logical link control (LLC) sub layer of the data link layer. In figure 2, remote station 1 can communicate with either MRC or remote station 9. MRC 6 can communicate with MRC 8 or either remote station.

Norand Confidential

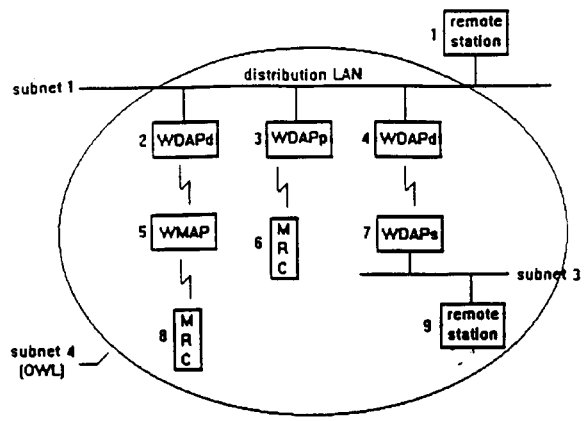

Figure 2.

The IEEE 802.11 committee has defined two basic types of wireless networks - hierarchical and ad hoc. Hierarchical networks contain radio-equipped access points which provide a centralized control function for a given radio coverage area. All communications pass through the access point. The access point also provides access to a wired LAN. A hierarchical network may contain multiple access points which provide an extended seamless radio coverage area. Mobile computers can roam from one access point coverage area to another. Ad hoc networks facilitate peer-to-peer communications in the absence of a central control point. The OWL protocol can support both network types; however this discussion is primarily directed toward hierarchical networks.

The OWL protocol stack is contained in the MAC sub layer of the ISO protocol stack. An OWL MAC (i.e. in a terminal node) provides MAC sub layer services to the LLC sub layer of the ISO data link layer. The OWL MAC is subdivided into 4 sub layers: MAC-D, MAC-R, MAC-Q, and MAC-S.

MAC-D - The MAC-D sub layer is analogous to the data link layer in the ISO protocol stack. The MAC-D layer provides data link services to the MAC-R layer. It is responsible for channel access control and the reliable transmission of MAC-R PDUs across a single link in the OWL network. The MAC-D sub layer is specific to the link type (i.e. radio, ethernet, etc.).

MAC-R - The MAC-R sub layer is analogous to the network layer in the ISO protocol stack. The MAC-R layer provides routing services to the MAC-Q layer. It is responsible for correctly routing MAC-R PDUs through the OWL subnet, which may include multiple hops and circular physical paths.

MAC-Q - The MAC-Q sub layer adds reliability to the radio network by retransmitting lost PDUs. The MAC-Q layer is responsible for discarding out-of-sequence and duplicate PDUs. The MAC-Q sub layer can be implemented as an entity in the MAC-R sub layer. MAC-Q entities exist at entry points to the radio network.

Norand OWL Network
OWL Network Architecture     Revision 1, January 31, 1994     page 5

MAC-S - The MAC-S sub layer is responsible for providing services for security, compression, etc. MAC-S entities exist at entry points to the OWL radio network.

A logical OWL node is a MAC-R addressable entity in an OWL radio network. An OWL node can be one of two types: 1) a terminal node or 2) a relay node. Terminal nodes are end points in the network; relay nodes forward PDUs at the MAC-R sub layer. Figure 3 shows MAC protocol stacks for both node types. The arrows represent the flow of data between MAC sub layers in each node type. (The upper layers in the relay stack are used to process PDUs addressed to the relay node.)

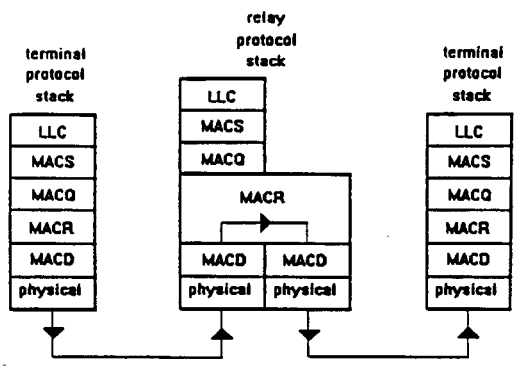

figure 3.

A wireless domain access point (WDAP) is an OWL bridge which is used to bridge a radio subnet to a wired 802 subnet. A WDAP contains a bridge protocol stack. Figure 4 shows the MAC protocol stack for a WDAP. Note that the bridge protocol stack contains a relay protocol stack. The 802.3 MAC-D sub layer is used to send OWL PDUs over an 802.3 link that is part of the OWL radio network. The MAC-Q and MAC-S sub layers serve as proxy MAC-Q and MAC-S entities for stations on the 802.3 sub net. For convenience, the MAC-Q and MAC-S sub layers also service PDUs for the local WDAP 802 address.

Norand Confidential

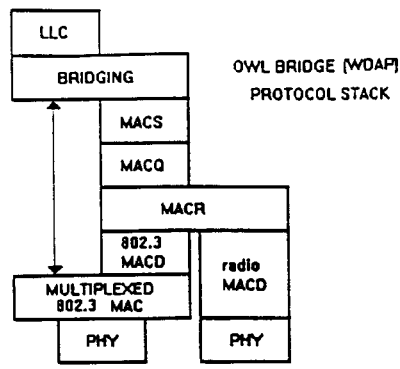

figure 4.

Figure 5 illustrates how data flows through a bridge protocol stack. The dotted line represents the path a PDU takes as it travels from a station on an 802.3 LAN to terminal 2 in an OWL radio network. The WDAP "bridges" the PDU from the 802.3 subnet to the radio subnet. The solid line represents the path a PDU takes as it travels from terminal 1 in the radio network to terminal 2 in the radio network. Since the path is contained in the radio network, the PDU does not have to be bridged.

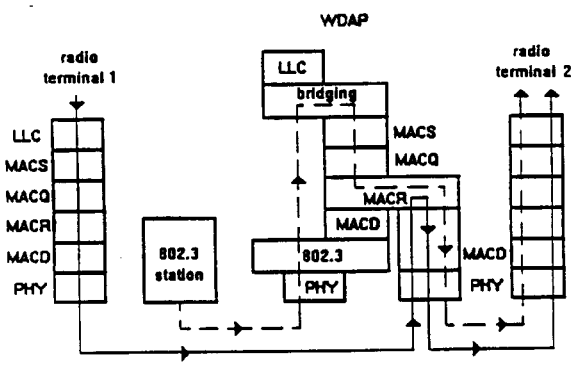

figure 5.

Norand OWL Network
OWL Network Architecture    Revision 1. January 31, 1994                page 7

In general, PDUs are bridged across subnet boundaries; PDU's are routed within the radio network. A bridging entity in a WDAP uses a forwarding database to determine if a PDU should be bridged from one subnet to another subnet. A forwarding database contains a list of 802 address associated with each subnet to which the WDAP is attached. A MAC-R entity uses a routing table to determine how a PDU should be routed within an OWL subnet.

Network components and definitions.

802 LAN - a local area network which conforms to the IEEE 802 standards. For the purpose of this discussion, it is assumed that "802 LAN" refers to a LAN which contains wired 802.3 subnets and 1 or more OWL subnets.

802 subnet - a subnet in an 802 LAN which is not an OWL subnet.

OWL subnet - a subnet in an 802 LAN which includes an OWL radio network and 0 or more 802 subnets.

OWL Radio Network - An OWL subnet minus its wired subnets (see figure 1). An OWL radio network may include wired (i.e. 802.3) communications links. The OWL radio network consists of MAC-R addressable nodes and communications paths.

Mobile Radio-equipped Computer (MRC) - A mobile radio-equipped computer which contains an OWL terminal node.

Wireless Media Access Point (WMAP) - a radio-equipped base station which allows physical access to a wireless link in an OWL LAN. A WMAP may be connected to the radio network through a wired link or a radio link. A typical OWL radio network has multiple WMAPs with overlapping coverage areas. MRCs can roam between coverage areas. Except for possible timing issues, roaming has no effect on protocol layers above the MAC sub layer.

Wireless Domain Access Point (WDAP) - a logical access point to an OWL radio network. There are several types of WDAPs which are defined below. A WDAP is typically contained in a WMAP which is directly connected to a wired 802 subnet. The WDAP provides a bridge between the radio network and the wired subnet. A WDAP has a MAC-S and MAC-Q sub layer since it provides an entry point to the radio network. At any given time, one, and only one, WDAP provides access to a distribution LAN for a node in the OWL subnet.

OWL Node - A MAC-R addressable entity in an OWL radio network.

OWL Terminal Node - A MAC-R addressable OWL node which is an end point in an OWL radio network. A terminal OWL node is simply referred to as a terminal when the meaning is not ambiguous. A terminal has a MAC-S and MAC-Q sub layer since it provides an entry point to the radio network.

OWL Relay Node - A MAC-R addressable OWL node which is an interior node in an OWL radio network. MAC-R frames are routed through OWL relay nodes.

OWL Spanning Tree - An OWL spanning tree consists of a single root node, OWL relay nodes, terminal nodes, and edges, where a single edge logically connects two nodes for routing purposes. A branch is a logical path which contains 1 or more edges and the associated nodes. MAC-R frames are routed along branches of a spanning tree.

OWL Network Spanning Tree - All nodes in a hierarchical OWL subnet are organized into a network spanning tree for control purposes. A single network spanning tree constitutes an OWL domain. The root Norand Confidential

| Norand OWL Network | | |
|---|---|---|
| OWL Network Architecture | Revision 1, January 31, 1994 | page 3 | of the network spanning tree contains a primary WDAP. Note that an 802 LAN may contain multiple OWL network spanning trees (domains).

OWL Access Spanning Tree - An access spanning tree is a sub tree in a network spanning tree. The root of an access spanning contains a distributed or primary WDAP and provides direct access to a distribution LAN.

Net ID - The Net ID identifies the set of nodes which belong to a single OWL domain - a network spanning tree or an instance of an ad hoc network. A hierarchical bit specifies whether the Net ID is for a hierarchical network or an ad hoc network. A global bit is used to indicate if the Net ID is globally unique. All nodes in an OWL domain share a common Net ID.

Super Root - the root of a network spanning tree. Multiple access points, attached to a distribution LAN, can negotiate to determine which node should function as the super root of a network. The super root is the node with the highest super root priority. The super root must have direct access to a distribution LAN. The super root is the primary WDAP.

Access Root - the root of an access spanning tree. An access root is a primary or distributed WDAP.

Distribution LAN - An 802 LAN segment which connects a wired subnet to the OWL subnet through the primary WDAP and 0 or more distributed WDAPs.

Distributed Root - the set of nodes which consists of the super root and all access roots. For a single OWL node, the distributed root can be viewed as the super root and the distributed WDAP which is providing access for the node to the distribution LAN.

Primary WDAP (WDAPp) - A single primary WDAP serves as the super root and provides a single control point for an OWL subnet. The primary WDAP has direct access to the distribution LAN. The primary WDAP forwards 802 frames from the distribution LAN to the OWL subnet and from the OWL subnet to the distribution LAN.

Distributed WDAP (WDAPd) - A distributed WDAP provides direct physical access to the distribution LAN. Distributed WDAPs exist within the domain of the primary WDAP. A distributed WDAP forwards 802 frames from the distribution LAN to the OWL subnet and from the OWL subnet to the distribution LAN.

Secondary WDAP (WDAPs) - An OWL subnet may include remote wired subnets other than the distribution LAN. A single secondary WDAP serves as a bridge between the remote wired subnet and the OWL subnet. 802 frames are forwarded from the remote wired subnet to the radio subnet and from the radio subnet to the remote wired subnet through the secondary WDAP.

Station - an entity in the 802 LAN which has a unicast 802 address.

OWL Station - a station in an OWL radio network.

Remote Station - a station which is not in an OWL radio network.

Node ID - In a hierarchical network, each OWL node must obtain a network unique node ID from the super root. The concatenated Net ID and node ID uniquely identify the node within the radio network. The node ID for a relay node includes a port ID field which is used to uniquely define each port within a node (i.e. in case a node has more than one port per physical link). Port IDs are defined internally by each node. A port ID of all 1's is reserved as a broadcast port ID.

Norand Confidential

Norand OWL Network
OWL Network Architecture          Revision 1, January 31, 1994                          page 91

In an ad hoc network, node IDs are randomly generated from the set of node IDs which are not known to be in use. Node ID 1 is reserved for the node which initiated the ad hoc network.

originator - the node which originates a unicast or multicast transmission.

sink - the target node of a unicast transmission.

conversation - a series of transmissions which are used to forward a frame from an originator to a sink. The frame may be divided into multiple fragments.

MDPDU - a MAC-D sub layer protocol data unit.

MRPDU - a MAC-R sub layer protocol data unit.

MQPDU - a MAC-Q sub layer protocol data unit.

MSPDU - a MAC-S sub layer protocol data unit.

MQPDUID - The concatenation of the MQPDUID and 802 source and destination addresses uniquely identifies an MQPDU in an OWL radio network.

inbound - Nodes which are logically closer to the root node of a spanning tree are considered "inbound" from nodes which are further from the root. A DOWNSTREAM bit in a MAC-R control field is set ON to indicate that the source of a MRPDU is inbound from the destination of the PDU. Note that terminal nodes never set the DOWNSTREAM bit ON. A inbound PDU is any PDU which is traveling toward the root.

outbound - Nodes which are logically further from the root node of a spanning tree are considered "outbound" from nodes which are closer to the root. An outbound PDU is any PDU which is traveling away from the root.

MAC-D Sub Layer.

The MAC-D sub layer controls access to the channel and is responsible for providing reliable transmission between any two devices in the radio network. A radio network may include both wired and radio links. The MAC-D sub layer is specific to the physical link type. An 802.3 MAC-D sub layer is used on 802.3 links and a radio MAC-D sub layer is used on radio links.

MAC-D Sub Layer for radio links.

The radio MAC-D sub layer provides "acknowledged connectionless" services to the MAC-R sub layer. A "connection" is not required to transmit an MRPDU; however, each PDU is acknowledged at the MAC-D sub layer and errors are reported to the MAC-R sub layer. For a terminal node, a MAC-D link error provides an indication that the terminal has roamed.

Radio MAC-D Protocol Data Units.

An MDPDU is classified as either a control frame or a data frame. Control frames facilitate network access and error recovery for unicast conversations. Data frames contain an MRPDU. A single bit in a frame type field indicates whether a frame is a control frame or data frame. A common header format is used for both control and data frames.

Norand Confidential

| Norand OWL Networks | | |
|---|---|---|
| OWL Network Architecture | Revision 1, January 31, 1994 | page (?) |

MAC-D header format.

protocol ID
network ID
destination node ID
source node ID
control
reservation

Control frames.

Control frame format.

preamble
SFD (start frame delimiter)
<physical layer header>
MAC-D header
CRC

Note that control frames have a fixed length.

Control frame types.

A control frame is classified as either a request frame or a response frame. A single bit in the type field indicates if a control frame is a request or a response.

*Control request frame types.*

RFP - an RFP frame is used to reserve the network for a unicast conversation.

ENQ - an ENQ frame is used by an originator to determine the status of a previous end-of-data fragment transmission. The sink responds by re-transmitting its last CLEAR. If the sink node does not have CLEAR state information, it responds to an ENQ by transmitting a REJECT. Note that an ENQ/POLL pair correspond to an RFP/POLL pair with respect to channel access.

ABORT - an ABORT can be used by an originator to abort an active conversation. Note that a conversation can be restarted at any time.

*Control response frame types.*

POLL - a POLL is used to grant access to the network and to solicit the transmission of a unicast data frame fragment. The control byte in an POLL frame contains the 1-bit sequence number of the next data frame fragment expected.

CLEAR - a CLEAR frame is used to acknowledge the reception of the last unicast data frame fragment in a conversation. A last-in-chain (LIC) bit distinguishes a CLEAR frame from an POLL frame.

REJECT - a REJECT frame is used by a sink to notify an originator that a unicast conversation has been aborted by the sink or that the sink does not have POLL state information for the originator. The originator must restart the conversation. If a sink receives an out-of-sequence DATA frame, it replies with a REJECT frame and aborts the conversation.

FRMR - a FRMR frame can be transmitted by a sink to indicate that an unrecognized frame type was received.

Norand Confidential

| Norand OWL Network | | |
|---|---|---|
| OWL Network Architecture | Revision 1, January 31, 1994 | page 11 |

Data frames.

Data frames are used to send MAC-R data. The control field in a data frame contains a 1-bit sequence number used to facilitate fragmentation and re-assembly of large unicast frames. All broadcast and multicast transmissions consist of a single DATA frame. Unicast frames may be broken into multiple DATA fragments for transmission. A first-in-chain (FIC) bit is set ON in the first DATA fragment of a frame. The sink resets its receive sequence state when an FIC DATA fragment is received. A last-in-chain (LIC) bit is set ON in the last DATA fragment of a frame. Note that both FIC and LIC are set ON in single-fragment frames. An EOD (end-of-data) fragment is a data fragment with the LIC bit set ON. Fragmentation and re-assembly at the MAC-D sub layer is transparent to the MAC-R sub layer.

Data frame format.

preamble
SFD
MAC-D header
MRPDU fragment
CRC

Frame transmission.

A MULTI bit in the control byte is used to indicate if a response is required for a DATA request frame. The MULTI bit must be set ON for all frames which contain a broadcast or multicast source or destination ID. The MULTI bit can be set ON for unicast transmissions if an acknowledgment is not required.

Example multicast transmission:

EOD ---------------->

Example unicast transmission with no errors:

```
RFP ------------------->
    <-------------------- POLL 0
DATA 0 ---------------->
    <-------------------- POLL 1
DATA 1 ---------------->
    <-------------------- POLL 0
EOD 0 ----------------->
    <-------------------- CLEAR 1
```

If a sink receives an RFP frame and the channel is reserved, then the sink must withhold the POLL frame. The originator must calculate a random back off time and retry later.

Norand Confidential

Example transmission with errors:

```
RFP ------------------------->
         <------------------------- POLL 0
DATA 0 ---------------------->
         <------------------------- POLL 1
       ( POLL lost)
         <------------------------- POLL 1
DATA 1 ---------------------->
       ( DATA lost )
         <------------------------- POLL 1
DATA 1 ---------------------->
         <------------------------- POLL 0
EOD 0 ----------------------->
         <------------------------- CLEAR 1
       ( CLEAR lost )
ENQ ------------------------->
         <------------------------- CLEAR 1
```

Radio Channel Access.

Channel access in an OWL radio network is complicated by the presence of multiple overlapping radio coverage areas and hidden nodes. A given first radio transceiver is said to be hidden from a second transceiver, if the second transceiver is not in range of the first, but transceivers exist which are in range of both. In figure 6, the large circles represent the radio coverage area of nodes A, B, C, and D. C, for example, is considered to be hidden from A since it is not in A's coverage area, but a node, B, is in the coverage area of both.

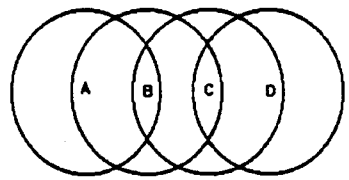

figure 6.

The hidden node problem can severely limit bandwidth utilization in a simple carrier sense radio network if the percentage of hidden nodes is significant. As an example, assume that node A, in figure 6, is transmitting a frame to node B. If, at the same time, C senses the channel it will appear idle, since C can not hear A. If C begins transmitting to D, the transmission from A will collide with the transmission from C at B and will likely be lost. (The transmissions from A and C will not collide at D.)

The OWL MAC-D sub layer uses a listen-before-talk (LBT) collision avoidance protocol to reduce the number of collisions caused by hidden nodes. Nodes reserve the channel for unicast conversations. The reservation in request frames reserves the channel for succeeding data frames. Response frames echo the reservation in the previous corresponding request frame. The reservation in a request frame does not have to span an entire conversation since the reservation can be extended in succeeding data frames. (Shorter reservations reduce dead times when frames are lost.) The reservation in a request frames includes an implicit reservation for the required response (including turnaround time).

The channel reservation technique generally restricts channel access contention to RFP frames. In the absence of lost frames, an LBT algorithm is executed only once per MAC-D conversation. An originator executes the LBT algorithm and transmits an RFP frame if the channel is free. The originator owns the channel for the duration of a conversation as soon as it receives a POLL from the sink. Subsequent DATA fragments can be sent without additional channel access logic. If the channel is not free, a random back off algorithm, chooses a back off delay as a function of the LBT slot time and the number of retries. An LBT slot is defined as a function of the best case and worst case busy-sense time. The best case busy sense time is equal to the amount of time from the point at which a node detected the channel idle, before transmitting, until another node can detect the transmission in progress. The worst case busy-sense time is equal to the time required by the originator to sense the channel idle and send an RFP frame plus the time required by a sink to start sending a POLL frame. Figure 7 shows a time line for a unicast conversation between two nodes, A and B. If the originator, A, senses the channel idle at time 0, then the worst-case busy sense time is $t_{ws}$.

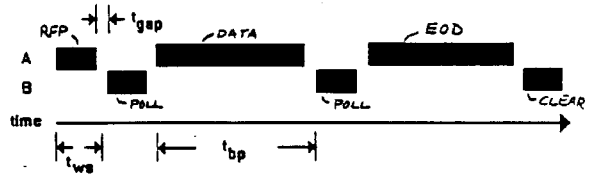

figure 7.

Each node in the network must maintain RESERVE_TIME and RESERVE_NODE channel reservation variables and a local clock. The channel is reserved if the RESERVE_TIME value is greater than the current time. The RESERVE_TIME variable is updated if a reservation is received and 1) the channel is currently not reserved, or 2) the transmitter of a request frame is the RESERVE_NODE node, or 3) the destination of a response frame is the RESERVE_NODE node, or 4) the reservation field in a unicast frame reserves the channel for a time greater than the current RESERVE_TIME period. The RESERVE_TIME is set to 0 whenever a reservation of 0 is observed and the RESERVE_NODE node is the destination of a response frame. The RESERVE_TIME is set to 0 whenever the local node is the target of a unicast transmission from the RESERVE_NODE.

The RESERVE_NODE is set to the concatenated Net ID and node ID of the node which is reserving the channel (i.e. the source node ID and Net ID in a request frame or the destination node ID and Net ID in a response frame) whenever the RESERVE_TIME is updated.

The channel is considered busy if it is sensed busy or if it is reserved. If the channel is reserved the random delay, chosen by the random back off algorithm, is added to the reserve time, When the delay time expires, the originator repeats the LBT algorithm.

| Norand OWL Network | | |
|---|---|---|
| OWL Network Architecture | Revision 1, January 31, 1994 | page 4 |

A basic service set (BSS) includes a WMAP and its children. In a frequency hopping network, each BSS is, for the most part, isolated from its neighbors by channel frequency separation, but BSS frequencies may occasionally overlap. Reservations may be missed if BSS frequencies overlap for part of a conversation. If a frequency hop time begins with a synchronization frame, then the synchronization frame can include an indication that the channel is busy.

A sleeping node is any node which has not been actively listening to network traffic. A sleeping node may miss an RFP POLL sequence. The OWL radio MAC-D protocol uses a busy-pulse technique to support sleeping terminals. POLL frames provide periodic pulses to indicate that the source node is busy. A sleeping terminal is required to monitor the channel for a busy-pulse period before accessing the channel. If a conversation is in progress, the terminal is guaranteed to hear either the originator or the sink within the busy-pulse period. In figure 7, the busy-pulse period is $t_{bp}$. The busy-pulse period is well-defined if the maximum fragment and turn-around times are fixed. The combined OWL reservation and busy-pulse protocols provide a channel access solution which is analogous to a busy-tone channel access protocol.

Terminal nodes should limit the total retry time at the MAC-D sub layer, so that roaming can be quickly detected, and a new path in the spanning tree quickly re-established. Relay nodes should lower the number of retries, due to lost frames, when the sink is a terminal node, since the lost frames may be due to roaming. The retry limit should be much higher when both the originator and sink are relay nodes.

802.3 MAC-D Sub Layer.

The 802.3 MAC-D sub layer is used to forward MAC-R PDUs across 802.3 links. All 802.3 MAC-D frames use a common reserved 802 multicast address and LLC SNAP access point identifier in the 802.3 and LLC header, respectively. The OWL MAC-D PDU is contained within the LLC PDU. The 802.3 MAC-D sub layer is used when two (or more) nodes in the OWL network spanning tree are physically connected by an 802.3 link. Note that the same physical link can function both as a distribution LAN and as the physical link associated with a path in the network spanning tree. It is important to understand the following distinction. If a WDAP bridges a frame onto a distribution LAN, then the frame is no longer on a branch in the OWL network spanning tree, even if the destination 802 address belongs to a node in the OWL subnet; however, if a WMAP routes an MRPDU to another WMAP then the PDU is forwarded on a branch in the spanning tree, even if the physical link used to forward the PDU also serves as the distribution LAN.

The 802.3 MAC-D PDU fields are shown below. All 802.3 MAC-D transmissions consist of a single data PDU. No control frames are defined. An 802.3 MAC-D sub layer does not fragment MAC-R PDUs.

802.3 MAC-D header format.

protocol ID
network ID
destination node ID
source node ID
control
reservation

Norand OWL Network
OWL Network Architecture    Revision 1, January 31, 1994    page 5

802.3 MAC-D data frame format.

802.3 header
LLC header with SNAP access points
MAC-D header
MRPDU
CRC

MAC-R Sub Layer.

The MAC-R sub layer is responsible for correctly routing higher layer PDUs through the OWL subnet. OWL nodes are organized into a network spanning tree and PDUs are routed along branches of the spanning tree. The MAC-R sub layer also provides support for sleeping terminals and distributes network node IDs. The MAC-R sub layer provides unacknowledged connectionless services.

MAC-R Protocol Data Units

MAC-R Header Format length
type
control
destination 802 address
source 802 address
<type specific fields and optional parameters>

MRPDU types.

REGISTRATION - A node sends a REGISTRATION request to the super root to obtain an OWL network node ID. The registration PDU contains the 802 address of the node. The super root records the 802 address and returns a node ID in a REGISTRATION response PDU. A REGISTRATION request may contain a node alias. The alias is the permanent name of a node in the OWL radio network. A REGISTRATION request may also contain a globally unique network access code. The access code can be used to restrict network access to those nodes which, for example, belong to a single organization.

ATTACH - A node sends an ATTACH request to a parent node to attach to the OWL subnet. The ATTACH request is forwarded to the distributed root to establish full connectivity in the OWL subnet. The distributed root returns an ATTACH response packet to acknowledge the ATTACH request. An attach indication (ATTI) bit in the control field of the ATTACH request indicates if the path to the node which generated the ATTACH request has changed. The MAC-R entity in an access root sets a DISTRIBUTED bit ON in the control field of an ATTACH request before forwarding the request to the super root. The super root records the DISTRIBUTED bit in its routing table and does not forward frames from the distribution LAN to the attaching node if the DISTRIBUTED bit is ON.

HELLO - Each relay node in a hierarchical OWL radio network periodically broadcasts HELLO response PDUs to advertise its presence. Pending messages for sleeping terminals and broadcast messages can be associated with HELLO PDUs. A node can send a HELLO request PDU to solicit (unscheduled) HELLO response PDUs from attached relay nodes. Each HELLO response PDU contains the 802 address of the super root and a super root sequence number. The super root address and sequence number are used to uniquely identify an occurrence of an OWL network. In addition, each node in the network can learn the 802 address of the super root.

DATA - DATA request MRPDUs are used to transport higher layer data.

Norand Confidential

Norand OWL Network
OWL Network Architecture           Revision 1, January 31, 1994                page 16

R-DATA - DATA response MRPDUs are used to reroute undelivered DATA request MRPDUs after a route has changed.

ALERT - A relay node sends an inbound ALERT request when it is unable to deliver a PDU to a child. The ALERT request is used to determine if the path to the child is still valid and is optionally used to alert the child that it has missed a PDU and should re-attach.

DETACH - A relay node sends a DETACH response node to delete a path to an outbound node.

OWL Network Spanning Tree.

Nodes in an OWL radio network are organized into a network spanning tree. A primary WDAP serves as the (super) root of the spanning tree. PDUs are routed along branches of the spanning tree. Figure 8 shows physical devices and links in an example OWL network. Figure 9 shows the same network organized as a logical network spanning tree.

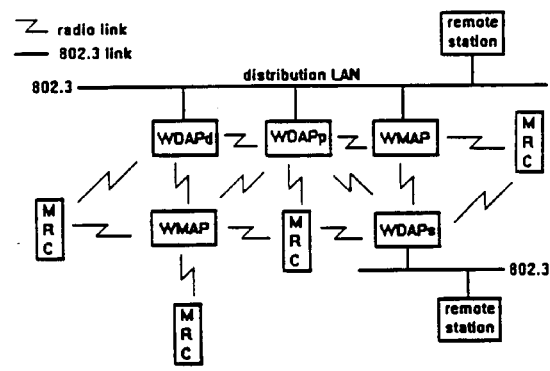

figure 8.

Norand Confidential

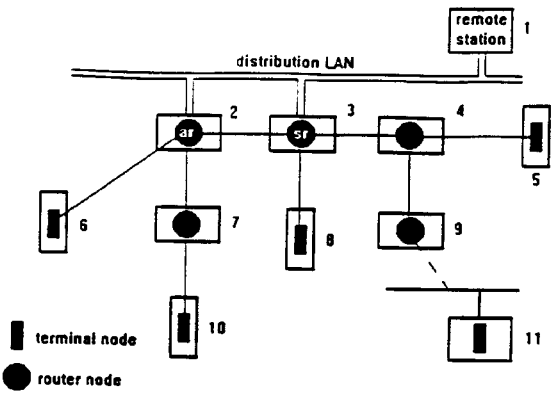

figure 9.

The spanning tree eliminates loops in the physical topology. The node labeled "sr", in figure 9, is the super root and the node labeled "ar" is an access root. The parallel lines represent the distribution LAN, which is not part of the spanning tree. The super root and access root both have access to the distribution LAN; the WMAP labeled 4 can not directly access the distribution LAN. WMAP 4 forwards PDUs destined for the distribution LAN through the super root (i.e. with an 802.3 MAC-D sub layer). The remote station, labeled 1, on the distribution LAN is not part of the network spanning tree; however, the secondary 802 LAN and the remote station, labeled 11, can be viewed as part of the spanning tree (as indicated by the dotted edge).

Building the Spanning Tree.

Nodes in the radio network are generally categorized as attached or unattached (i.e. to the network spanning tree). Initially, only the super root is attached. A single WDAP can be designated to contain the root node, or multiple root candidates can negotiate to determine which node assumes the super root status. The root and other attached relay nodes broadcast HELLO response PDUs at calculated intervals. The HELLO response PDUs enable unattached nodes to learn the optimum path to the super root before attaching to the network. The HELLO response PDUs include: 1) the source node ID and 802 address; 2) a broadcast destination node ID and 802 address; 3) the "cost" to the super root; 4) a "seed" value used to calculate the time of the next HELLO response PDU; 5) a hello displacement time; 6) the priority of the super root node (or root candidate); 7) the 802 address of the super root (or root candidate); and 8) a super root sequence number, used to distinguish between multiple occurrences of the network spanning tree with the same super root.

The HELLO "cost" field indicates the total "distance" to the super root, and is equal to the sum of the costs of each hop on the path to the root. (Note that the super root broadcasts HELLO PDUs with the cost field set to zero.) The incremental cost of the hop between a node and its parent is primarily a function of the physical link type (i.e. ethernet or radio). The cost component is intended to bias path selection toward high-speed (i.e. wired) connections. On radio links, spanning tree attachment is biased toward the link with

| Norand OWL Network | | |
|---|---|---|
| OWL Network Architecture | Revision 1, January 31, 1994 | page 13 | the best signal strength. Signal strength is not a factor in the cumulative path cost. The HELLO "displacement" field specifies the displacement of the actual hello time from the calculated hello time or indicates that the hello time was unscheduled. A well-known randomization algorithm is used to calculate the next hello time. The HELLO "seed" field is used as a seed for the calculation. The "root 802 address" and "root sequence" fields are used to define a single instance of the radio network. Attached nodes must forget their node ID and return to the unattached state whenever a HELLO response PDU is received with a new root 802 address or root sequence number. HELLO response packets can contain other optional parameters (such as a distributed clock or a pending message list).

Nodes without a parent in the spanning tree are in an unattached state. In the unattached state, a node learns which attached relay node is closest to the super root by listening to HELLO response PDUs. (If no HELLO response PDUs are received, the node can wait (i.e. sleep) and retry later.) After the learning period expires an unattached node sends an ATTACH request packet to the attached relay node with the lowest cost to the super root. The ATTACH request contains an ATTACH ID, which is a sequence number that is incremented whenever an ATTACH request is generated. (Nodes without a node ID must first send a REGISTRATION request packet to the root to obtain an OWL node ID.) The attached relay node forwards the ATTACH request packet to the super root. <u>The end-to-end ATTACH request functions as a discovery packet and enables relay nodes along the path to the super root to quickly learn the path to the source node.</u> The super root returns the request as an end-to-end ATTACH response PDU. <u>The node which originates an ATTACH request is responsible for retrying the request until a matching response is received, to insure that it is fully attached.</u> When the unattached node receives the ATTACH response PDU it goes to an attached state and sets internal root port and parent variables. The root port is the physical port on which the response PDU arrived and the parent variable contains the node ID and 802 address of the parent node. A <u>child node will only accept outbound unicast MRPDUs from its parent.</u> If the newly attached node is a relay node, it calculates its cost to the super root, by adding its root port link cost to the HELLO cost of its new parent, and begins to broadcast HELLO response PDUs.

ATTACH requests are always forwarded to the super root. Inbound ATTACH requests establish a new path from the super root to the source node. If an ATTACH request arrives at the super root, and a distributed WDAP exists which is on the old path to the source node, but is not on the new path, then the super root must forward the ATTACH request as an outbound PDU to the distributed WDAP. When the distributed WDAP receives the ATTACH request, it will read filter and forward sequence numbers from the request and will enter its filter and forward sequence numbers for the source node into the request. The ATTACH request is returned to the super root as an inbound ATTACH response. The distributed WDAP will delete its routing table entry for the node which originated the ATTACH request. A forward sequence number of zero in an ATTACH request is used to reset the filter sequence number in a WDAP. A forward sequence number of zero in an ATTACH response is used to reset the filter sequence number in a terminal.

An attach indication (ATTI) bit is set ON in an ATTACH request PDU whenever the path to the source of the ATTACH request changes to notify the distributed root that the source node has just attached to the network. If a distributed WDAP receives an ATTACH request and the ATTI bit is ON then it will retransmit any undelivered PDUs as R-DATA PDUs with a RETRY bit set ON. An undelivered PDU is any DATA PDU which has a sequence number which is newer than the filter sequence number in the ATTACH request.

Unattached terminal nodes can optionally broadcast a global HELLO request PDU with a multicast relay node ID and broadcast 802 destination address to solicit unscheduled HELLO response PDUs from attached relay nodes. The net effect is that the unattached state can (optionally) be shortened. (Note that only attached relay nodes respond to request PDUs.) The HELLO request facility is intended for unattached terminals with transactions in progress.

Each attached node must transmit an ATTACH request PDU at least once per ATTACH_TIMEOUT time period to maintain its path in the radio network. An attached node must also transmit an ATTACH request PDU to its parent whenever it misses MAX_HELLO_LOST consecutive scheduled HELLO response PDUs from its parent and whenever it receives an alert. An alert can occur in an alert PDU or in an optional alert Norand Confidential

| Norand OWL Network | | |
|---|---|---|
| OWL Network Architecture | Revision 1. January 31, 1994 | page 19 | list in a HELLO response PDU. If a relay node is unable to deliver a PDU to a child node, then the relay node adds the node ID of a child node to its alert node list and, optionally, generates an alert PDU which is sent down all branches of the spanning tree.

Each node (except the super root) should maintain an in-range list which contains the node ID and 802 address of potential alternate parent nodes. If a child loses its parent (i.e. due to a MAC-D link error) or detects a better path, then the child can change its path in the spanning tree by selecting the best candidate from the in-range list and attaching to the new parent. Relay nodes must avoid sporadic path changes. If a child loses its parent and the in-range list is empty, it must remain in a quiet learning state until a potential parent is discovered.

Attaching through a secondary WDAP.

A remote wired 802 subnet is attached to an OWL subnet through a secondary WDAP. A secondary WDAP is responsible for attaching its wired subnet(s) to the radio network. The secondary WDAP must generate ATTACH request PDUs for each remote station on its wired subnets so that MAC-R entities on the path to the WDAP can learn the route to those remote stations. A secondary WDAP negotiation protocol is used to select a single designated secondary WDAP, if more than one secondary WDAP is connected to a remote wired segment. The designated WDAP is solely responsible for bridging between its wired subnet and the radio network. Any other secondary WDAP on the same segment would function as any other remote station on the segment.

MAC-R Routing.

All PDUs are routed along branches of the spanning tree. Relay nodes "learn" the path to outbound nodes by monitoring inbound traffic (i.e. traffic directed toward the root). Whenever a relay node receives an inbound REGISTRATION, ATTACH, or DATA request PDU from an outbound node, it creates or updates an entry for the source node in its routing table. The entry includes the source node's 802 address and the node ID of the node which sent the PDU (i.e. the hop source ID). When a relay node receives a PDU from an inbound node the PDU is forwarded to the outbound hop which is specified in the routing entry for the 802 destination. The PDU is discarded if a routing entry does not exist.

As an example, the routing table for relay node 4, in figure 9, is shown in figure 10 below. The destination field contains the 802 address of a node in the sub tree rooted at 4. The first hop field contains the node ID of the first hop on the path to the destination. (The node labels from figure 9 are used in lieu of 802 addresses and node IDs, in this example.) The child field indicates if the destination is a child. The attach ID field is used to associate ATTACH and DETACH requests and responses. The port field specifies the physical port used to communicate with the first hop. The type field can be RELAY or TERMINAL. The status field is used to mark each entry as ATTACHED or UNATTACHED. The super root must also mark each entry which specifies a path through a distributed WDAP as DISTRIBUTED. The age field indicates the last time the destination was active and is used to "age" away old table entries. Assume that relay 4 has received an ATTACH request from node 11 through relay 9. Relay 4 adds an entry for destination 11 with the first hop set to 9, the age set to 0, and the status set to ATTACHED.

| Destination | Type | Child | First Hop | Attach Time | Attach ID | Port | Status | Age |
|---|---|---|---|---|---|---|---|---|
| 11 | TERMINAL | No | 9 | 1223 | 4 | 1 | ATTACHED | 0 |
| 5 | TERMINAL | Yes | 5 | 802 | 2 | 1 | ATTACHED | 2 |
| 9 | RELAY | Yes | 9 | 907 | 5 | 1 | ATTACHED | 1 | figure 10.

Norand Confidential

| Norand Data Networks | | |
|---|---|---|
| OWL Network Architecture | Revision 1, January 31, 1994 | page 23 |

PDU's from outbound nodes are simply forwarded to the next inbound node (i.e. the parent) in the branch of the spanning tree. <u>No explicit routing is required for inbound traffic because the route is defined by the structure of the spanning tree</u>. A PDU travels inbound until a node is reached which has an entry in its routing table for the destination 802 address. The PDU is then explicitly routed outbound until it reaches its destination. Thus, communications between any two nodes is accomplished by routing all traffic through the nearest common ancestor of both the source and destination node. If a PDU reaches a primary or distributed WDAP and an entry for the 802 destination does not exist in the routing table of the WDAP, then the PDU can not be routed outbound (i.e. a common ancestor does not exist). In this case, the WDAP can "bridge" the PDU, as an 802 frame, onto the distribution LAN. Note that a PDU which is bridged onto the distribution LAN by a distributed WDAP, will be bridged back into the OWL subnet (i.e. by a second WDAP) if the 802 destination is in the OWL subnet.

As an example, in figure 9, if a PDU is sent from terminal 10 to terminal 5 it will be routed as follows: Terminal 10 will send the PDU to its parent, WMAP 7. Since WMAP 7 does not have an entry in its routing table for terminal 5, it will forward the PDU inbound to its parent, WDAP 2. The MAC-R entity in WDAP 2 does not have an entry in its routing table, so it will forward the PDU to its bridging entity and the PDU will be bridged onto the distribution LAN as an 802 frame. The bridging entity in WDAP 3, the super root, , will forward the frame to its MAC-R entity because it has an entry in its forwarding data base, which specifies the radio network as the subnet for terminal 5. The MAC-R entity in WDAP 3 has an entry in its routing table for terminal 5 and will forward the PDU to the first outbound hop, WDAP 4, over the wired link (i.e. with an 802.3 MAC-D sub layer). WDAP 4 will then deliver the PDU to terminal 5.

As a second example, if remote station 11, in figure 9, sends a PDU to remote station 1 it will be routed as follows: The bridging entity in the secondary WDAP, 9, will determine that station 1 is not on its local 802.3 subnet (i.e. by querying its forwarding database) and will bridge the PDU into the radio network (i.e. by passing the frame to its MAC-R entity). The MAC-R entity in WDAP 9 will forward the PDU inbound to WMAP 4, since it does not have an entry for station 1 in its routing table. WMAP 4 will forward the PDU to WDAP 3. The MAC-R entity, in WDAP 3, does not have an entry for station 1 and will pass the PDU to its bridging entity. The bridging entity will forward the PDU onto the distribution LAN as an 802 frame addressed to station 1.

Dynamic routing changes and PDU retransmission.

Paths in the spanning tree change often as terminals roam. PDU transmission errors due to roaming fit into one of two possible cases: 1) a terminal node is unable to deliver a PDU to its parent, or 2) a relay node is unable to deliver a PDU to a child terminal.

In the first case, the terminal can simply select a new parent and re-attach to the network by sending an ATTACH request. An attach indication is generated whenever the path to a terminal node changes. The MAC-R entity in a relay node updates its routing table entry for an outbound source node if an inbound ATTACH (or REGISTRATION) request PDU is received from the node and the hop source is not the same as the first hop in the table entry for the node. The first hop field, in the routing table entry, is overlaid by the hop source of the PDU and outbound PDUs are now routed along the new path. (Note that an old disconnected path fragment may still exist in the spanning tree after a new path has been established.) ATTACH requests are always forwarded to the super root and are forwarded to the WDAP which provided the single entry point to the distribution LAN for the terminal, if the ATTI bit is ON. If an ATTI ATTACH request is received from a terminal by a WDAP which owns the distribution LAN entry point for the source, then the WDAP will delete any old routing table entry for the source node and will post its MAC-Q entity with an attach indication.

A relay node may not be able to deliver a DATA PDU to a child, for several reasons: 1) the child may be asleep; 2) the channel may be reserved in the child's coverage area; 3) the PDU may be lost due to excessive errors; or 4) the child may have selected a new parent (i.e. due to roaming). It is assumed that most undelivered PDUs are lost because child nodes roam. If a parent relay node can not deliver a PDU to a Norand Confidential

| OWL Network Architecture | Revision 1, January 31, 1994 | page ... |
|---|---|---| child node, then (if the routing table entry for the child has not been updated) the parent node will 1) mark the routing table entry for the child as UNATTACHED, 2)add an alert record for the child node to its internal alert list, and 3) send an ALERT request to the super root. The ALERT PDU contains the ATTACH ID from the routing table entry for the child node. When a relay node, on the path to the super root, receives an inbound ALERT request it determines a) if the alert ATTACH ID matches the ATTACH ID in its routing table and b) if the hop source in the ALERT request is the same as the first hop field in the routing table entry for the alert destination. If both conditions are satisfied then the relay node will 1) mark its routing table entry for the lost child as UNATTACHED, 2) optionally add the associated alert record to its internal alert list, 3) forward the ALERT request to the next hop on the path to the super root, and 4) optionally forward the ALERT request down each of its outbound branches, other than the one on which it arrived. If either condition is not satisfied then the relay node will, instead, send an outbound DETACH response on the UNATTACHED path on which the ALERT request arrived. The DETACH ID in the DETACH response is the same as the ID in the ALERT request and the destination is the 802 address of the lost child. If a relay node on the old path has an UNATTACHED routing table entry for the destination, with an ATTACH ID that matches the DETACH ID in the DETACH response, then the relay node will forward the DETACH response outbound and will delete the UNATTACHED entry. The DETACH response is forwarded until it reaches the relay node which was the old parent of the lost child.

A relay node can also use a DETACH response to delete an old path to an outbound node when an ATTACH request is received which changes the outbound path. The mechanism is the same as described above.

Outbound ALERT requests are used to quickly notify a lost child that it should re-attach to the network. If a relay node receives an outbound ALERT (i.e. from its parent) request, it first checks to see if it has a routing table entry for the lost child with a "newer" ATTACH ID. If it does, then the ALERT request is simply discarded. Otherwise, a relay node which receives an outbound ALERT request will forward the ALERT request to each child node which is a relay node and will multicast the ALERT request (i.e. with a multicast MAC-D destination address) once on each of its radio ports. Each relay node adds the ALERT ID in the request to its internal alert list.

Records in a relay node's internal alert list in each relay node are copied into HELLO response PDUs for MAX_HELLO_LOST + 1 scheduled hello times to notify nodes to re-attach, where MAX_HELLO_LOST is the maximum number of HELLO PDUs that can be missed by a child before the child re-attaches. An alert record contains a target node ID, a source node ID, and an ALERT ID (which equates to an ATTACH ID). The concatenated source node ID and ALERT ID are used to uniquely identify each alert occurence. A target node can ignore any any duplicate alert record which is received within MAX_HELLO_LOST+5 HELLO periods.

An ALERT request may reach the super root before the associated child node re-attaches. In this case, outbound PDUs for the child node are temporarily routed using the UNATTACHED routing table entry, until the child node re-attaches. An UNATTACHED routing table entry is changed to ATTACHED whenever an inbound PDU is received from the node associated with the table entry destination. If the node re-attaches to a different branch of the spanning tree, then UNATTACHED entries for the node on its old path fragment will eventually be deleted or aged and discarded. UNATTACHED routing table entries are aged and discarded faster than ATTACHED entries.

A terminal node must set the attach indication (ATTI) bit ON in the MAC-R header of an ATTACH request when it first attaches to a new parent. The ATTI bit indicates that the path to the ATTACH request source node has changed. The ATTACH request is forwarded to the distributed root. The MAC-R entity in the WDAP which provided access to the distribution LAN for the source node posts an attach indication error to the MAC-Q sub layer when it receives the ATTACH request PDU with the ATTI bit set ON. The MAC-R sub layer in a terminal node posts an attach indication error to the MAC-Q sub layer when it receives the associated ATTACH response with the ATTI bit set ON. An attach indication is a positive indication that a node has just attached to the network and can be used to trigger an immediate (re)transmission. The attach indication includes the 802 source address and receive sequence number for the source node of the Norand Confidential Norand OWL Network
OWL Network Architecture          Revision 1, January 31, 1994          page 22

ATTACH request. If the MAC-Q entity is holding any undelivered DATA PDUS for the node, it can
respond by re-transmitting the undelivered PDUs as R-DATA PDUs. The R-DATA PDUs will be
discarded if they are duplicates or arrive out-of-sequence. The R-DATA PDUs are automatically routed
along the new path.

The MAC-R layer in a terminal node is responsible for retrying a DATA PDU transmission, if the MAC-D
layer is unable to deliver the DATA PDU to its parent. The MAC-D layer indicates the success or failure of
a transmission. Occasionally, the MAC-D entity will not be able to positively determine success or failure
(i.e. if CLEAR frames are missed in a MAC-D conversation). If the MAC-D layer indicates positive
failure, then the MAC-R layer can choose a (possibly new) parent, re-attach, and retransmit the DATA
PDU; otherwise, the MAC-R layer must discard the PDU. The MAC-Q may retransmit the DATA PDU as
an R-DATA PDU when an attach indication is received (i.e. when an ATTACH response is received with
the ATTI bit set ON).

Registration.

A node is initially in an unregistered state and returns to the unregistered state under certain error
conditions. Each unregistered node in the network must send a REGISTRATION request to the super root
before it attaches. The REGISTRATION request is used to obtain a network node ID and is used to
validate access to the network. The REGISTRATION request is returned by the super root as a
REGISTRATION response. The node which originated the request is responsible for retrying the request
until a matching response is received.

Registration logic is similar to attach logic with some key differeneces. REGISTRATION requests can
only be sent to the super root when no other inbound PDU for the source node exists in the network. No
other PDU types may be sent in the unregistered state. A node goes to the registered state when a matching
registration response is received from its parent.

A node's registration is valid as long as it is actively attached to the network. A node returns to the
unregistered state if it does not receive an ATTACH response within a MAX_ADDRESS_LIFETIME time
period or if it detects that the super root has changed.

Broadcast routing.

PDUs with broadcast (or multicast) 802 destination addresses are (optionally) routed along all branches of
the network spanning tree. Broadcast messages are transmitted to terminals immediately on radio links and
are also associated with HELLO PDUs. A broadcast parameter in a HELLO response PDU indicates that
terminals should stay awake for broadcast messages which will immediately follow the HELLO PDU. A
secondary WDAP forwards broadcast messages onto its attached wired subnets. If a broadcast message
orginates on the distribution LAN, then each primary or distributed WDAP is responsible for bridging it to
the OWL sub tree for which it is the access root. Broadcast messages which originate within an OWL
subnet are forwarded on each branch of the network spanning tree, except the branch on which the message
arrived. The access root of the sub tree in which the broadcast message originated is responsible for
bridging the message onto the distribution LAN. The message is bridged back into the radio network by
each other access root.

Sleeping Terminal Support.

The MAC-R sub layer provides several facilities to support sleeping terminals. A sleeping node initially
"synchronizes" on a HELLO response PDU from its parent. The node can calculate the time of the next
expected HELLO response PDU from its parent and can power-down with an active timer interrupt set to
wake it just before the next HELLO response PDU is transmitted. The MAC-R entity in a parent node can
store a message for a sleeping node until the node "requests" the message by notifying its parent that it is
awake. A terminal learns that it must request unsolicited saved messages by examining a pending message Norand Confidential

167 list in the HELLO response PDU. This implementation enables sleeping terminals to receive unsolicited messages and relaxes the timing constraints for transaction oriented messages. ATTACH and DATA request PDU's can contain several MAC-R parameters which are used to enable pending messages. A "delivery service type" parameter, indicates that a terminal (i.e. which sent the request) is sleeping. An "awake time window" parameter is used to specify an awake time period. An "awake time offset" parameter is used to specify the start of the awake time window. (The awake time window is effective immediately if an awake time offset is not specified.) An "auto awake" delivery service type can be used to implicitly set an awake time window each time the parent node receives a message from the sleeping terminal. A "maximum stored message count" field specifies the maximum number of HELLO times that a message should be stored in the parent relay node. The MAC-R entity in a parent node will store pending messages until 1) the message is delivered, or 2) "maximum stored message count" hello times have expired.

Broadcast messages are associated with HELLO PDUs so that sleeping terminals will be awake when the broadcast message is transmitted.

WDAP bridging.

A WDAP maintains a forwarding data base with an entry for each known network node. Each entry contains an 802 destination address and an associated subnet identifier. When a PDU arrives at the bridging entity in a WDAP, the forwarding database is searched to determine the subnet of the 802 destination. If the destination is found and the destination is on another subnet (i.e. other than the one on which the PDU arrived) then the PDU is bridged to the subnet of the destination. If the destination is not found, then the action taken by the bridging entity is dependent on the configuration of the WDAP. 1) The PDU can be forwarded to every subnet except the subnet on which it arrived (i.e. flooding), or 2) the PDU can be discarded. Each subnet can be configured independently. For example, the subnet associated with the distribution LAN can be configured to allow flooding and the OWL subnet can be configured to disallow flooding at the same time. In this case, PDUs would be "flooded" onto the distribution LAN but would not be flooded into the OWL subnet. If the OWL subnet is configured to allow flooding, then two types of flooding are possible: 1) The PDU can be flooded throughout the OWL network spanning tree, including all secondary 802 LANs, or 2) the PDU can be routed to secondary LANs where it will be forwarded onto the secondary LAN by a secondary WDAP.

Typically a primary or distributed WDAP is configured to only forward unicast frames from the distribution LAN to the OWL subnet if an entry exists in its MAC-R routing table for the 802 destination. This implies that the MAC-R entity must notify the bridging entity that a destination exists in the radio subnet, when a MAC-R routing table entry is created, so that the bridging entity can update its forwarding database. Likewise, the bridging entity must be notified when a routing table entry is deleted. The forwarding database in a distributed WDAP contains entries for each node in its access spanning tree. The forwarding database in the primary WDAP contains entries for all nodes in the OWL subnet which are not in an access sub tree rooted by a distributed WDAP.

Optimization considerations.

If a primary or distributed WDAP has two subnets - a distribution LAN and the OWL subnet - and the WDAP is configured to allow flooding onto the distribution LAN and to not allow flooding onto the OWL subnet, then each entry in its forwarding database corresponds to an entry in its MAC-R routing table. All frames which are passed to the bridging entity from the MAC-R entity (i.e. from the OWL subnet), are forwarded to the distribution LAN. Frames will only be forwarded from the distribution LAN to the OWL subnet if an entry exists in the MAC-R routing table. For any configuration, entries in the forwarding database which are associated with the OWL subnet correspond to entries in the MAC-R routing table. A shared forwarding database/MAC-R routing table data structure could be used to optimize the learning process required for bridging and to avoid two lookups (i.e. a forwarding database lookup and a MAC-R routing table lookup) each time a PDU is forwarded from the distribution LAN into the OWL subnet.

| Norand OWL ... | | |
|---|---|---|
| OWL Network Architecture | Revision 1, January 31, 1994 | page 24 |

MAC-Q Sub layer.

The (optional) MAC-Q can be viewed as an end-to-end reliability layer between entry points to the radio network. The MAC-Q sub layer is responsible for delivering received PDUs to the next higher layer in the order in which the PDUs entered the radio network. The MAC-Q sub layer also retransmits lost MQPDUs, and filters any resulting duplicate or out-of-sequence MQPDUs. The MAC-Q sub layer is intended to significantly reduce the number of lost PDUs due to "roaming" terminals, without introducing duplicate or out-of-sequence PDU's. It does not guarantee that PDUs will never be lost. MAC-Q entities exist at entry points to the radio network. The MAC-Q entity in a WDAP provides a proxy MAC-Q layer for nodes in the OWL network which are not in the radio network.

MQPDUs contain a MQPDUID in the MQPDU header. The concatenation of the MQPDUID and 802 source and destination addresses uniquely identifies an MQPDU in an OWL radio network. The MQPDUID is generated by the MAC-Q entity in a WDAP or terminal when a frame first enters the OWL radio network.

A primary or distributed WDAP maintains an "MQPDU table" with entries for each outbound node. Each entry contains the 802 address of an outbound node and an associated forward MQPDUID and filter MQPDUID. Forward MQPDUIDs are generated to uniquely identify an MQPDU for its lifetime in the OWL network. Filter MQPDUIDs are used to detect duplicate and out-of-sequence PDUs. Before a primary or distributed WDAP forwards an 802 frame from a wired backbone into the OWL radio network, it increments the forward MQPDUID, associated with the destination 802 address, and enters the it into the MQPDU header. The MQPDU is then passed to the MAC-R sub layer for transmission. Note that this approach assumes that remote stations do not move quickly from subnet to subnet. If a node is physically attached to two subnets, then a unique 802 address should be used for each subnet.

Terminal nodes maintain an MQPDU table with an entry for each active remote MAC-Q network entry point. Each entry contains a filter MQPDUID, a subnet identifier, and an 802 address. Subnet 0 is always the radio network and subnet 1 is the distribution LAN. Other subnet identifiers can be assigned to a secondary WDAP. The 802 address is blank for subnets 1 and higher. Note that there can be multiple entries for subnet 0, but only 1 entry for each other subnet. A terminal also maintains a single forward MQPDUID variable and stores up to one MQPDU for possible retransmission. The value of the forward variable is incremented and entered into the MQPDU header whenever a terminal prepares a new PDU for transmission. The terminal MAC-Q entity retransmits an MQPDU whenever the MAC-R layer returns a transmit error (until a maximum retry count is exceeded).

The filter MQPDUID, in an MQPDU table, is the ID of the last MQPDU received from the associated 802 address. Duplicate MQPDUs are discarded. An MQPDU is accepted by a sink if 1) a retry bit in the MAC-Q header is set OFF or if 2) the MQPDUID in the PDU is not in a "duplicate range" defined by the filter MQPDUID in the table. If an MQPDU table filter entry does not exist for an 802 source address, then data PDUs from the source should be discarded if the retry bit is set ON. The entries in the MQPDU table must be aged so that a filter MQPDUID (and stored MQPDU) is never older than the "roll over" time of an MQPDUID.

An entry in an MQPDU table in a distributed WDAP may be transferred to another primary or distributed WDAP if a terminal "roams". If a terminal moves and its new path to the super root is through another WDAP, then the forward and filter MQPDUIDs for the terminal must be transferred from the old WDAP to the new WDAP. The super root obtains the information (if it exists) from the old WDAP and forwards it to the new WDAP. Note that the new WDAP can accept MQPDUs with the retry bit set OFF while waiting for an MQPDU table entry to be transferred.

Ideally, each MAC-Q entity in the radio network should be notified when the terminal node associated with an entry in its forward list has roamed and re-attached. If a MAC-Q entity holds an undelivered PDU, destined for the re-attached terminal, then the PDU can be retransmitted along the new path to the terminal.

Norand Confidential

| OWL Network Architecture | Revision 1, January 31, 1994 | Page 25 |

A more practical approach would be to notify each MAC-Q entity which has recently transmitted a PDU to the terminal. If it is assumed that most traffic is not contained in the radio network, but rather is directed to or from the distribution LAN, then it may be practical to simply notify the MAC-Q entities in primary or distributed WDAPs on the old path to the terminal.

MAC-S Sub Layer.

The (optional) MAC-S sub layer provides data compression and security services.

Network management tools can be used to create security associations between any two stations in an 802 LAN which contains an owl subnet. MAC-S entities exist in WDAP's. A MAC-S entity can encipher a frame when it enters the radio network if a security association exists between the source and destination stations at the entry WDAP. A MAC-S entity, in an exit WDAP, can correctly decipher a frame as it exits the radio network if it contains a corresponding security association. Network management access to a MAC-S entity in a distributed WDAP is always through a primary WDAP. The primary WDAP (i.e. the super root) "knows" the path to all outbound nodes. A MAC-S entity in a primary or secondary WDAP provides a "proxy" MAC-S layer for security associations involving remote stations on wired subnets.

A global security association can be used to consistently encipher and decipher each frame as it, respectively, enters and exits the radio network. Global association must be enabled at the MAC-S entity in each primary, secondary, and terminal node in the OWL subnet.

Simple compression (i.e. independent of any security encryption) is enabled by a single compression bit in the MAC-S header.

Norand Confidential

APPENDIX C

NORAND SST NETWORK
PROTOCOL FRAME FORMAT SPECIFICATION    REVISION 1, 03/10/94    PAGE 1

SSTE NETWORK FRAME FORMATS

NORAND CONFIDENTIAL

| NORAND SST NETWORK | | | |
|---|---|---|---|
| PROTOCOL FRAME FORMAT SPECIFICATION | REVISION 1, 03/10/94 | | PAGE 2 |

General format.

| Pre-amble | Flag | MAC-D Header | MAC-R Header | MAC-R Parms | MAC-Q Header | LLC Header | LLC Data | CRC | Flag |
|---|---|---|---|---|---|---|---|---|---|

General Field Definitions for a data PDU.

| Preamble | 1 to 8 bytes |
|---|---|
| Flag start delimiter | 1 byte |
| MAC-D Protocol ID | 1 byte |
| MAC-D Network ID | 1 byte |
| MAC-D Destination Address | 2 bytes |
| MAC-D Source Address | 2 bytes |
| MAC-D Control | 1 byte |
| MAC-D Channel Reservation | 1 byte |
| MAC-R Control | 2 bytes |
| MAC-R 802 Destination Address | 6 bytes |
| MAC-R 802 Source Address | 6 bytes |
| MAC-R PDU type specific fields | PDU type dependent |
| MAC-R Optional Parms | M bytes |
| MAC-Q Control | 1 byte |
| MAC-Q Sequence | 1 byte |
| LLC DSAP | 1 byte |
| LLC SSAP | 1 byte |
| LLC Control | 1 bytes |
| optional SNAP header | 5 bytes |
| LLC Data | N bytes |
| CRC-CCITT | 2 bytes |
| Flag end delimiter | 1 byte |
| (optional trailer) | 1 or 2 bytes |

16-bit Network Address Format.

| bit 15 | Mulitcast Flag |
|---|---|
| 0 | unicast frame |
| 1 | multicast or broadcast frame |

| bit 14-13 | Node Type |
|---|---|
| 00 | Terminal |
| 01 | Acess Point |
| 11 | All Nodes |

| bit 12-0 | Node Identifier |
|---|---|

NORAND CONFIDENTIAL

| NORAND SST NETWORK PROTOCOL FRAME FORMAT SPECIFICATION | REVISION 1. 03/10/94 | PAGE 3 |
|---|---|---|
| all 0's | root node identifer | |
| all 1's | node without a network node identifier or any node | |

| bit 2-0 | Port Identifier for Access Point |
|---|---|
| all 1's | any port |

Hexidecimal 2000 is the well-known 16-bit address of the root node.
Hexidecimal 9FFF is the multicast address of a terminal node.
Hexidecimal BFFF is the multicast address of an access point.
Hexidecimal FFFF is the broadcast address for all nodes.

MAC-D Control Byte (8 bits).

Bits 7-4 in the MAC-D control byte are used to specify the frame type. A MAC-D PDU is classified as either a request or poll frame, depending on the state of the R/P bit. Poll frames are always control frames. A request MAC-D PDU can be either a control or data frame, depending on the state of the CONTROL bit.

Data frames.

*Data request control byte.*

| bit 7 | REQUEST | 0 = request frame |
|---|---|---|
| bit 6 | CONTROL | 0 = data frame |
| bit 5 | START | 1 = first-in-chain |
| bit 4 | STOP | 1 = last-in-chain |
| bit 3 | SEQ | sequence number, modulo 2 |
| bit 2-0 | (reserved) | must be zero |

The START bit is set ON in the first frame fragment in a series of fragments associated with a single MAC-D PDU.

The STOP bit is set ON in the last frame fragment in a series of fragments associated with a single MAC-D PDU.

Control frames.

*Request control byte.*

| bit 7 | REQUEST | 0 = request frame |
|---|---|---|
| bit 6 | CONTROL | 1 = control frame |
| bit 5-4 | Control frame type | 10 = RFP<br>00 = ENQ<br>01 = ABORT |
| bit 3-0 | (reserved) | must be zero |

NORAND CONFIDENTIAL

| NORAND SST NETWORK | | |
|---|---|---|
| PROTOCOL FRAME FORMAT SPECIFICATION  REVISION 1, 03/10/94 | | PAGE 4 |

*Poll control byte.*

| bit 7-6 | POLL | 10 = poll frame |
|---|---|---|
| bit 5-4 | Poll frame type | 00 = WAIT<br>01 = REJECT<br>10 = CLEAR<br>11 = POLL |
| bit 3 | SEQ | sequence number, modulo 2 |
| bit 2-0 | (reserved) | must be zero |

MAC-R Control Bytes (16 bits).

| bit 15 | Network type | 0 = hierarchical, 1 = point-to-point |
|---|---|---|
| bit 14 | (reserved) | must be zero |
| bit 13 | Outbound Flag | 1 = outbound |
| bit 12 | REQ/RSP | 0 = request, 1 = response |
| bit 11 | (reserved) | must be zero |
| bit 10-8 | MAC-R PDU Type | (see table below) |
| bit 7 | MAC-R Parms Flag | 1 = optional MAC-R parms |
| bit 6-3 | (reserved) | must be zero |
| bit 2 | ATTI | 1 = attach indication |
| bit 1 | Relay flag | 0=from a child, 1=relayed PDU |
| bit 0 | Bridging Flag | 1 = distributed |

MAC-R PDU Types.

| 000 | Data/R-Data PDU |
|---|---|
| 001 | (reserved) |
| 010 | Hello PDU |
| 011 | Attach PDU |
| 100 | Alert/Detach PDU |
| 101 | ARP PDU |
| 110 | Registration PDU |
| 111 | (reserved) |

Optional Bridge Parameters - general format.

| 1-bit end-of-parms flag | 1 = last optional parm |
|---|---|
| 7-bit parm type | (see table below) |
| 1-byte parm length | length of parm value field in bytes |
| M-byte parm value | (value or list of values) |

NORAND CONFIDENTIAL

NORAND SST NETWORK
PROTOCOL FRAME FORMAT SPECIFICATION    REVISION 1. 03/10/94    PAGE 5

Optional Parameters.

| Parm Type | Parm Length | Description |
|---|---|---|
| 02h | 6 bytes | 802 address. |
| 03h | M*2 | Decendant List. A list of 2-byte addresses. |
| 04h | N*5 | Alert List. A list of 4-byte alert records. Each record consists of a 2-byte node ID followed by a 2-byte alert ID. The alert ID corresponds to an attach ID. |
| 05h | P*2 | Pending Message List. A list of 2-byte addresses. |
| 06h | 2 bytes | Distance (cost) from the root. |
| 07h | Q bytes | Well-known alias. |
| 08h | R bytes | Forward List. A list of 2-byte addresses. |
| 09h | 1 byte | Load Indicator. An indication of the channel load based on frame frequency. |
| 0Ah | S bytes | Well-known alias of the root. |
| 0Bh | 6 bytes | 802 address of the root. |
| 0Ch* | 1 or 2 bytes | Awake time (in 100 millisecond units). All 1's denotes forever. |
| 0Dh* | 1 or 2 bytes | Awake time offset (in 100 millisecond units). An awake time offset of 0 specifies immediate delivery, even if no awake time is specified. |
| 0Eh* | 1 byte | Delivery service type.<br><br>0=deliver immediately.<br>1=store until the node is awake.<br>2=store until the node is awake; automatically set awake time.<br>3=attempt to deliver immediately, then store until the node is awake. |
| 0Fh* | 1 byte | Maximum stored message count. The maximum number of hello times that the parent node should store a message for the source child node. |
| 10h | 2 bytes | Decendent count. |
| 11h | 2 bytes | Device Identifier. |
| 12h | 4 bytes | Distributed Clock |

*Delivery service and awake time parameters (0C, 0D, 0E and 0F) are processed for all unicast messages.

NORAND CONFIDENTIAL

| NORAND SST NETWORK | | |
|---|---|---|
| PROTOCOL FRAME FORMAT SPECIFICATION | REVISION 1, 03/10/94 | PAGE 6 |

MAC-R Request Packet Formats.

Data (Type 000).

| MAC-D Header | |
|---|---|
| MAC-R Header | |
| Optional Parms<br>- Max. stored message count.<br>- Delivery service type.<br>- Wake up time.<br>- Wake up time offset. | N bytes |
| MAC-Q Control Byte | 1 byte |
| MAC-Q Send Sequence | 1 byte |
| MAC-Q Receive Sequence | 1 byte |
| Length(802.3)/Protocol(DIX) | 2 bytes |
| LLC Header (optional) | |
| LLC Data (optional) | |

Alert (Type 100).

| MAC-D Header | |
|---|---|
| MAC-R Header | |
| Alert ID | 2 bytes |
| Alert Age | 2 bytes |
| Optional Parms | N bytes |

NORAND CONFIDENTIAL

NORAND SST NETWORK
PROTOCOL FRAME FORMAT SPECIFICATION    REVISION 1, 03/10/94    PAGE 7

Hello (Type 010).

| MAC-D Header | |
|---|---|
| MAC-R Header | |
| Optional Parms | N bytes |

Attach (Type 011).

| MAC-D Header | |
|---|---|
| MAC-R Header | |
| Attach ID | 2 bytes |
| Optional Parms<br>- Max. stored message count.<br>- Delivery service type.<br>- Wake up time.<br>- Wake up time offset. | N bytes |
| MAC-Q Control Byte | 1 byte |
| MAC-Q Send Sequence | 1 byte |
| MAC-Q Receive Sequence | 1 byte |

Address Resolution (Type 101).

| MAC-D Header | |
|---|---|
| MAC-R Header | |
| Access Code | 4 bytes<br><br>(must be 0 if no access code is used) |
| ARP Operation<br><br>bit 7-6  operation<br><br><br>bit 5-0  (reserved) | 1 byte<br><br>00=lookup alias<br>01=lookup 802 address<br>10=lookup 16-bit address |
| Reason Code | 1 byte |
| 16-bit Network Address | 2 bytes |
| 802 Address | 6 bytes |
| Alias type (07h)* | 1 byte |
| Alias length | 1 byte |
| Alias | N bytes |

*The alias fields are optional. If an 802 address lookup or alias lookup fails, then the 16-bit address will be set to all 1's in the response PDU. If a 16-bit address lookup fails, then the 802 address will be set to all 1's in the response PDU.

NORAND CONFIDENTIAL

| NORAND SST NETWORK | |
|---|---|
| PROTOCOL FRAME FORMAT SPECIFICATION   REVISION 1, 03/10/94   PAGE 3 | |

Registration (Type 110).

| MAC-D Header | |
|---|---|
| MAC-R Header | |
| Access Code | 4 bytes<br><br>(must be 0 if no access code is used) |
| REGISTRATION Operation<br><br>bit 7    New Alias<br>bit 6    New 802 address<br>bit 5-0  (reserved) | 1 byte<br><br>1 = replace existing Alias<br>1 = replace existing 802 address<br>must be zero |
| Reason Code | 1 byte |
| 16-bit Network Address | 2 bytes |
| 802 Address | 6 bytes |
| Alias type (07h) | 1 byte |
| Alias length | 1 byte |
| Alias | N bytes |
| Device ID type (11h) | 1 byte |
| Device ID length | 1 byte |
| Device ID | 2 bytes |

The 802 address field contains the 802 address of the node which initiated the REGISTRATION request. The network address must be set to the multicast address for the node type (i.e. BFFF or 9FFF). The optional alias field can contain a 1 to 16-byte node name. The optional device ID field can contain a 2-byte device identifier. The address server will set the network address field to the next available block of addresses, for the node type, in the response PDU. If an address block is not available, the field will be set to all 1's. Access points are allocated a block of 8 sequential addresses which start at the returned address. Terminals are allocated a single address. Note that the MAC-D source address is the multicast address address for the node type (i.e. BFFF or 9FFF).

Bridge Response Packet Formats.

R-Data (Type 000).

| MAC-D Header | |
|---|---|
| MAC-R Header | |
| Optional Parms<br>- Max. stored message count.<br>- Delivery service type.<br>- Wake up time.<br>- Wake up time offset. | N bytes |
| MAC-Q Control Byte | 1 byte |
| MAC-Q Send Sequence | 1 byte |
| MAC-Q Receive Sequence | 1 byte |
| Length(802.3)/Protocol(DIX) | 2 bytes |
| LLC Header (optional) | |
| LLC Data (optional) | |

NORAND CONFIDENTIAL

| NORAND SST NETWORK | | |
|---|---|---|
| PROTOCOL FRAME FORMAT SPECIFICATION | REVISION 1, 03/10/94 | PAGE 9 |

Detach (Type 100).

| MAC-D Header | |
|---|---|
| MAC-R Header | |
| Detach ID | 2 bytes |
| Detach Age | 2 bytes |
| Optional Parms | N bytes |

Hello (Type 010).

| MAC-D Header | |
|---|---|
| MAC-R Header | |
| Cost-to-root | 2 bytes (0xFFFF = infinity) |
| Hello Seed | 1 byte |
| Offset | 1 byte<br><br>0-254 = transmission offset time in hundredths of seconds.<br>255 = unscheduled. |
| Root Priority | 1 byte |
| Root Sequence Number | 1 byte |
| Root 802 Address | 6 bytes |
| HELLO Period | 1 byte (20 = 2 seconds) |
| Optional parms<br>- Pending Message List<br>- Alert List<br>- Load Indicator<br>- Distributed Clock | N bytes |

NORAND CONFIDENTIAL

| NORAND SST NETWORK PROTOCOL FRAME FORMAT SPECIFICATION | REVISION 1, 03/10/94 | PAGE 10 |
|---|---|---|

Attach (Type 011).

| MAC-D Header | |
|---|---|
| MAC-R Header | |
| Attach ID | 2 bytes |
| Optional Parms | N bytes |
| MAC-Q Control Byte | 1 byte |
| MAC-Q Send Sequence | 1 byte |
| MAC-Q Receive Sequence | 1 byte |

Address Resolution (Type 101).*

| MAC-D Header | |
|---|---|
| MAC-R Header | |
| Access Code | 4 bytes |
| | (must be 0 if no access code is used) |
| ARP Operation | 1 byte |
| bit 7-6 operation | 00=lookup alias<br>01=lookup 802 address<br>10=lookup 16-bit address |
| bit 5-0 (reserved) | |
| Reason Code | 1 byte |
| 16-bit Network Address | 2 bytes |
| 802 Address | 6 bytes |
| Alias type (07h)* | 1 byte |
| Alias length | 1 byte |
| Alias | N bytes |
| Device ID type (11h) | 1 byte |
| Device ID length | 1 byte |
| Device ID | 1 byte |

If an 802 address lookup or alias lookup fails, then the 16-bit address will be set to all 1's in the response PDU. If a 16-bit address lookup fails, then the 802 address will be set to all 1's in the response PDU. The alias and device ID will be returned as optional parameters.

NORAND CONFIDENTIAL

Registration (Type 110).*

| | |
|---|---|
| MAC-D Header | |
| MAC-R Header | |
| Access Code | 4 bytes |
| | (must be 0 if no access code is used) |
| REGISTRATION Operation | 1 byte |
| bit 7    New Alias | 1 = replace existing Alias |
| bit 6    New 802 address | 1 = replace existing 802 address |
| bit 5-0  (reserved) | must be zero |
| Reason Code | 1 byte |
| 16-bit Network Address | 2 bytes |
| 802 address | 6 bytes |
| Alias type (07h) | 1 byte |
| Alias length | 1 byte |
| Alias | N bytes |
| Device ID type (11h) | 1 byte |
| Device ID length | 1 byte |
| Device ID | 2 bytes |

The 802 address, optional alias, and optional device ID fields are the same as in the associated registration request. The network address field contains a 16-bit address, for the node type, if the reason code is 0; otherwise, the field will be set to all 1's. Access points are allocated a block of 8 sequential addresses, which start at the returned address. Note that the MAC-D destination address is the multicast address address for the node type (i.e. 8FFF or 9FFF).

MAC-Q Control Byte (8 bits).

| | | |
|---|---|---|
| bit 7 | Retry | 1=retry |
| bit 6 | ATTI | 1=attach indication |
| bit 5-4 | (reserved) | must be zero |
| bit 3-0 | Subnet ID | 0000 = radio network, 0001 = distribution LAN, 0010-1110 = secondary LAN. |

MAC-Q Packet Format.

| | |
|---|---|
| MAC-D Header | |
| MAC-R Header | |
| MAC-Q Control | 1 byte |
| MAC-Q Send Sequence | 1 byte |
| MAC-Q Receive Sequence | 1 byte |
| Length(802.3)/Protocol(DIX) | 2 bytes |
| LLC Header (optional) | |
| LLC Data (optional) | |

What is claimed is:

1. A communication network for exchanging communication packets between a plurality of network computing devices, said communication network comprising:
   a first subnet;
   a plurality of intermediate wireless access points utilizing routing tables indexed by address entries to provide wireless routing pathways with the communication network;
   a first wired access point connected both directly to said first subnet and wirelessly to at least one of said plurality of intermediate wireless access points, said first wired access point utilizing a first forwarding table indexed by address entries to provide bridging between said first subnet and said plurality of intermediate wireless access points; and
   said first wired access point and said plurality of intermediate wireless access points, together, forming a spanning tree to communicatively couple network computing devices.

2. The communication network of claim 1 further comprising:
   a second subnet;
   a second wired access point connected both directly to said second subnet and wirelessly to at least one of said plurality of intermediate wireless access points, said second wired access point utilizing a second forwarding table indicated by address entries to provide bridging between said second subnet and said plurality of intermediate wireless access points; and
   said second wired access point participating with said first wired access point and said plurality of intermediate wireless access points in the spanning tree.

3. The communication network of claim 2 wherein each of said plurality of network computing devices having a unique address, and said first and second wired access points and said plurality of intermediate wireless access points selectively providing communication connectivity among said plurality of network computing devices through reference to the unique address identified in each communication packet.

4. The communication network of claim 2 wherein said network computing devices comprise a plurality of terminal nodes which utilize said first and second wired access points and said plurality of intermediate wireless access points for network communication.

5. The communication network of claim 2 wherein said network computing devices further comprising a first remote station, attached to the first subnet, having a first address and a second remote station, attached to the second subnet, having a second address; and wherein said first and second wired access points and said plurality of intermediate wireless access points providing communication connectivity between said first and second remote stations with reference to the first or second address associated with each communication packet.

6. The communication network of claim 3 wherein at least one of said network computing devices communicates wirelessly to one of said plurality of intermediate wireless access points, and at least one of said network computing devices communicates directly via said first subnet.

7. A communication network for exchanging communication packets that have addresses identified therein, said communication network comprising:
   a first subnet;
   a plurality of computing devices each of which having a unique address;
   a plurality of access points utilizing tables indexed by addresses to deliver communication packets along pathways between said plurality of computing devices;
   each of said plurality of access points providing wireless communication with select others of said plurality of access points;
   at least one of said plurality of access points providing direct, hard-wired communication to said first subnet; and
   said plurality of access points dynamically arranging and rearranging the pathways to maintain efficient delivery of communication packets among said plurality of computing devices.

8. The communication network of claim 7 wherein said plurality of computing devices comprising:
   at least one mobile terminal that wirelessly communicates with said plurality of access points; and
   at least one stationary computer directly attached to said first subnet.

9. The communication network of claim 8 further comprising:
   a second subnet;
   at least one of said plurality of access points providing direct, hard-wired communication to said second subnet; and
   at least one of said plurality of computing devices directly attached to said second subnet.

10. The communication network of claim 7 wherein said plurality of access points utilize routing and bridging tables indexed by address entries to maintain communication pathways within the communication network.

11. The communication network of claim 7 wherein said plurality of access points utilize spanning tree routing tables indexed by addresses to wirelessly route communication packets between said plurality of computing devices.

12. The communication network of claim 9 wherein said plurality of access points utilize spanning tree routing tables indexed by addresses to wirelessly route communication packets between said plurality of computing devices.

13. A communication network for exchanging communication packets, each communication packet having a destination field for storing an address of a destination device, comprising;
   a first wired subnet; and a second wired subnet;
   a plurality of computing devices, each of said plurality of computing devices having a unique address associated with the said first and second wired subnets;
   a plurality of access points utilizing tables indexed by the unique addresses of said plurality of computing devices, said tables providing pathway information for delivering communication packets to said plurality of computing devices;
   each of said plurality of computing devices constructs communication packets with the destination field containing the unique address of a selected other of said plurality of computing devices;
   each of said plurality of access points providing wireless communication with select others of said plurality of access points;
   said plurality of access points comprising first and second wired access points providing direct, hard-wired communication to said first wired subnet and said second wired subnet, respectively; and
   said plurality of access points comprising said first wired access point and said second wired access point dynamically arranging and rearranging the pathway information in said tables to maintain efficient delivery of communication packets among said plurality of computing devices.

14. The communication network of claim 13 wherein at least one of said plurality of computing devices using a direct, serial communication link to exchange communication through said first wired subnet.

15. The communication network of claim 13 wherein said plurality of access points utilize spanning tree routing tables indexed by addresses to wirelessly route communication packets between said plurality of computing devices.

16. The communication network of claim 13 said plurality of computing devices comprising:
- at least one mobile terminal that wirelessly communicates with at least one of said plurality of access points; and
- at least one computing device that communicates using a hard-wired link to the first wired subnet.

17. The communication network of claim 13 further comprising:
- at least one of said plurality of computing devices directly attached to said second wired subnet.

18. The communication network of claim 17 wherein at least one of said plurality of computing devices comprising a mobile terminal that wirelessly communicates via at least one of said plurality of access points.

19. The communication network of claim 13 wherein said first wired subnet comprises a wired link, and said unique addresses associated with said first wired subnet comprise unique addresses associated with said wired link.

20. A communication network for exchanging communication packets, each communication packet having a destination field for storing an address of a destination device, comprising:
- at least three wired subnets;
- a plurality of terminal devices, each of said plurality of terminal devices having a unique address associated with said at least three wired subnets;
- a plurality of access points utilizing tables indexed by the unique addresses of said plurality of terminal devices, said tables providing information for delivering communication packets to said plurality of terminal devices;
- each of said plurality of terminal devices constructs communication packets with the destination field containing the unique address of a selected other of said plurality of terminal devices;
- each of said plurality of access points providing wireless communication with at least one of the other of said plurality of access points;
- for each of said at least three wired subnets, at least one of said plurality of access points providing direct, hard-wired communication thereto; and
- said plurality of access points providing communication pathways for exchanging communication packets between said plurality of terminal devices.

21. The communication network of claim 20 wherein said plurality of access points utilize spanning tree routing tables indexed by said unique addresses to route and bridge communication packets between said plurality of terminal devices.

22. The communication network of claim 21 said plurality of terminal devices comprising at least one mobile terminal that wirelessly communicates via at least one of said plurality of access points.

23. The communication network of claim 20 wherein said at least three wired subnets comprising wired links, and said unique addresses associated with said at least three wired subnets comprise unique addresses associated with said wired links.

24. The communication network of claim 20 wherein at least one of said plurality of terminal devices using a direct, serial communication link to exchange communication with one of said at least three wired subnets.

* * * * *